United States Patent
Flynn et al.

(10) Patent No.: US 11,081,983 B2
(45) Date of Patent: *Aug. 3, 2021

(54) MULTISPEED ALTERNATING CURRENT MOTOR

(71) Applicant: QM Power, Inc., Kansas City, MO (US)

(72) Inventors: Charles J. Flynn, Greenwood, MO (US); Cooper N. Tracy, Belton, MO (US); W. Scott Hunter, Kansas City, MO (US); Stephen B. Nichols, Somerville, MA (US)

(73) Assignee: QM Power, Inc., Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/664,550

(22) Filed: Oct. 25, 2019

(65) Prior Publication Data
US 2020/0067431 A1      Feb. 27, 2020

Related U.S. Application Data

(63) Continuation of application No. 15/940,956, filed on Mar. 29, 2018, now Pat. No. 10,461,671.
(Continued)

(51) Int. Cl.
*H02P 6/14* (2016.01)
*H02P 6/16* (2016.01)
(Continued)

(52) U.S. Cl.
CPC ............. *H02P 6/16* (2013.01); *H02K 11/215* (2016.01); *H02P 1/465* (2013.01); *H02P 6/20* (2013.01); *H02P 6/26* (2016.02)

(58) Field of Classification Search
CPC ........ H02P 29/40; H02P 29/032; H02P 29/02; H02P 6/16; H02P 6/20; H02P 6/26;
(Continued)

(56) References Cited

U.S. PATENT DOCUMENTS

| 9,130,431 B2 | 9/2015 | Seguchi |
| 2005/0062494 A1* | 3/2005 | Bui .......................... H02P 8/36 |
| | | 324/765.01 |

(Continued)

FOREIGN PATENT DOCUMENTS

| CN | 107 809 192 A | 3/2018 |
| EP | 1 130 757 A1 | 9/2001 |

(Continued)

OTHER PUBLICATIONS

PCT/US2018/025306 Written Opinion, 8 pages, dated Jul. 4, 2018.

*Primary Examiner* — Karen Masih
(74) *Attorney, Agent, or Firm* — Polsinelli PC

(57) ABSTRACT

A method is for a machine having an alternating current (AC) power source with a first side (L1) and a second side (L2), two or more pairs of power switches, and one or more windings. The method comprises closing one pair of power switches by a control circuit to cause current to flow from a first side of the AC power source, through the one or more windings, and to the second side of the AC power source and closing another pair of power switches by the control circuit to cause current to flow from the second side of the AC power source, through the one or more windings, and to the first side of the AC power source.

30 Claims, 37 Drawing Sheets

Related U.S. Application Data

(60) Provisional application No. 62/478,588, filed on Mar. 29, 2017.

(51) Int. Cl.
*H02K 11/215* (2016.01)
*H02P 6/20* (2016.01)
*H02P 1/46* (2006.01)
*H02P 6/26* (2016.01)

(58) Field of Classification Search
CPC .......... H02P 1/465; H02P 6/085; H02P 25/22; H02K 11/215
See application file for complete search history.

(56) References Cited

U.S. PATENT DOCUMENTS

| | | |
|---|---|---|
| 2011/0291605 A1 | 12/2011 | Sakaguchi |
| 2014/0151145 A1 | 6/2014 | Sakamaki |
| 2014/0152228 A1 | 6/2014 | Flynn |
| 2016/0118916 A1 | 4/2016 | Gohara |
| 2018/0375321 A1* | 12/2018 | Ehrhart .................. H02P 6/182 |

FOREIGN PATENT DOCUMENTS

| | | |
|---|---|---|
| JP | 2014110698 A | 6/2014 |
| JP | 2014165957 A1 | 9/2014 |
| JP | 201625785 A1 | 2/2016 |
| JP | 201682853 A1 | 5/2016 |

\* cited by examiner

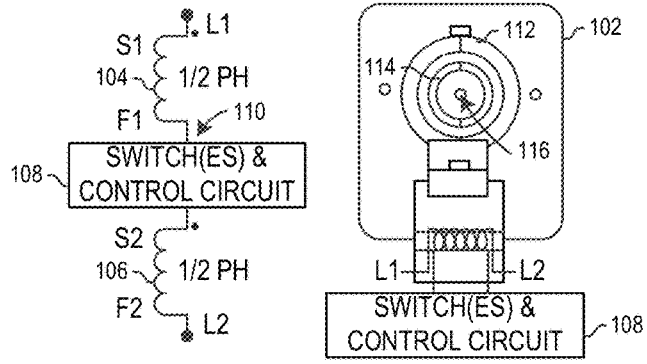
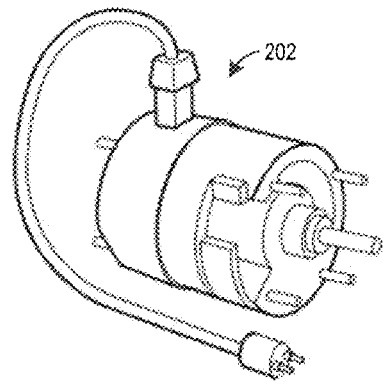
FIG. 1  FIG. 2
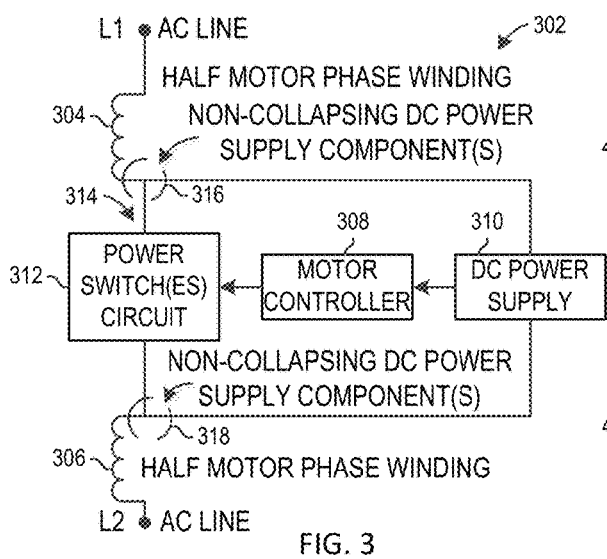
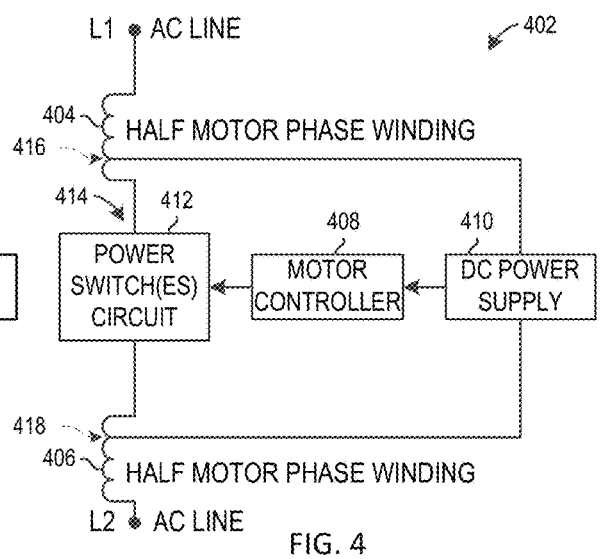
FIG. 3  FIG. 4
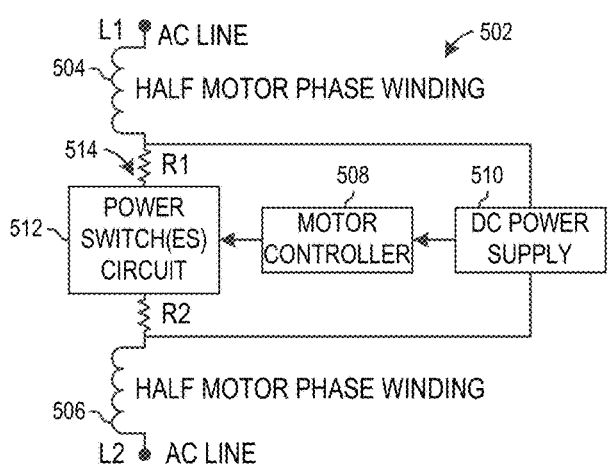
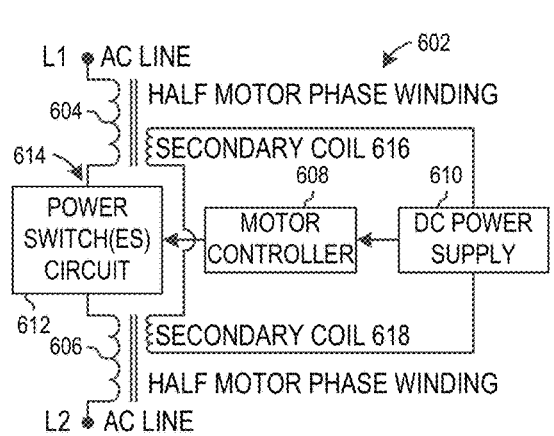
FIG. 5  FIG. 6

MULTISPEED ALTERNATING CURRENT MOTOR

RELATED APPLICATIONS

This application is a continuation of U.S. application Ser. No. 15/940,956, filed Mar. 29, 2018, entitled Multispeed Alternating Current Motor, which takes priority to U.S. App. No. 62/478,588, filed Mar. 29, 2017, and entitled Multispeed Alternating Current Motor, the entire contents of which are incorporated herein by reference.

FEDERALLY SPONSORED RESEARCH OR DEVELOPMENT

Not Applicable.

COMPACT DISK APPENDIX

Not Applicable.

BACKGROUND

In view of the growing proliferation of environmentally friendly laws, enhancements to various classes of motors are required. For example, refrigeration fan motors in a low wattage range, e.g. 4 to 16 watts, used in both the commercial and residential refrigeration markets, have traditionally been low efficiency, such as around 12%-26% efficient. It would be desirable to provide technologies to address enhancements required in different classes of motors.

SUMMARY

In one aspect, a multispeed alternating current (AC) machine circuit is for an AC power source having a first side and a second side. The AC machine circuit includes two or more pairs of power switches, one or more windings, and a control circuit to close one pair of power switches to cause current to flow from a first side of the AC power source, through the one or more windings, to the second side of the AC power source and to close the other pair of power switches to cause current to flow from the second side of the AC power source, through the one or more windings, to the first side of the AC power source.

In another aspect, a circuit is for a machine having alternating current (AC) power source having a first side (L1) and a second side (L2). The circuit comprises a winding with a start side and an end side, a first power switch connected between the first side and the winding start side, a second power switch connected between the second side and the winding start side, a third power switch connected between the first side and the winding end side, a fourth power switch connected between the second side and the winding end side, and a control circuit. The control circuit closes the first power switch and the fourth power switch and open the second power switch and the third power switch to cause current to flow from the first side to the second side or closes the second power switch and the third power switch and open the first power switch and the fourth power switch to cause current to flow from the second side to the first side.

In another aspect, a circuit is for a machine having alternating current (AC) power source having a first side (L1) and a second side (L2). The circuit comprises a first winding with a first start side and a first end side, a second winding with a second start side and a second end side, a first power switch connected between the AC power source first side and the first winding start side, a second power switch connected between the AC power source second side and the first winding start side, a third power switch connected between the AC power source first side and the first winding end side, a fourth power switch connected between the AC power source second side and the first winding end side, a fifth power switch connected between the AC power source first side and the second winding end side, a sixth power switch connected between the AC power source second side and the second winding end side, and a control circuit. The control circuit closes the first power switch and the sixth power switch and open the second power switch, the third power switch, the fourth power switch, and the fifth power switch to cause current to flow through the first winding and the second winding for fractional speed operation or closes the third power switch and the fourth power switch and open the first power switch, the second power switch, the fifth power switch, and the sixth power switch to cause current to flow through the first winding and the second winding for fractional speed operation or closes the first power switch and the fifth power switch and open the second power switch, the third power switch, the fourth power switch, and the sixth power switch to cause current to flow through the first winding for full speed operation or closes the second power switch and the fourth power switch and open the first power switch, the third power switch, the fifth power switch, and the sixth power switch to cause current to flow through the first winding for full speed operation.

In another aspect, a method is for a multispeed alternating current (AC) machine circuit for an AC power source having a first side and a second side. The method includes providing two or more pairs of power switches, providing one or more windings, and providing a control circuit to close one pair of power switches to cause current to flow from a first side of the AC power source, through the one or more windings, to the second side of the AC power source and to close the other pair of power switches to cause current to flow from the second side of the AC power source, through the one or more windings, to the first side of the AC power source. The method further includes providing components for the control circuit described herein and operating the circuit as described herein.

In another aspect, a method is for a circuit for a machine having alternating current (AC) power source having a first side (L1) and a second side (L2). The method comprises providing a winding with a start side and an end side, providing a first power switch connected between the first side and the winding start side, providing a second power switch connected between the second side and the winding start side, providing a third power switch connected between the first side and the winding end side, providing a fourth power switch connected between the second side and the winding end side, and providing a control circuit. The control circuit closes the first power switch and the fourth power switch and open the second power switch and the third power switch to cause current to flow from the first side to the second side or closes the second power switch and the third power switch and open the first power switch and the fourth power switch to cause current to flow from the second side to the first side. The method further includes providing components for the control circuit described herein and operating the circuit as described herein.

In another aspect, a method is for a circuit for a machine having alternating current (AC) power source having a first side (L1) and a second side (L2). The method comprises providing a first winding with a first start side and a first end side, providing a second winding with a second start side and a second end side, providing a first power switch connected between the AC power source first side and the first winding start side, providing a second power switch connected between the AC power source second side and the first winding start side, providing a third power switch connected between the AC power source first side and the first winding end side, providing a fourth power switch connected between the AC power source second side and the first winding end side, providing a fifth power switch connected between the AC power source first side and the second winding end side, providing a sixth power switch connected between the AC power source second side and the second winding end side, and providing a control circuit. The control circuit closes the first power switch and the sixth power switch and open the second power switch, the third power switch, the fourth power switch, and the fifth power switch to cause current to flow through the first winding and the second winding for fractional speed operation or closes the third power switch and the fourth power switch and open the first power switch, the second power switch, the fifth power switch, and the sixth power switch to cause current to flow through the first winding and the second winding for fractional speed operation or closes the first power switch and the fifth power switch and open the second power switch, the third power switch, the fourth power switch, and the sixth power switch to cause current to flow through the first winding for full speed operation or closes the second power switch and the fourth power switch and open the first power switch, the third power switch, the fifth power switch, and the sixth power switch to cause current to flow through the first winding for full speed operation. The method further includes providing components for the control circuit described herein and operating the circuit as described herein.

In another aspect, a divided phase windings circuit includes motor divided phase windings, a power switch circuit comprising at least one power switch and a direct current (DC) supply circuit all at a midpoint of the divided motor phase windings, and a non-collapsing DC power supply component to prevent the DC power supply from collapsing when the at least one power switch is on and conducting. The non-collapsing DC power supply component may include, for example, one or more of a tap from the motor divided phase windings electrically connected to the DC power supply, a secondary phase coil winding connected to the DC power supply to power the power supply, one or more resistors between the divided phase windings and the power switch circuit, one or more Zener diodes between the divided phase windings and the power switch circuit, and/or an electrical component to create a voltage drop between the motor divided phase windings and the power switch circuit to prevent the power supply from collapsing when the at least one power switch in the power switch circuit is on and conducting.

In one example, a phase windings circuit for a motor includes at least two phase windings forming one half of motor phase windings of the circuit and at least two other phase windings forming another half of the motor phase windings of the circuit. A direct current (DC) power supply is located at least approximately at a midpoint of the motor phase windings to receive alternating current (AC) power transferred from one or more of the phase windings and convert the AC power to DC power. A first stage power switch circuit comprises at least one power switch outside of the DC power supply and is electrically connected at least approximately at a midpoint between phase windings on each half of the circuit. A second stage power switch circuit comprises at least one other power switch outside of the DC power supply and is electrically connected at least approximately at the midpoint of the divided phase windings to receive AC power from the motor divided phase windings. A non-collapsing DC power supply component prevents the DC power supply from collapsing when the at least one power switch or the at least one other power switch is on and conducting.

In another example, a circuit for a motor comprises at least two phase windings forming one half of motor phase windings of the circuit and at least two other phase windings forming another half of the motor phase windings of the circuit. A direct current (DC) power supply at least approximately at a midpoint of the motor phase windings receives alternating current (AC) power transferred from one or more of the phase windings and converts the AC power to DC power. A first stage power switch circuit comprises at least one power switch outside of the DC power supply and is electrically connected at least approximately at a midpoint between the at least two of the phase windings on each half of the circuit. A second stage power switch circuit comprises at least one other power switch outside of the DC power supply and is electrically connected at least approximately at the midpoint of the phase windings to receive AC power from the motor phase windings. A motor controller controls the first stage power switch circuit and the second stage power switch circuit. The motor controller is electrically connected at at least one of (i) at least approximately at the midpoint of the phase windings and (ii) at least approximately at the midpoint between the at least two of the phase windings on each half of the circuit. A non-collapsing DC power supply component is connected to the DC power supply to prevent the DC power supply from collapsing when the at least one power switch or the at least one other power switch is on and conducting.

In another example, a motor has multiple motor phases (i.e. motor phase windings) and a supply line voltage through the phases. The motor phases are divided into four parts (fourths or quarters), with two motor phase windings forming one half of the motor phase windings of the circuit and two other motor phase windings forming the other half of the motor phase windings of the circuit. The motor controller for the motor and the power electronics for the motor are placed at a "mid-point" or "center point" in the supply line voltage between the two halves of the divided phases and/or at a midpoint or center between two of the divided motor phases on each half of the circuit (e.g. "quarter-point"). The direct current (DC) power supply (e.g. for the electronics used in the motor controller) are also located between the divided phases, between the two halves of the divided phases and/or at a midpoint or center between two of the divided motor phases on each half of the circuit. The motor phases provide current limiting and the voltage drop from the line voltage supply lines to low voltage DC to the DC power supply, thereby reducing the DC power supply component count and allowing for the use of low voltage components for the DC power supply and for the motor controller.

In another example, the motor phases are divided into four parts (fourths or quarters), with two motor phase windings forming one half of the motor phase windings of the circuit and two other motor phase windings forming the other half of the motor phase windings of the circuit. The motor controller for the motor has two stages, with a first stage of the motor controller placed at a "mid-point" or "center point" in the supply line voltage between the two halves of the divided motor phase windings, and a second stage of the motor controller placed at a "mid-point" or "center point" in the supply line voltage between the two halves of the divided motor phase windings. The power electronics for the motor have two stages, with a first stage of the power electronics placed at a midpoint or center between two of the divided motor phase windings on each half of the motor phase windings (e.g. "quarter-point") and a second stage of the power electronics also placed at a "mid-point" or "center point" in the supply line voltage between the two halves of the divided motor phase windings. The direct current (DC) power supply (e.g. for the electronics used in the motor controller) are also located between the divided motor phase windings, between the two halves of the divided motor phase windings and/or at a midpoint or center between two of the divided motor phase windings on each half of the motor phase windings.

In another aspect, a method is for a machine having an alternating current (AC) power source with a first side (L1) and a second side (L2). The method comprises: at a motor controller for a circuit comprising a winding with a start side and an end side, a first power switch connected between the first side and the winding start side, a second power switch connected between the second side and the winding start side, a third power switch connected between the first side and the winding end side, and a fourth power switch connected between the second side and the winding end side: receiving a signal from an AC polarity detector and another signal from a Hall effect device and determining which of the power switches to open or close to obtain a proper direction of current flow through the winding based on the signal and the other signal. The motor controller closes the first power switch and the fourth power switch and opens the second power switch and the third power switch to cause current to flow from the first side to the second side or closes the second power switch and the third power switch and opens the first power switch and the fourth power switch to cause current to flow from the second side to the first side.

In another aspect, a method is for a machine having an alternating current (AC) power source having a first side (L1) and a second side (L2). The method comprises: at a control circuit for a circuit comprising a first winding with a first start side and a first end side, a second winding with a second start side and a second end side, a first power switch connected between the AC power source first side and the first winding start side, a second power switch connected between the AC power source second side and the first winding start side, a third power switch connected between the AC power source first side and the first winding end side, a fourth power switch connected between the AC power source second side and the first winding end side, a fifth power switch connected between the AC power source first side and the second winding end side, and a sixth power switch connected between the AC power source second side and the second winding end side: closing the first power switch and the sixth power switch and opening the second power switch, the third power switch, the fourth power switch, and the fifth power switch to cause current to flow through the first winding and the second winding for fractional speed operation. The control circuit closes the third power switch and the fourth power switch and opens the first power switch, the second power switch, the fifth power switch, and the sixth power switch to cause current to flow through the first winding and the second winding for fractional speed operation. The control circuit closes the first power switch and the fifth power switch and opens the second power switch, the third power switch, the fourth power switch, and the sixth power switch to cause current to flow through the first winding for full speed operation. The control circuit closes the second power switch and the fourth power switch and opens the first power switch, the third power switch, the fifth power switch, and the sixth power switch to cause current to flow through the first winding for full speed operation.

In another aspect, a method is for a machine having an alternating current (AC) power source with a first side (L1) and a second side (L2), two or more pairs of power switches, and one or more windings. The method comprises closing one pair of power switches by a control circuit to cause current to flow from a first side of the AC power source, through the one or more windings, and to the second side of the AC power source and closing another pair of power switches by the control circuit to cause current to flow from the second side of the AC power source, through the one or more windings, and to the first side of the AC power source.

BRIEF DESCRIPTION OF THE DRAWINGS

FIG. 1 depicts motor phase windings divided with a control circuit located at a mid-point in the motor phase windings.

FIG. 2 depicts a single phase electronically commutated motor (ECM).

FIG. 3 depicts a divided phase winding circuit.

FIG. 4 depicts a divided phase winding circuit with a tap from the divided phase winding coil to the direct current (DC) power supply.

FIG. 5 depicts a divided phase winding circuit with resisters between the divided phase windings and the power switch(es).

FIG. 6 depicts a divided phase winding circuit with a secondary coil.

DETAILED DESCRIPTION

Figure 7:
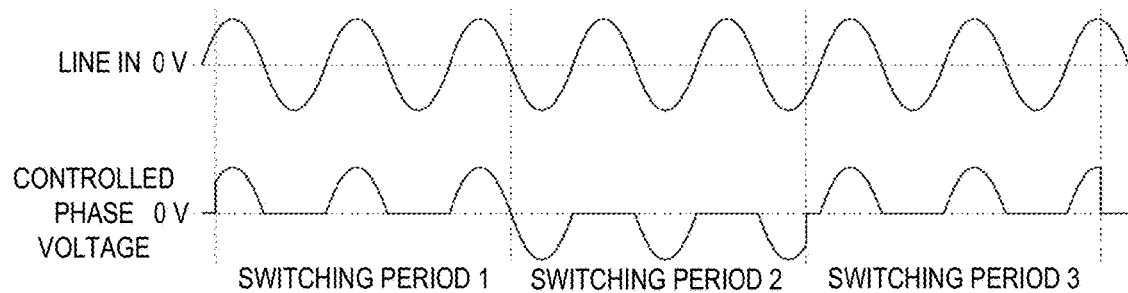
FIG. 7 depicts a control of phase current direction during start up and continuous operation below synchronous speeds in a divided phase winding circuit.
Figure 7:
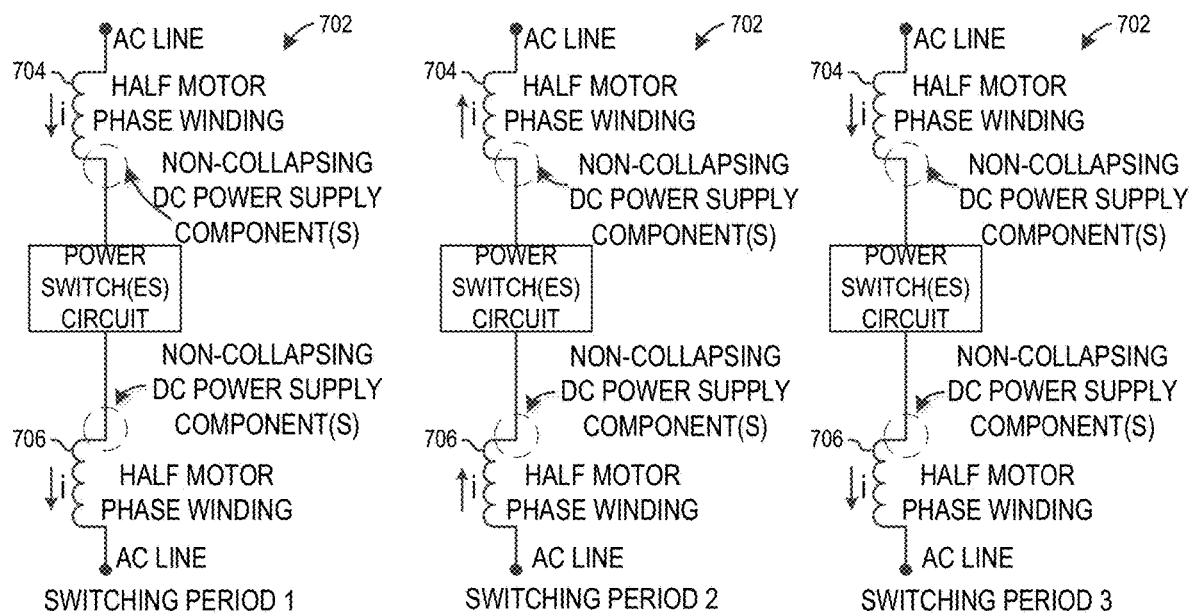

New and useful circuits are disclosed that provide advantages over the prior art for controlling synchronous brushless permanent magnet motors. One embodiment of the present disclosure includes one or more circuits for an electronically commutated motor (ECM). Another embodiment of the present disclosure includes one or more circuits for a shaded pole motor. Another embodiment of the present disclosure includes one or more circuits for other types of motors.

In one aspect, a motor has multiple motor phases (i.e. motor phase windings) and a supply line voltage through the phases. The motor phases are divided in half and both the motor controller for the motor and the power electronics for the motor are placed at a "mid-point" or "center point" in the supply line voltage between the divided phases. The direct current (DC) power supply (e.g. for the electronics used in the motor controller) are also located between the divided phases. The motor phases provide current limiting and the voltage drop from the line supply lines to low voltage DC to the DC power supply, thereby reducing the DC power supply component count and allowing for the use of low voltage components for the DC power supply and for the motor controller.

Prior systems used a Zener diode or other voltage regulator located in series with a power switch and the motor phases, which limited the maximum power of the motor to the maximum wattage value of the Zener diode. Circuits in the present disclosure eliminate the Zener diode voltage regulator from the primary current path for the motor phases so that a Zener diode voltage regulator is not located in series with a power switch and the motor phases, which eliminates the need to lower the wattage specification otherwise needed for a Zener diode. Instead, the Zener diode or other voltage regulator is located in parallel with the power switch(es) in some embodiments of the present disclosure.

In another aspect, a motor has multiple motor phases (i.e. motor phase windings) and a supply line voltage through the motor phases. The motor phases are divided into four parts (fourths or quarters), with two motor phase windings forming one half of the motor phase windings of the circuit and two other motor phase windings forming the other half of the motor phase windings of the circuit. The motor controller for the motor and the power electronics for the motor are placed at a "mid-point" or "center point" in the supply line voltage between the two halves of the divided phases and/or at a midpoint or center between two of the divided motor phases on each half of the circuit. The direct current (DC) power supply (e.g. for the electronics used in the motor controller) are also located between the divided phases, between the two halves of the divided phases and/or at a midpoint or center between two of the divided motor phases on each half of the circuit. The motor phases provide current limiting and the voltage drop from the line voltage supply lines to low voltage DC to the DC power supply, thereby reducing the DC power supply component count and allowing for the use of low voltage components for the DC power supply and for the motor controller.

In one example, the motor phases are divided into four parts (fourths or quarters), with two motor phase windings forming one half of the motor phase windings of the circuit and two other motor phase windings forming the other half of the motor phase windings of the circuit. The motor controller for the motor has two stages, with a first stage of the motor controller placed at a "mid-point" or "center point" in the supply line voltage between the two halves of the divided motor phase windings, and a second stage of the motor controller placed at a "mid-point" or "center point" in the supply line voltage between the two halves of the divided motor phase windings. The power electronics for the motor have two stages, with a first stage of the power electronics placed at a midpoint or center between two of the divided motor phase windings on each half of the motor phase windings (i.e. "quarter-point") and a second stage of the power electronics also placed at a "mid-point" or "center point" in the supply line voltage between the two halves of the divided motor phase windings. The direct current (DC) power supply (e.g. for the electronics used in the motor controller) is also located between the divided motor phase windings, between the two halves of the divided motor phase windings and/or at a midpoint or center between two of the divided motor phase windings on each half of the motor phase windings.

For example, the DC power supply is located with the first stage when the DC power supply powers the first stage motor controller at the "quarter-point." However, the DC power supply conceptually may be considered to be at a "mid-point" of the motor phase windings because when the first stage (stage 1) power electronics are energized and the second stage (stage 2) power electronics are not energized, the DC power supply is in the middle of the active coils (active motor phase windings) and the other two motor phase windings (coils) are not active at that time. The two active coils are current limiting. When the second stage is energized while the first stage is energized, the first stage coils are in parallel with the coils in the second stage.

Circuits in the present disclosure eliminate the need for an opto-isolator to allow switching between sensing/control electronics of a motor controller and a power switch of the motor controller. Prior systems had two neutral reference values, one for sensing/control electronics and one for a power switch.

Circuits in the present disclosure have improved line phase angle detection, eliminating the need for a precision resistance bridge linked to the input of an opto-isolator. Thus, the circuits of this aspect have more accurate line phase angle detection.

Circuits in the present disclosure reduce different electrical neutral values for the power switches and motor controller to one value. This guarantees that the power switch(es) of the circuits with this aspect will reliably transition from completely "off" to fully saturated.

Prior systems that included two switches have a difficult time turning one switch off completely for one half of an AC cycle. Circuits in the present disclosure place one or more switches outside of a DC power supply and motor controller circuit, resulting in proper switching.

Each of these improvements not only increases the reliability of the operation of the motor controller, but also serves to improve the combined motor/motor controller efficiency.

The divided phase winding circuits in the present disclosure can be used in a variety of motors, such as DC brushless motors/electronically communicated motors (ECMs), shaded pole motors, other synchronous motors, permanent-split capacitor (PSC) motors, etc.

For example, FIG. 1 depicts a motor 102 with divided motor phase windings 104, 106 and a motor control circuit 108 located at a mid-point 110 in the divided motor phase windings. The motor 102 includes a stator 112 and a rotor 114 mounted on a shaft 116. The rotor 114 is mounted for rotation in a core structure, such as a laminated core structure or other core structure. The rotor 114 has a body portion, which is shown as cylindrical in shape. Around the periphery of the body are located arcuately shaped permanent magnetic portions. The magnetic portion has its north magnetic pole adjacent to the outer surface of the rotor, and the magnetic portion has its south magnetic pole located adjacent to outer periphery of the rotor 114. One or more windings or pairs of windings are mounted on the connecting portion of the core structure. The motor 102 also includes a Hall Effect switching device, a portion of which extends to adjacent the periphery of the rotor 114 for responding to the magnetic polarity of the respective rotor magnetic portions. In the construction as shown, the Hall Effect switch is located adjacent the outer periphery of the magnetic portion during half of each revolution of the rotor 114 and adjacent the outer periphery of the magnetic portion during the remaining half of each revolution of rotor.

The motor 102 can operate below, at, or above synchronous speeds. This is due to the fact that fractions of half cycles can flow through the phase windings.

The divided phase winding circuit of FIG. 1 includes input connections on leads L1 and L2 connected to a source of alternating current (AC) energy during operation, such as AC line voltage. The leads L1 and L2 are connected across a series circuit that includes divided phase windings 104, 106 shown connected in series across a control circuit 108. For example, the control circuit 108 may include a full wave diode rectifier bridge circuit connected in series to the divided phase windings 104, 106 and a power switch(es) circuit having one or more switches or other power controllable switching devices connected to the output of the full wave diode rectifier bridge circuit.

The divided phase windings 104, 106 can be bifilar or lap wound. The alternating current power source has its lead L1 connected to the start side S1 of the first winding 104. The other end of the winding 104, labeled F1, is connected to one of the inputs of the control circuit 108. The other input side of the control circuit 108 is attached to the start side S2 of the second divided phase winding 106, and the finish side of the same divided phase winding, labeled F2, is attached to the input lead L2 of the AC power source.

As another example, FIG. 2 depicts a single phase ECM 202 in which the motor phase windings are divided, and a motor controller (motor control circuit) is located at a mid-point in the divided motor phase windings.

FIG. 3 discloses a divided phase winding circuit 302 for dividing motor phase windings 304, 306 (also referred to as motor phases or phase coils herein) of a motor in half and placing both a motor controller 308 for the motor and power electronics for the motor, including the DC power supply 310 and a power switch(es) circuit 312 with one or more power switches, at a "mid-point" or "center point" 314 in the supply line voltage between the divided phases 304, 306. In the example of FIG. 3, the motor phase winding is divided in half. Some variation from the half division is allowable, such as between zero and plus/minus 20% of the halfway point.

The divided phase winding circuit 302 of FIG. 3 includes two divided phase windings 304, 306, each connected to AC line voltage L1 and L2 respectively. A DC power supply 310 is electrically connected to the divided phase windings 304, 306, such as at the finish side of the first phase winding 304 and the start side of the second phase winding 306. The divided phase winding 304, 306 operates to lower the AC line voltage to a voltage compatible with the DC power supply 310. Thus, the number of windings in the divided phase winding 304, 306 can be selected to reduce the AC line voltage received at L1 and L2 to a selected lower voltage to be received by the DC power supply 310. The divided phase winding 304, 306 also operates to filter noise from the AC line voltage received at L1 and L2.

The DC power supply 310 converts the low voltage AC power received from the divided phase windings 304, 306 to a DC voltage configured to power the DC powered components of the divided phase winding circuit, including the motor controller 308. The DC power supply 310 then supplies power to the motor controller 308.

The motor controller 308 controls the start-up and operation of the divided phase winding circuit 302. For example, the motor controller 308 controls start-up, including where the motor is a synchronous motor. The motor controller 308 determines the location of the rotor relative to the stator. The motor controller 308 also determines and monitors the speed of the rotor, such as in revolutions per minute (RPMs), to determine operational parameters of the motor, such as when the motor has reached synchronous speed, and controls the motor based on the location of the rotor and/or speed of the motor. In one example, the motor controller 308 has a Hall effect switch and/or other rotation determining device to determine the position of the rotor and/or rotation counting or speed determining device to determine the speed of the rotor.

The power switch(es) circuit 312 includes one or more power switches, such as one or more metal-oxide-semiconductor field-effect transistors (MOSFETs), silicon-controlled rectifiers (SCRs), transistors, or other switches or switching devices. The one or more switches are on or off or one is on while the other is off. For example, in one half cycle of an AC cycle, a first power switch is on and conducting while the second switch is off and not conducting. In the other half cycle of the AC cycle, the second power switch is on and conducting while the first switch is off and not conducting. In circuits with one switch, the switch may be on and conducting or off and not conducting during one or more portions of the AC cycle.

The power switch(es) circuit 312 is isolated from (outside of) the DC power supply 310, which makes the divided phase winding circuit 302 more stable than circuits having the power switch(es) circuit within (and not isolated from) the DC power supply.

When the power switch(es) of a circuit turn on, there is only a slight voltage drop through the power switch(es) due to the minor resistance of the power switch(es). Therefore, if the input voltage for the DC power supply is developed by connecting the DC power supply leads to both sides of a power switch (or power switches), this would result in the DC power supply collapsing (i.e. the DC voltage from the DC power supply reducing to a voltage level at or below the switch 'on' resistance times the current through the power switch(es), which is close to zero) when the power switch is in an 'on' state or not being able to receive power and power the DC components of the circuit.

For example, if the power switch is directly connected across the DC power supply or across the DC side of a bridge rectifier and if there are not one or more components in series with the power switch to create a voltage drop when the power switch is conducting or 'on', the conducting power switch 'shorts out' or connects together the positive and negative terminals of the bridge rectifier for the DC power supply, which collapses the DC voltage (causes the DC voltage to be reduced to a level at or below the 'on' resistance of the power switch times the current through the power switch, which is close to zero). Since the 'on' resistance of the power switch is extremely low or typically in the milliohms, the DC voltage is very close to zero.

The divided phase winding circuit 302 includes one or more non-collapsing DC power supply components 316, 318 (components to prevent the DC voltage from the DC power supply from being reduced to or below the switch 'on' resistance times the current through the power switch (es), which is close to zero), including voltage drop components or direct DC power supply powering components to create a non-collapsing DC power supply. Examples of non-collapsing DC power supply components 316, 318 include a tap from the primary phase winding 304, 306 electrically connected to the DC power supply 310, a secondary phase coil winding connected to the DC power supply to power the power supply, resistors between the divided phase windings and the power switch(es) circuit 312, one or more Zener diodes between the divided phase windings and the power switch(es) circuit, a non-saturated semiconductor or other resistive component between the divided phase windings and the power switch(es) circuit 312 where the resistance is high enough to create a significant voltage drop and where this voltage drop causes the DC power supply when the switch is 'on', or other components to create a voltage drop between the primary divided phase windings and the power switch(es) circuit to prevent the DC power supply from collapsing when the power switch(es) in the power switch(es) circuit is/are on and conducting. The divided phase winding circuit 302 therefore provides a constant flow of power regardless of whether the power switch(es) circuit is on and conducting or off and not conducting.

Many electronically controlled synchronous motors have circuits that detect the zero crossing of the AC voltage applied to the phase windings. This zero crossing detection circuit sends a signal to the motor controller 308 to determine when the motor is at synchronous speed. If the AC supply voltage has electrical noise riding on, usually due to other equipment operating on the same circuit, this electrical noise can cause the zero crossing detector to operate incorrectly affecting the control of the motor, which normally appears as acoustical noise in the motor.

In one example, the divided phase winding circuit 302 is part of a synchronous motor. The synchronous motor receives line power (that is, AC power with a current and voltage) at L1 and L2. A synchronous motor using a divided phase winding using the associated circuit of the present disclosure does not rely upon detecting the zero crossing of the applied AC voltage to control the motor but rather detects the polarity of the voltage, i.e. whether the polarity L2 is higher or less than L1, allowing for quiet operation even when electrical noise is present in the AC supply.

The DC power supply 310 in FIG. 3 is electrically connected directly to the divided phase windings 304, 306. Thus, the DC power supply 310 is powered by the divided phase windings 304, 306 regardless of the status of the power switch(es) circuit 312.

FIG. 4 discloses another divided phase winding circuit 402 for dividing motor phase windings 404, 406 of a motor in half and placing both a motor controller 408 for the motor and power electronics for the motor, including the DC power supply 410 and a power switch(es) circuit 412 with one or more power switches, at a "mid-point" or "center point" 414 in the supply line voltage between the divided phases. The divided phase winding circuit 402 of FIG. 4 includes a tap 416, 418 from the primary divided phase winding 404, 406 electrically connected to the DC power supply 410 to create a non-collapsing DC power supply (a DC power supply in which the DC voltage is not reduced to or below the power switch(es) circuit 'on' resistance times the current through the power switch(es) circuit, which is close to zero).

In some circuits, when the motor reaches synchronous speed, the one or more power switch(es) turn off and thereby cause the low voltage power to stop flowing to the motor controller. In one example, the path from one divided phase winding through the power switch(es) to another divided phase winding is shorted, such as at synchronous speed. This results in the DC power supply and motor controller no longer receiving the low power supply voltage from the phase windings, such as in the event there is no capacitor to hold a charge during the short or a capacitor that is present is not large enough to hold enough charge during the short. The circuit 402 of FIG. 4 includes a tap 416, 418 from the coils of the phase windings 404, 406 to the DC power supply 410 so that the low voltage power supply flows directly from the phase windings to the DC power supply, bypassing the power switch(es) for the motor controller 408 ("divided motor phase controller"). The circuit 402 of FIG. 4 thereby guarantees that the low voltage power supply is supplied to the DC power supply 410, for example at synchronous speed.

In one example, a DC power supply 410 for a divided motor phase controller is formed by a Zener diode and a storage capacitor that receives power during a portion of an alternating current (AC) cycle when the power switch(es) are off. When the motor is operating at synchronous speed, the power switch(es) are continuously conducting. Therefore, the amount of voltage being supplied to the DC power supply is equal to the voltage drop across the switch(es), which can result in a low voltage when using low on resistance (RDS(on)) power MOSFETs.

FIG. 5 discloses another divided phase winding circuit 502 for dividing motor phase windings 504, 506 of a motor in half and placing both a motor controller 508 for the motor and power electronics for the motor, including the DC power supply 510 and a power switch(es) circuit 512 with one or more power switches, at a "mid-point" or "center point" 514 in the supply line voltage between the divided phases. The circuit 502 of FIG. 5 includes resistors R1 and R2 between the motor phase windings 504, 506 and the power switch(es) circuit 512 to hold up and therefore maintain the low voltage power supply supplied from the phase windings to the DC power supply 510 and create a non-collapsing DC power supply (a DC power supply in which the DC voltage is not reduced to or below the power switch(es) circuit 'on' resistance times the current through the power switch(es) circuit, which is close to zero). The circuit of FIG. 5 thereby maintains the low voltage power supply to the DC power supply 510, for example at synchronous speed.

FIG. 6 discloses another divided phase winding circuit 602 for dividing motor phase windings 604, 606 of a motor in half and placing both a motor controller 608 for the motor and power electronics for the motor, including the DC power supply 610 and a power switch(es) circuit 612 with one or more power switches, at a "mid-point" or "center point" 614 in the supply line voltage between the divided phases. The primary divided phase winding 604, 606 limits the current that can flow to the DC power supply 610, thereby eliminating the need for current limiting components that waste power. The divided phase winding circuit 602 of FIG. 6 includes a secondary phase winding 616, 618 electrically connected to the DC power supply 610 to create a non-collapsing DC power supply (a DC power supply in which the DC voltage is not reduced to or below the power switch(es) 'on' resistance times the current through the power switch(es), which is close to zero).

In one example, the power switch(es) circuit 612 includes a Zener diode or other voltage regulator and a power switch in parallel. Whereas, prior systems included the power circuit in series with other components. Because the power switch is in parallel with the Zener diode and not in series, it can always be on. However, if the power switch is off, current can still flow through the Zener diode.

The circuit of FIG. 6 includes one or more secondary coils (also referred to as a secondary winding) 616, 618 that provide a low voltage power supply to the DC power supply 610, such as when the motor is at start-up. The one or more secondary coils 616, 618 also act as a high frequency noise filter to filter out high frequency noise from the low power voltage supplied to the DC power supply 610.

The secondary winding 616, 618 may be distributed anywhere, such as evenly between the first and second divided phase windings 604, 606, all on one pole, or unevenly between the first and second divided phase windings, such as a greater number of turns or coils on one secondary winding than another secondary winding.

In the example of FIG. 6, the divided phase winding circuit 602 can turn off the DC electronics, including the motor controller 608, when the motor is on and at synchronous speed. Thus, the motor controller 608 of the divided phase winding circuit 602 determines the speed of the motor and whether the motor is or is not at synchronous speed. For example, 1800 RPM may be the synchronous speed for a motor with four stator poles (two north stator poles and two south stator poles). Every half AC cycle, power is supplied to one of the magnetic poles. Therefore, it takes two cycles to provide power to the four magnetic poles. Thus, the synchronous speed is 1800 RPM if the motor is synced to line AC. Similarly, the synchronous speed for an eight-pole stator would be 900 RPMs.

FIG. 7 depicts a control of phase current direction during start up and continuous operation below synchronous speeds in a divided phase winding circuit 702.

As shown in FIG. 7, the current will always flow across both divided phase windings 704, 706 and the power switch (es) circuit 708 in the same direction. The divided phase windings 704, 706, being in series with the power switch(es) circuit 708, represent one winding with the power switch(es) circuit 708 placed at the mid-point or center point between the divided phase windings. The current and voltage applied to the divided phase windings will always be in the same direction through both coils, and the magnetic polarity of the divided phase windings will likewise be the same.

As discussed below, the control circuit may include a diode rectifier bridge circuit whose output is connected to one or more power switches. As shown in FIG. 7, if the output terminals of the diode bridge rectifier of the power switch(es) circuit 708 are shorted when the voltage on lead L1 is positive, the current will only flow through the winding 704, 706 in one direction, but in half cycle increments. If the voltage across leads L1 and L2 is 60 cycles, then the outputs of the diode bridge rectifier circuit in the control circuit will be shorted only when lead L1 is positive, and current will flow only in one direction and for 8 milliseconds. No current will flow for 8 milliseconds on the alternate half cycles. Then current would flow for another 8 milliseconds and so on. If the output of the diode bridge circuit of the control circuit is shorted when lead L2 is positive, then power will flow in the same manner. If the shorting of the output of the bridge is accomplished selectively, that is based on the angular position of the magnetic rotor, continuous motor action will be produced. If the diode bridge rectifier circuit output in the control circuit is shorted for a fraction of a half cycle selectively based on the angular position of the magnetic rotor as described above, and only when lead L1 is positive, then any desired speed can be accomplished including speeds higher than the synchronous speed. The characteristics of such a motor would be similar to a DC motor with pulsating current applied to the inputs. However, rather than having multiple power switching components achieve the switching of the divided phase windings, the divided phase winding circuit makes use of the fact that alternating current in conjunction with one power switching component can accomplish the switching.

Figure 8:
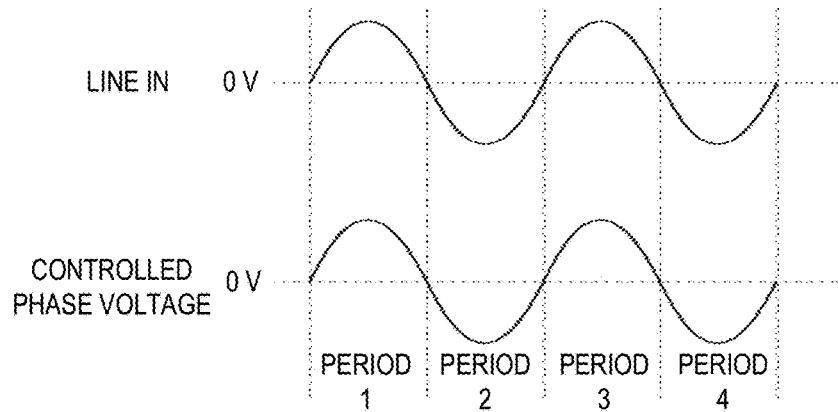
FIG. 8 depicts a control of phase current direction at a synchronous speed of 1800 revolutions per minute (RPM) in a four pole divided phase winding circuit.

FIG. 8 depicts an example of control of phase current direction at a synchronous speed of 1800 revolutions per minute (RPM) in a four pole divided phase winding circuit. At synchronous speed, the controlled phase is synchronized with the AC line input.

Figure 9:
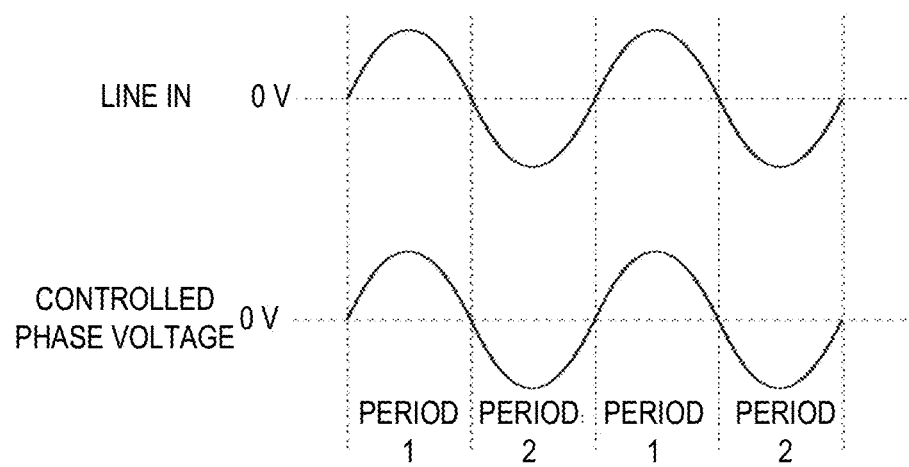
FIG. 9 depicts a control of phase current direction at a synchronous speed of 3600 revolutions per minute (RPM) in a two pole divided phase winding circuit.

FIG. 9 depicts a control of phase current direction at a synchronous speed of 3600 revolutions per minute (RPM) in a two pole divided phase winding circuit. At synchronous speed, the controlled phase is synchronized with the AC line input.

Figure 10:
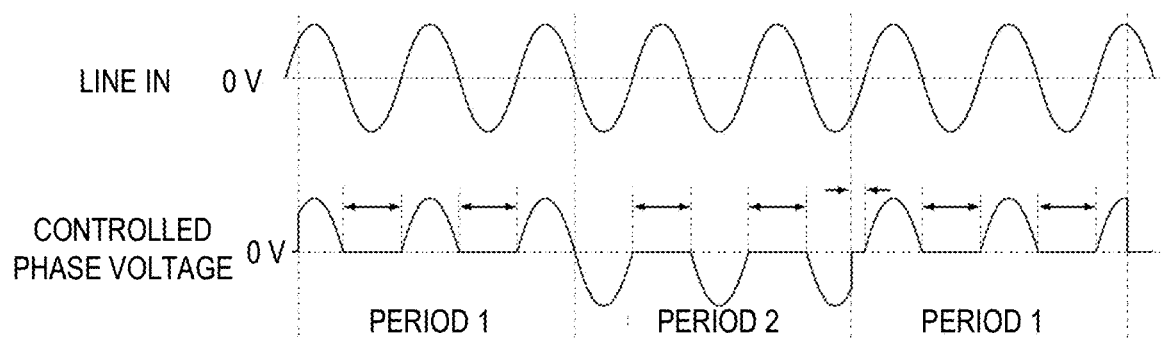
FIG. 10 depicts DC supply storage capacitor charging periods.

FIG. 10 depicts an example of DC power supply storage capacitor charging periods in a divided phase winding circuit. Note the correlation to the wave form of FIG. 7.

Figure 11:
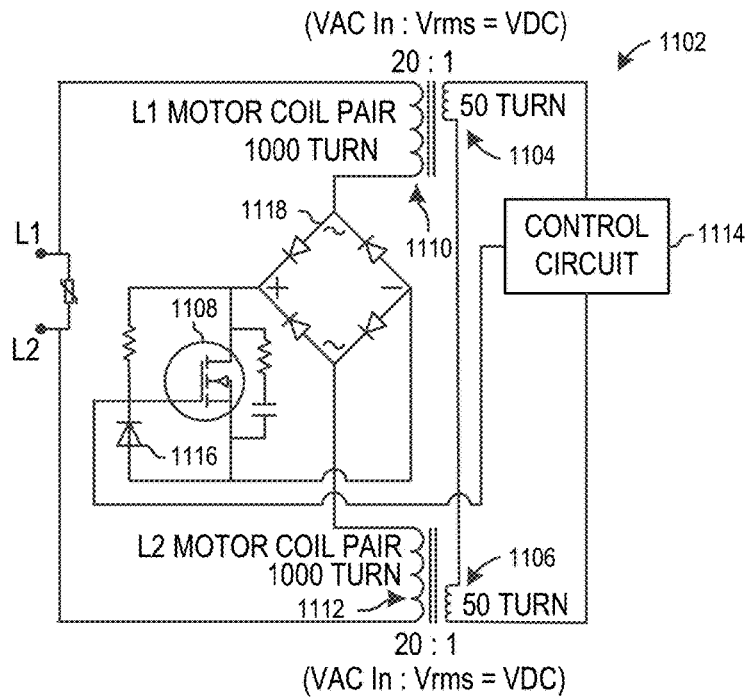
FIG. 11 depicts a divided phase winding circuit with a secondary coil and one power switch.

FIG. 11 depicts a divided phase winding circuit 1102 with a secondary coil 1104, 1106 and one power switch 1108. The primary divided phase winding 1110, 1112 limits the current that can flow to the DC power supply.

The control circuit 1114 controls switching for the power switch(es) circuit 1115 based on timing of the input frequency and rotor position. The control circuit 1114 controls the start-up and operation of the divided phase winding circuit. For example, the control circuit 1114 controls start-up, including where the motor is a synchronous motor. The control circuit 1114 determines the location of the rotor relative to the stator. The control circuit 1114 also determines and monitors the speed of the rotor, such as in revolutions per minute (RPMs), to determine operational parameters of the motor, such as when the motor has reached synchronous speed, and controls the motor based on the location of the rotor and/or speed of the motor. In one example, the control circuit 1114 has a Hall effect switch and/or other rotation determining device to determine the position of the rotor and/or rotation counting or speed determining device to determine the speed of the rotor.

In one example, the power switch(es) circuit 1115 includes a Zener diode 1116 or other voltage regulator and a power switch 1108 in parallel. Whereas, prior systems included the power switch in series with other components. Because the power switch 1108 is in parallel with the Zener diode 1116 and not in series, it can always be on. However, if the power switch is off, current can still flow through the Zener diode.

The circuit of FIG. 11 includes one or more secondary coils (also referred to as a secondary winding) 1104, 1106 that provide a low voltage power supply to the DC power supply, such as when the motor is at start-up. The one or more secondary coils 1104, 1106 also act as a high frequency noise filter to filter out high frequency noise from the low power voltage supplied to the DC power supply.

The secondary winding 1104, 1106 may be distributed anywhere, such as evenly between the first and second divided phase windings 1110, 1112, all on one pole, or unevenly between the first and second divided phase windings, such as a greater number of turns or coils on one secondary winding than another secondary winding.

The way that the coils are connected to the circuit via the diode bridge rectifier 1118 allow for current to flow through the coils in only one direction at any given time.

The improvements that have been made to this motor and controller greatly improve the DC logic power supply which enables a more reliable logic control circuit. Secondary coils 1104, 1106 are wound with the motor coils in a method that creates a transformer using the motor coils as the primary coils 1110, 1112. The example of FIG. 11 uses a 20:1 ratio. The example of FIG. 11 includes 1000 turns per motor primary coil and 50 turns per secondary coil that are wound on the same stator pole. However, other turn ratios may be used, higher or lower. The ratio between the primary motor coils 1110, 1112 and secondary coils 1104, 1106 may change with AC input power and/or DC power requirements. This circuit not only isolates all DC circuitry from high voltages from the line, but also creates a non-collapsible DC power supply to the control circuit 1114 when power is applied to inputs L1 and L2.

The power switch(es) circuit 1115 has a full wave bridge rectifier 1118 in addition to the MOSFET power switch 1108. The full wave bridge rectifier 1118 guarantees that no negative voltage will be supplied to the drain (top) of the power switch 1108. The full wave bridge rectifier 1118 also guarantees that no positive voltage will be supplied to the source (bottom) of the power switch 1108 so that current can only flow from the drain to the source of the power switch 1108 when biased by a positive voltage on the gate of the power switch 1108 via resistor R1. Simultaneously, as a positive rectified AC power supply is present at the drain of the power switch 1108, the power switch 1108 is biased by the same voltage signal via resistor R1. Diode 1116 protects the gate of the power switch 1108 by guaranteeing that any voltage on the gate of the power switch 1108 will be greater than −0.7 VDC, as anything less could damage or destroy the power switch 1108. Resistor R11 and capacitor C5 are used as a "snubber" to filter out transients or high frequency noise. R11 and C5 provide added protection for the MOSFET power switch 1108, especially in noisy environments.

Figure 12:
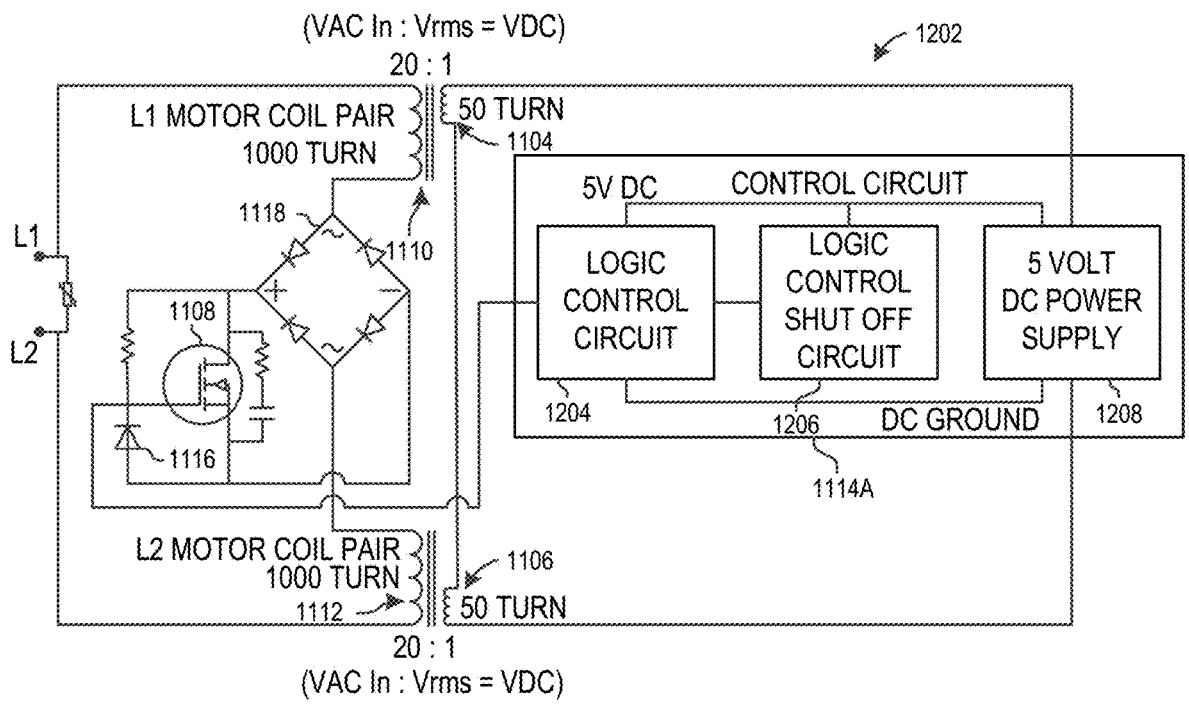
FIG. 12 depicts a divided phase winding circuit with a secondary coil and one power switch.

FIG. 12 depicts a divided phase winding circuit 1202 with a secondary coil 1104, 1106 and one power switch 1108. The circuit of FIG. 12 includes the same power switch(es) circuit of FIG. 11 and the same secondary coils 1104, 1106. In addition, the control circuit 1114A of FIG. 12 includes a logic control circuit 1204 to control operation of the motor, including through synchronous speed, a logic control shut off circuit 1206 to control when the power switch(es) circuit is turned off, and a non-collapsing DC power supply 1208 to supply DC power to the logic control circuit and login control shut off circuit. The logic control circuit 1204 and logic control shut off circuit 1206 may be configured as a single logic control circuit.

In one embodiment, one purpose of the divided phase windings circuit 1202 is to allow a motor to run synchronously to the AC power supply line frequency (for example, for a 4 pole motor, 60 Hz=1800 rpm and 50 Hz=1500 rpm). Without any control circuitry, the power switch(es) circuit would allow current to flow as if coil pairs L1 and L2 were shorted together through the power switch(es) circuit. The control circuitry turns the power switch(es) circuit off until the rotor is in the proper position compared to the line voltage. For this reason, in one aspect, the power switch(es) circuit is rated for the AC power supply line voltage. The control circuitry components can all be at the logic level voltage (VCC).

Logic power is supplied by secondary coils 1104, 1106 that are wound on the same poles as the primary motor coils 1110, 1112. Secondary coils 1104, 1106 could be wound on any number of poles as long as the secondary power meets logic power requirements. In one example, the control circuit is only needed to start the motor and bring it to synchronous speed, and the logic control shut off circuit optionally is included to shut off the main control circuit. The logic control shut off circuit is optional. By shutting the control circuit off, the power switch(es) circuit will allow full line power to the motor minus any losses in the power switch(es) circuit. This will increase total efficiency and the life of components especially when the motor runs for long periods.

Figure 13:
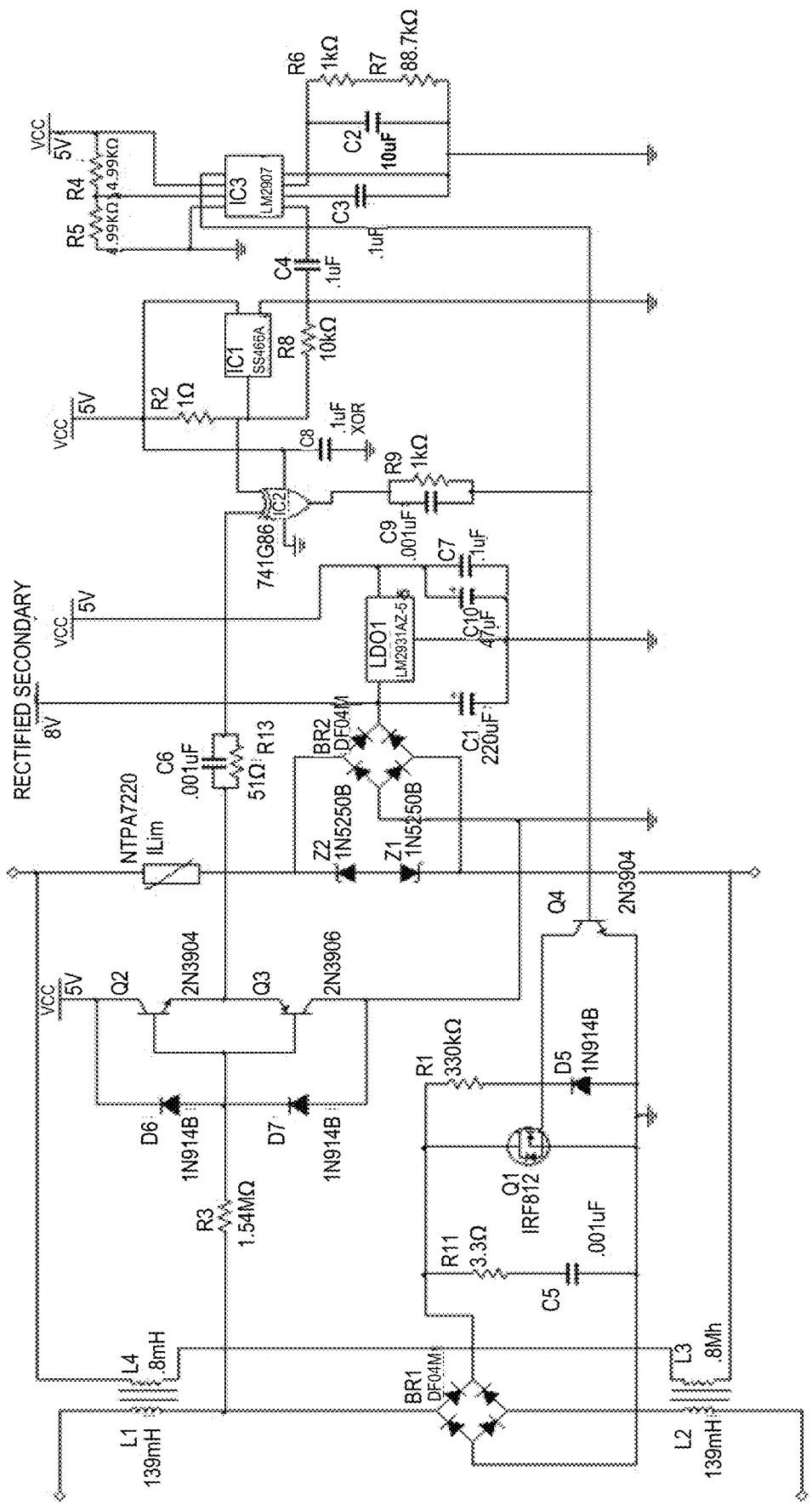
FIGS. 13 and 13A depict a divided phase winding circuit with a secondary coil and one power switch.
Figure 13A:
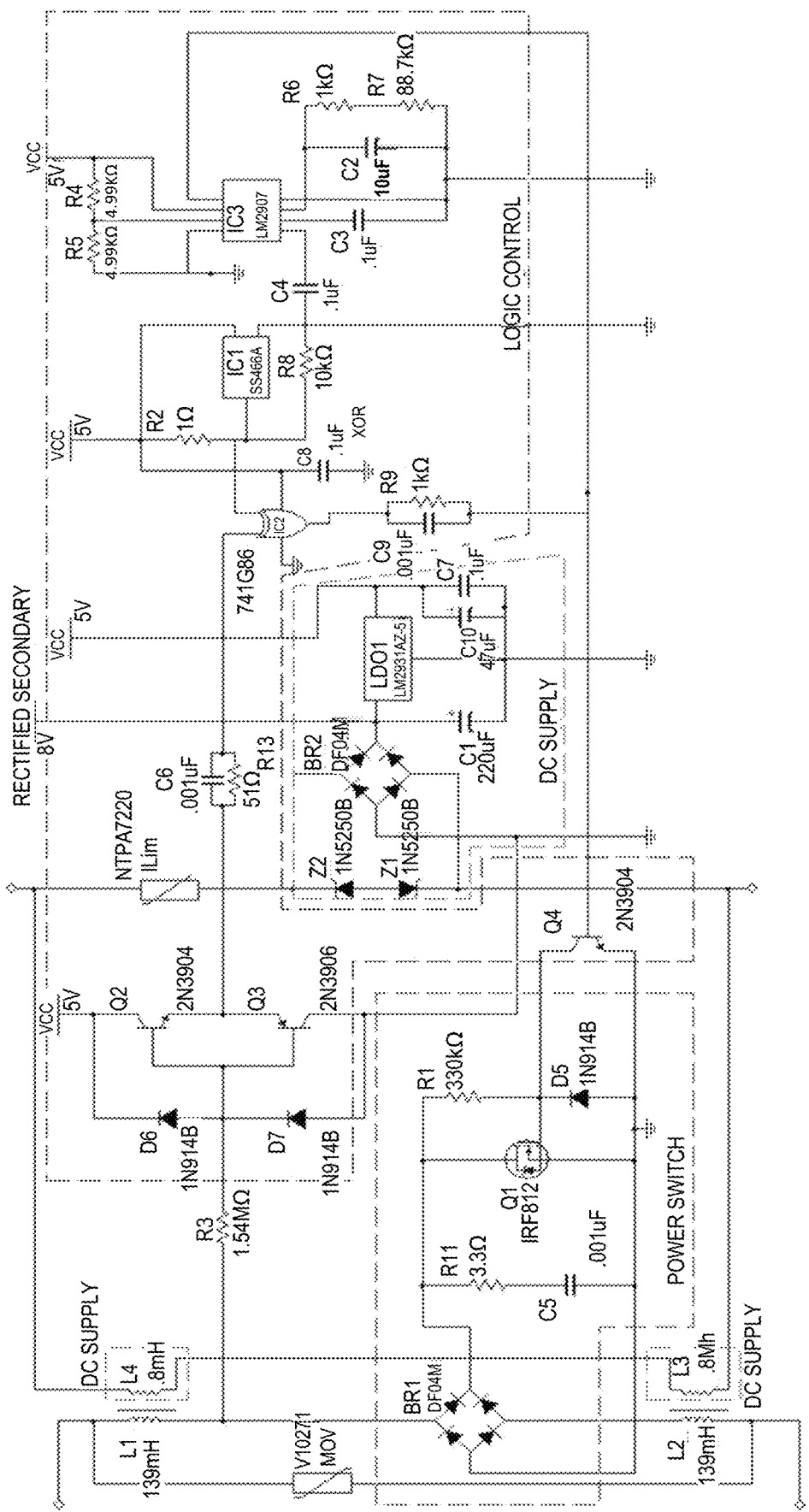

FIGS. 13 and 13A depict a divided phase winding circuit with a secondary coil and one power switch. The circuit has two AC supply line inputs L1 and L2, which are connected to an AC power source during operation of the motor.

Power Switches Circuit

The power switch(es) circuit has a full wave bridge rectifier BR1 and a MOSFET power switch Q1. The full wave bridge rectifier BR1 guarantees that no negative voltage will be supplied to the drain (top) of the power switch Q1. The full wave bridge rectifier BR1 also guarantees that no positive voltage will be supplied to the source (bottom) of the power switch Q1 so that current can only flow from the drain to the source of the power switch Q1 when biased by a positive voltage on the gate of the power switch Q1 via resistor R1. A positive rectified AC power supply is present at the drain of the power switch Q1, the power switch Q1 is biased by the same voltage signal via resistor R1. Diode D5 protects the gate of the power switch Q1 by guaranteeing that any voltage on the gate of the power switch Q1 will be greater than −0.7 VDC, as anything less could damage or destroy the power switch Q1. Resistor R11 and capacitor C5 are used as a "snubber" to filter out transients or high frequency noise. R11 and C5 provide added protection for the MOSFET power switch Q1, especially in noisy environments.

DC Power Supply

As soon as power is applied to the motor and current is flowing through the motor phase windings (motor primary coils), there is power on the secondary windings (secondary coils) in the same manner as the operation of a transformer. The value of voltage on the secondary coils is directly proportional to the input voltage and the primary coils to secondary coils turn count ratio. Using the example in FIG. 11, if the input voltage to the primary coils is 120 VAC and the turn count ratio from the primary coils to the secondary coils is 20:1, then the voltage on the secondary coils would calculate to approximately 6 VAC minus any losses. Power from the secondary coils is supplied directly from the secondary coils to the DC power supply. The full wave bridge rectifier BR2 rectifies the low voltage AC power supply from the secondary coils. The full wave bridge rectifier BR2 can be a low power component based on the DC supply requirements.

Zener diodes Z1 and Z2 are connected in series with each other anode to anode, and each cathode is connected to the AC power supply inputs of the full wave bridge rectifier BR2. This method is used to protect the full wave bridge rectifier BR2 from AC power supply inputs that could exceed maximum ratings for the component. The negative output from the full wave bridge rectifier BR2 is connected to the circuit ground, which is also connected to the same ground as the power switch block. The positive output from the full wave bridge rectifier BR2 is connected to the low drop-out regulator LDO1 and capacitor C1. Capacitor C1 is provided to smooth the rectified AC power supply signal going to the input of the low drop-out regulator LDO1. A bypass capacitor C7 could be used on the output of the low drop-out regulator LDO1 to help reduce noise on the positive DC rail (VCC). Also, a larger capacitor C10 could be used on the output of the low drop-out regulator LDO1 to smooth the positive DC rail and ensure power during some low voltage situations. C7 and C10 are not required but are provided to add reliability and protection for low voltage DC components, especially in a noisy environment.

Logic Control Circuit/Motor Controller

The logic control circuit (motor controller) controls switching for the power switch(es) circuit based on timing of the AC supply line input frequency and rotor position. Timing of the AC supply line input frequency is sensed using an AC buffer that consists of bi-polar junction transistors (BJTs) Q2 and Q3 and diodes D6 and D7. Current to the AC buffer input is limited by a high value resistor R3. Diode D6 ensures that the AC buffer input is not greater than the positive DC supply voltage. Diode D7 ensures the AC buffer input is greater than −0.7 volts referenced to the DC supply ground.

When the input to the AC buffer is logic high, BJT Q2 is biased, and the output of the AC buffer is also logic high. When the input to the AC buffer is logic low, BJT Q3 is biased, and the output of the AC buffer is logic low. The output of the AC buffer is connected to a filter consisting of capacitor C6 and resistor R13. The filter is not required but provides protection and reliability in noisy environments.

Rotor magnet polarity is sensed using Hall-effect switch IC1. Though, another switch or sensing device may be used to sense rotor magnet polarity and/or rotor position and/or determine speed and/or determine rotor revolutions. The Hall-effect switch IC1 is an open-collector output and therefore requires a pull-up to the positive DC rail (VCC). Resistor R2 provides the pull-up required for the open-collector output.

The output of the Hall-effect switch IC1 and the output of the AC buffer are compared using a single circuit logic XOR IC2. The output of the XOR IC2 is the difference between the Hall-effect switch IC1 and the AC buffer, which will bias MOSFET power switch Q1 of the power switch(es) circuit. When the Hall-effect switch IC1 output is logic low, the power switch Q1 will only be biased when the AC supply input L1 to the motor is negative. When the output of the Hall-effect switch IC1 is logic high, the power switch Q1 will only be biased when the AC supply input L1 to the motor is positive. During motor start up, there can be multiple input AC cycles where either only the positive or only the negative inputs from AC supply input L1 will pass through the power switch Q1.

Using the power switch Q1, waveforms can be "chopped" or shut off at any time when the drain and gate voltage of the power switch Q1 is above biasing voltage. For example, see FIG. 7. The gate of the power switch Q1 is held logic low when the output of the XOR IC2 is logic high by biasing BJT Q4. When BJT Q4 is biased, any current flowing from resistor R1 will bypass the gate of the power switch Q1 and flow through BJT Q4 from collector to emitter electrically connecting the gate of the power switch Q1 to its source and will shut off the power switch Q1.

When the frequency of the Hall-effect switch IC1 matches the frequency of the input AC supply, the motor is running synchronously. If the motor is running synchronously, the control circuit is not needed until either the motor falls out of sync or the motor is stopped and restarted. When the voltage regulator IC3 senses synchronous speed or greater from the Hall-effect switch IC1, the output of the XOR IC2 is held logic low via the open-collector output of the voltage regulator IC3. When the voltage regulator IC3 senses a speed that is less than that of the input AC supply, the open-collector output of the voltage regulator IC3 is off, which will leave the output of the XOR IC2 unaffected.

This method ensures that when the motor is running at a synchronous speed, the power switch Q1 is not shut off by the logic control. But, if the motor slows down below synchronous speeds, then the logic controller will control the motor timing as it does for start-up. Using this method improves overall motor efficiency and the expected lifetime of components in the circuit.

External components are used to set timing for the voltage regulator IC3. Resistors R4, R5, R6 and R7 may be 1% tolerance so that the voltage regulator IC3 operates within accurate parameters. Capacitor C1 operates in conjunction with the resistors R6 and R7 to set the frequency at which the open-collector output of the voltage regulator IC3 will turn on. Capacitor C3 is used for an internal charge pump in the voltage regulator IC3. Capacitor C4 is used to AC couple the input to the voltage regulator IC3 since the voltage regulator IC3 will only detect frequencies that have a zero-voltage crossing. Resistor R8 limits current to the AC couple capacitor C4 at the input of the voltage regulator IC3.

Figure 14:
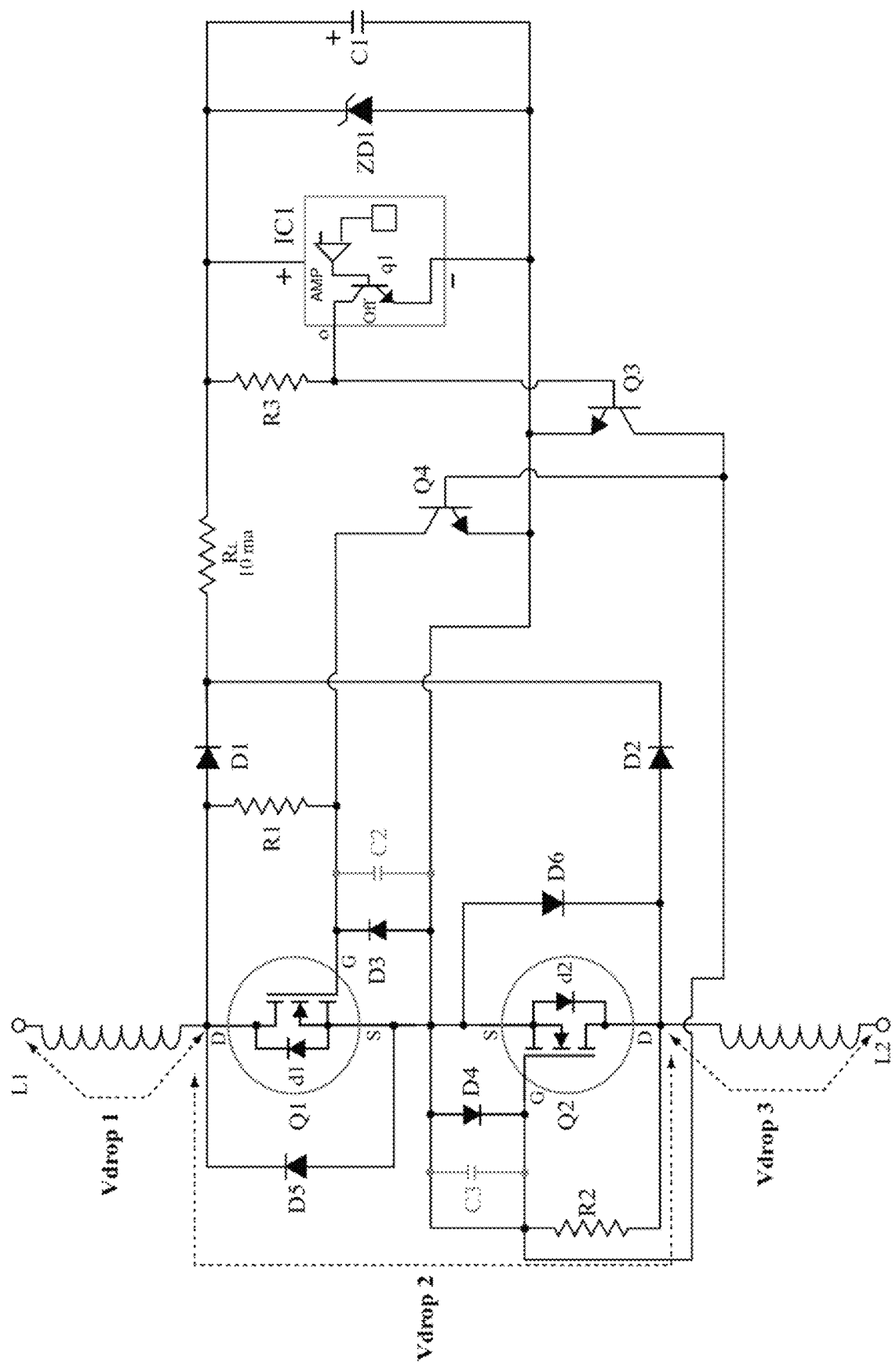
FIG. 14 depicts a divided phase winding circuit with two power switches.

FIG. 14 depicts a divided phase winding circuit with two power switches.

Figure 15:
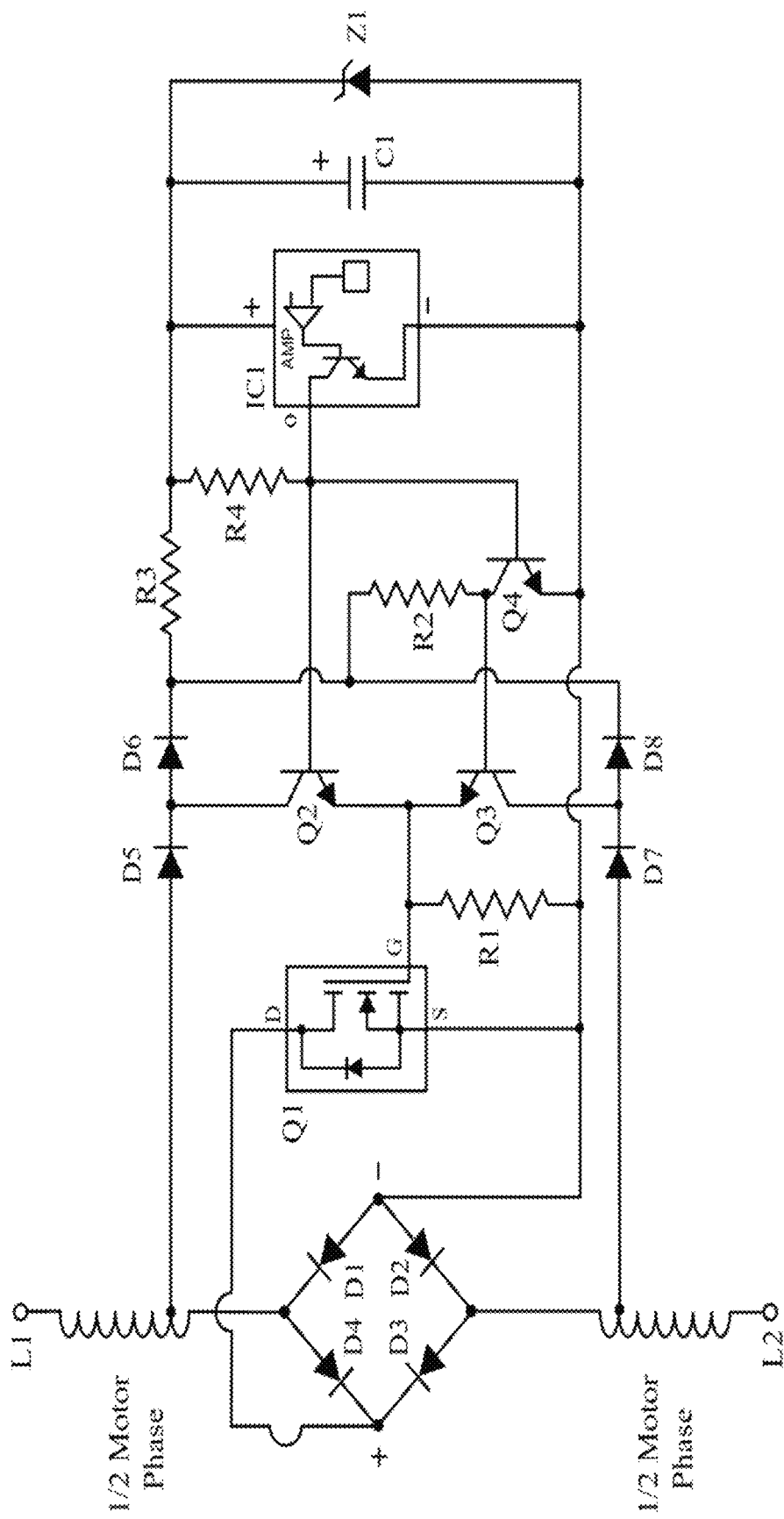
FIG. 15 depicts a divided phase winding circuit with one power switch.

FIG. 15 depicts a divided phase winding circuit with one power switch.

Figure 16:
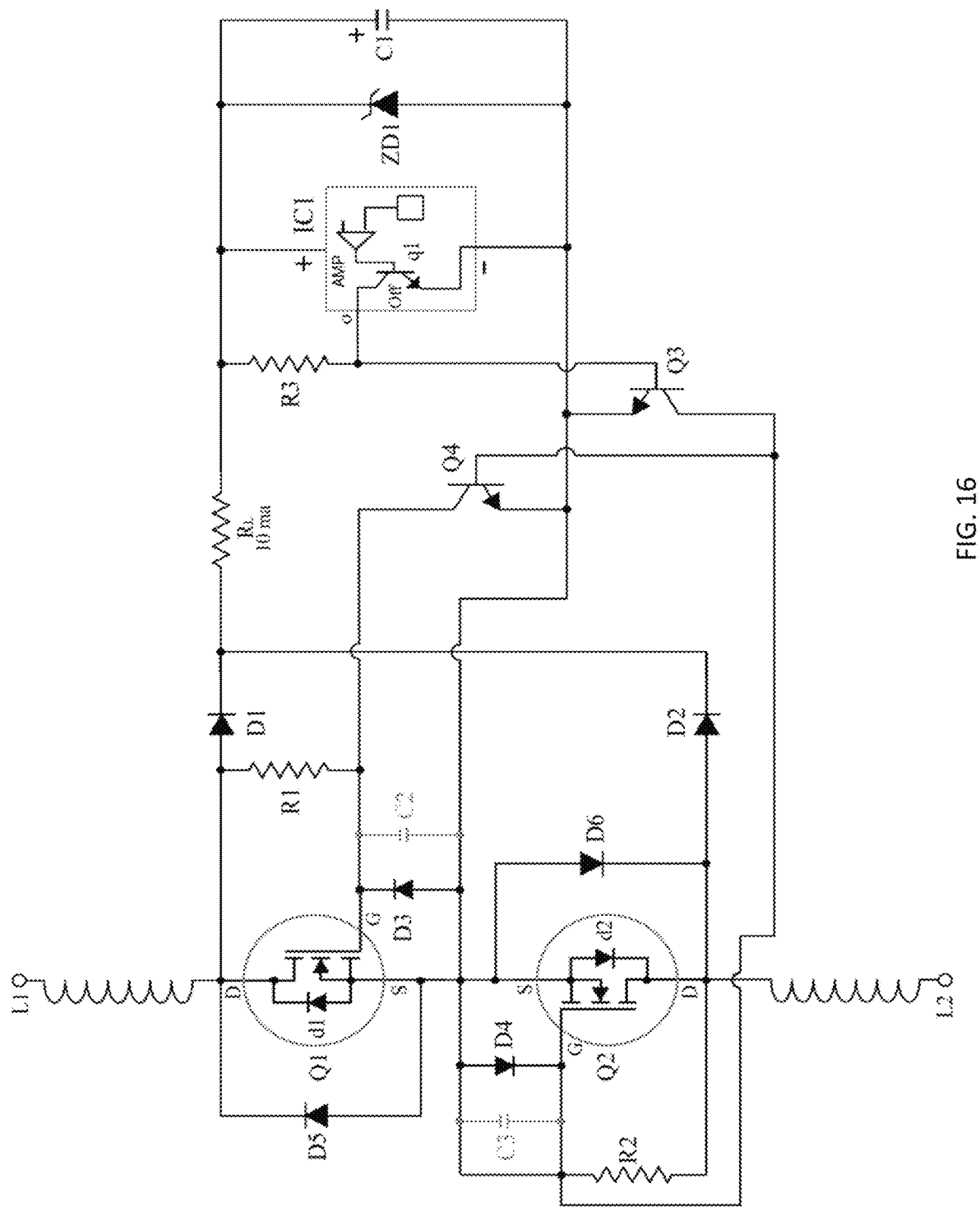
FIG. 16 depicts a divided phase winding circuit with two power switches in series.

FIG. 16 depicts a divided phase winding circuit with two power switches in series. Diodes D1 and D2 are 1N4003 diodes and diodes D3 & D4 are 1N914 diodes. Transistors Q3 and Q4 are 2N3904. IC1 is a Hall-effect switch/sensor. Diodes D5 and D6 are used to increase the current capacity for the internal diodes in switches Q1 and Q2 (d1 & d2) if the phase current exceeds the internal diodes forward current rating. Capacitors C2 and C3 are used to create a 'turn on' delay for switches Q1 and Q2 to add additional charge time for capacitor C1 if necessary to insure a solid 3.3 VDC or 5 VDC supply for Hall switch/sensor IC1, depending upon the device choice for Hall switch/sensor IC1. In prior systems, 5 VDC was necessary to switch on the logic level power MOSFET switch. Capacitors C2 and C3 are optional in one embodiment.

Diodes D1, D2, d1, and d2 perform the rectification of the AC power for the DC power supply for Hall switch/sensor IC1.

Zener diode ZD1 provides the voltage regulator for the Hall switch/sensor IC1's DC power supply.

RL provides current limiting for the DC power supply. In one example, it is set to approximately limit the current to 10 mA. The Hall switch/sensor IC1 uses 6 mA of DC current, including the base drive current for the internal open collector output transistor. Additional DC current will be used to turn on switch Q3 and is supplied through the pull up resistor R3. The collector to emitter current for switch Q3 and the base and collector to emitter current for switch Q4 is not supplied by the DC power supply but is supplied by the current through the motor phase windings. It is preferable to assure that transistors Q3 and Q4 turn completely 'off' at the proper times. In one embodiment that the switches turn fully 'on' or in saturation at the proper times for maximum operational efficiency.

Figure 17:
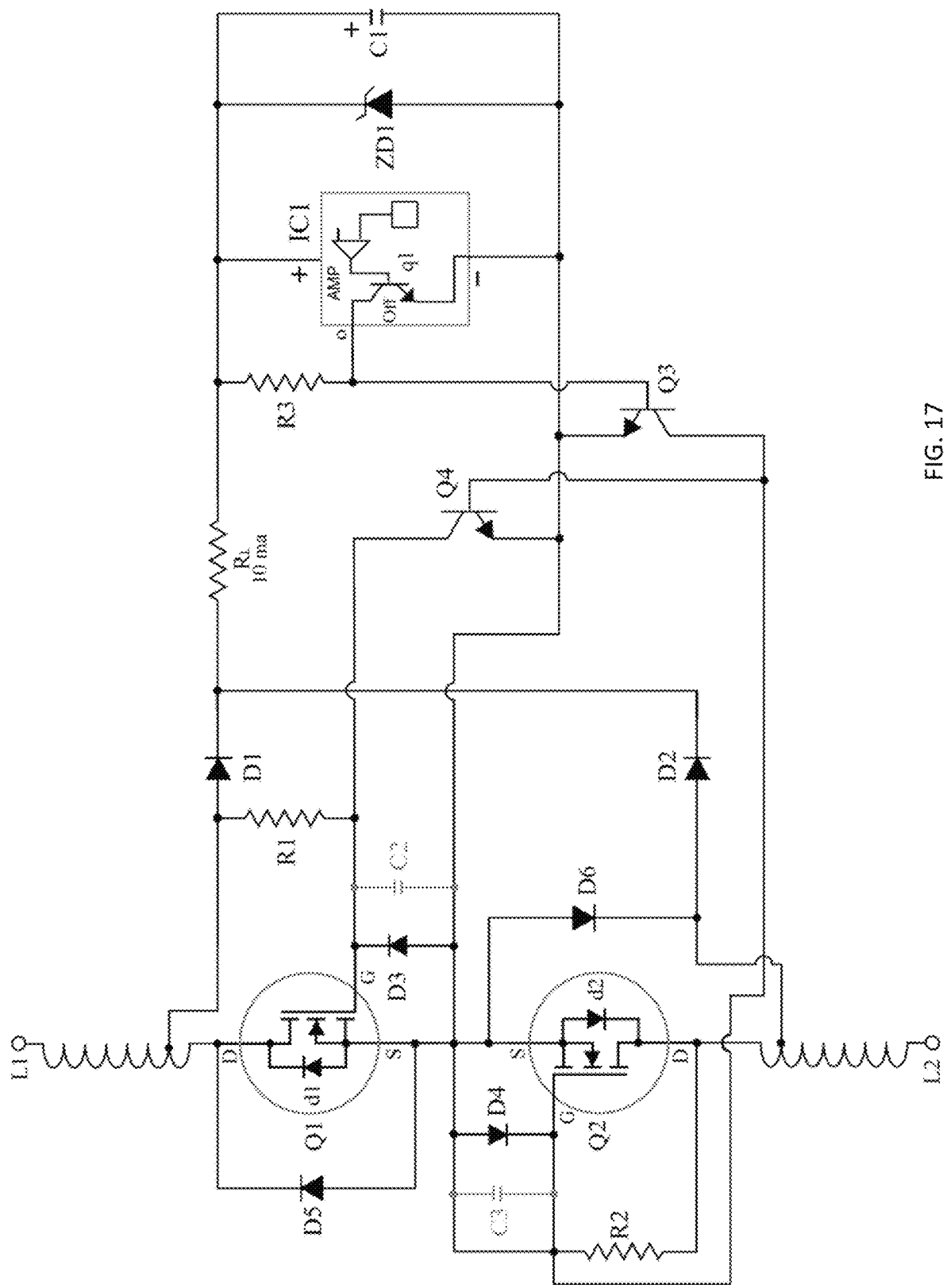
FIG. 17 depicts a divided phase winding circuit with a tap from the divided phase winding coil to the direct current (DC) power supply and two power switches in series.

FIG. 17 depicts a divided phase winding circuit with a tap from the divided phase winding coil to the direct current (DC) power supply and two power switches in series.

Figure 18:
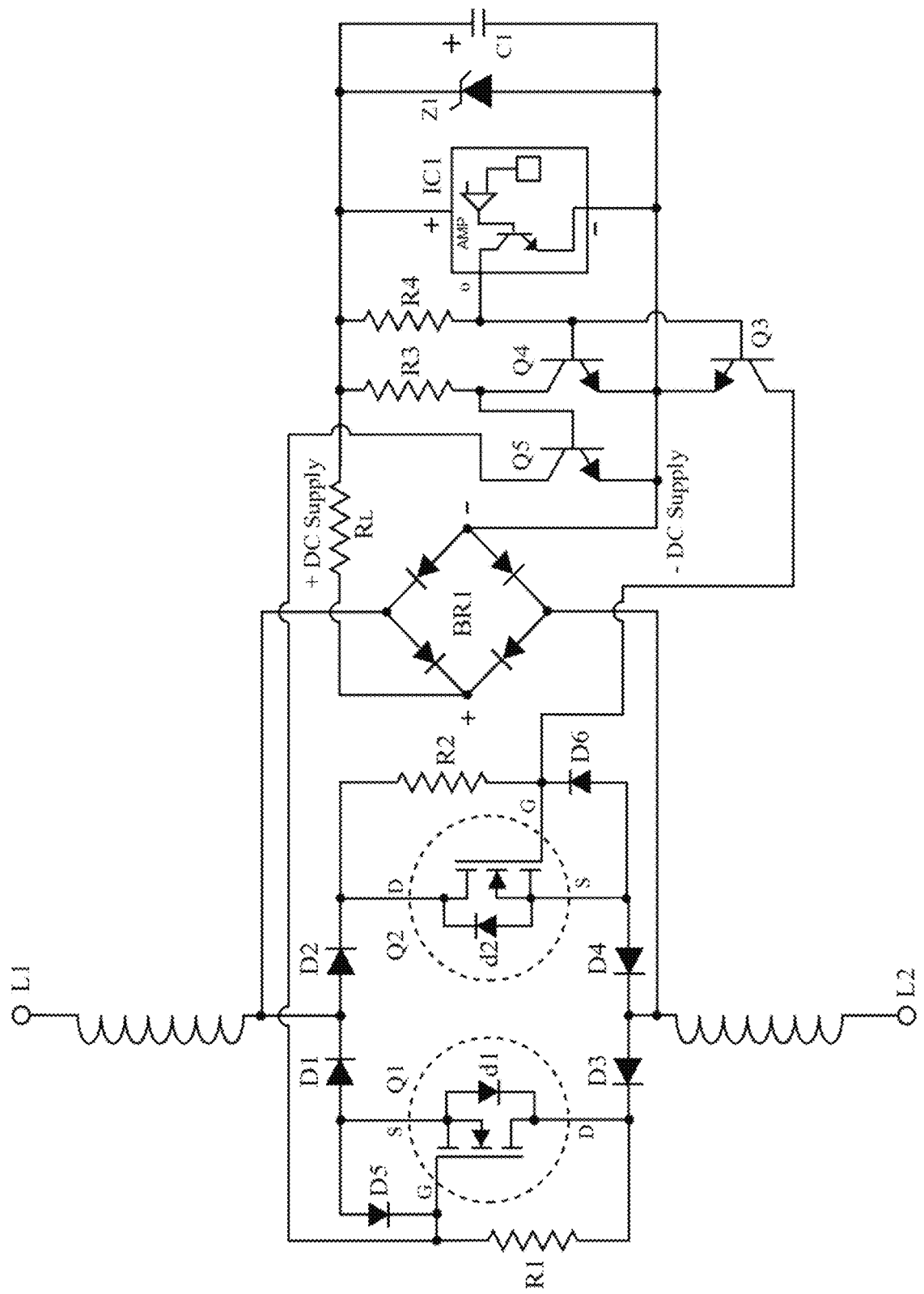
FIG. 18 depicts a divided phase winding circuit with two power switches in parallel.

FIG. 18 depicts a divided phase winding circuit with two power switches in parallel.

Figure 19:
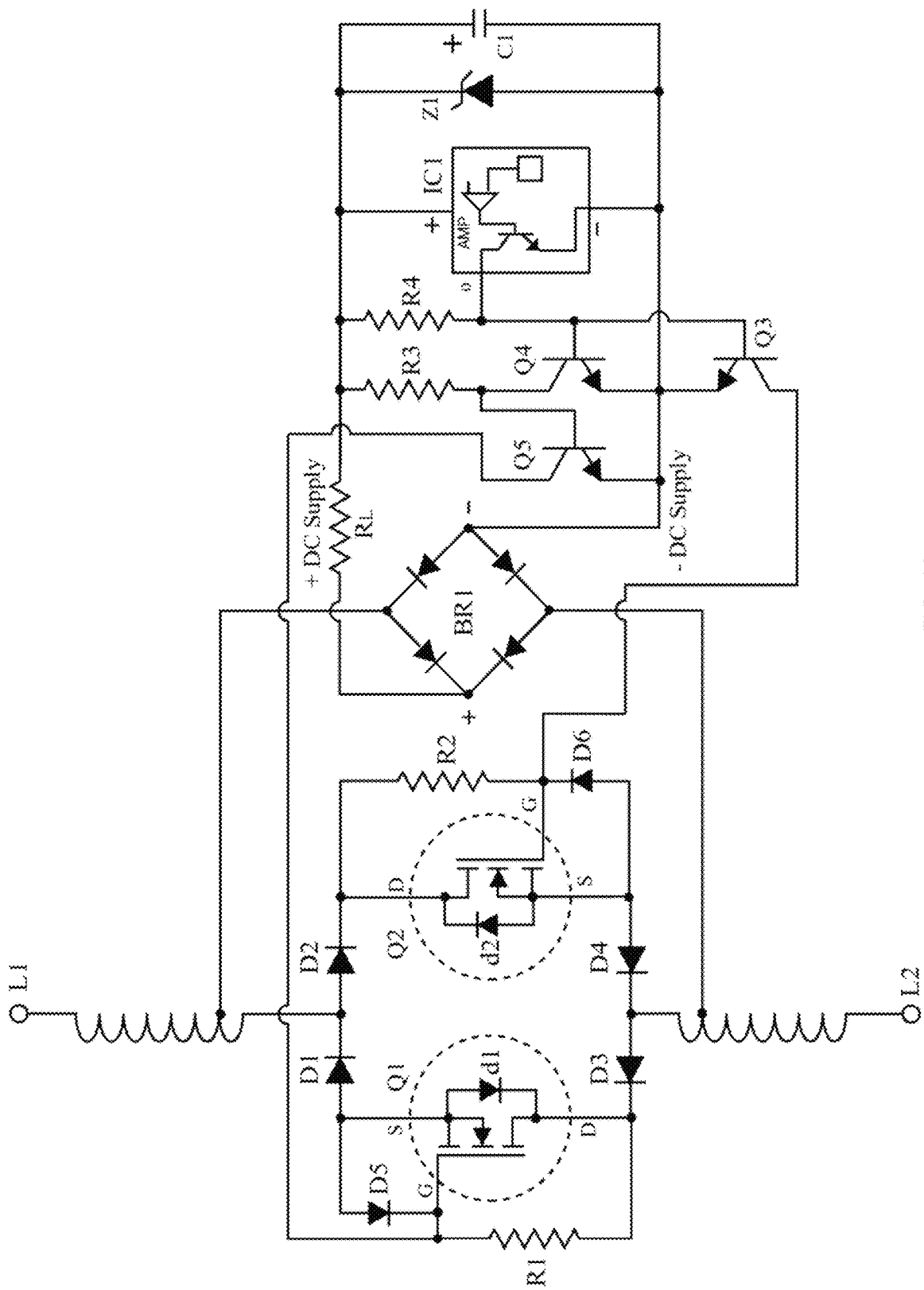
FIG. 19 depicts a divided phase winding circuit with a tap from the divided phase winding coil to the direct current (DC) power supply and two power switches in parallel.

FIG. 19 depicts a divided phase winding circuit with a tap from the divided phase winding coil to the direct current (DC) power supply and two power switches in parallel.

Figure 20:
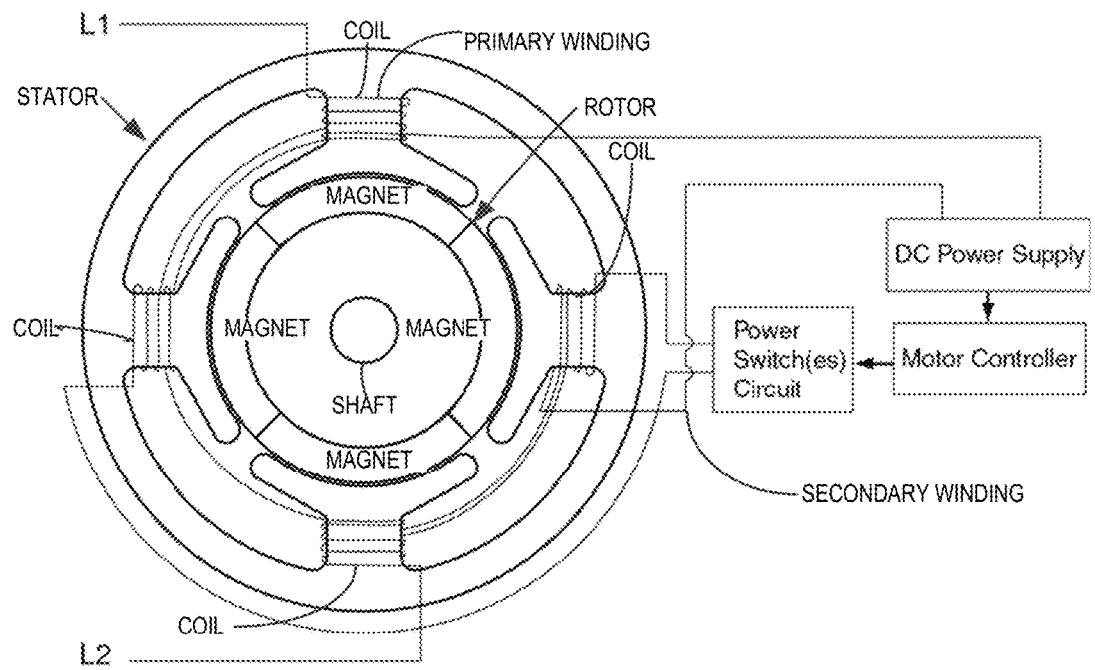
FIG. 20 depicts a motor with a divided phase winding circuit having a primary AC phase winding and secondary winding to create a non-collapsing DC power supply.

FIG. 20 depicts a motor 2002 with a divided phase winding circuit having a primary AC phase winding 2004 and a secondary winding 2006 (i.e. one or more secondary coils) to create a non-collapsing DC power supply. In the motor of FIG. 20, the secondary winding 2006 is wound on all poles. However, the secondary winding 2006 can be wound on just one pole, two poles, three poles, or another number of poles. The secondary winding is connected in series with the primary phase winding 2004 in the motor 2002 of FIG. 20. However, the secondary winding 2006 also may be connected in parallel or with a combination of both series and parallel. The motor of FIG. 20 is a four pole permanent magnet synchronous motor. The synchronous speed for the motor when operating at 60 Hz AC is 1800 RPM.

Figure 21:
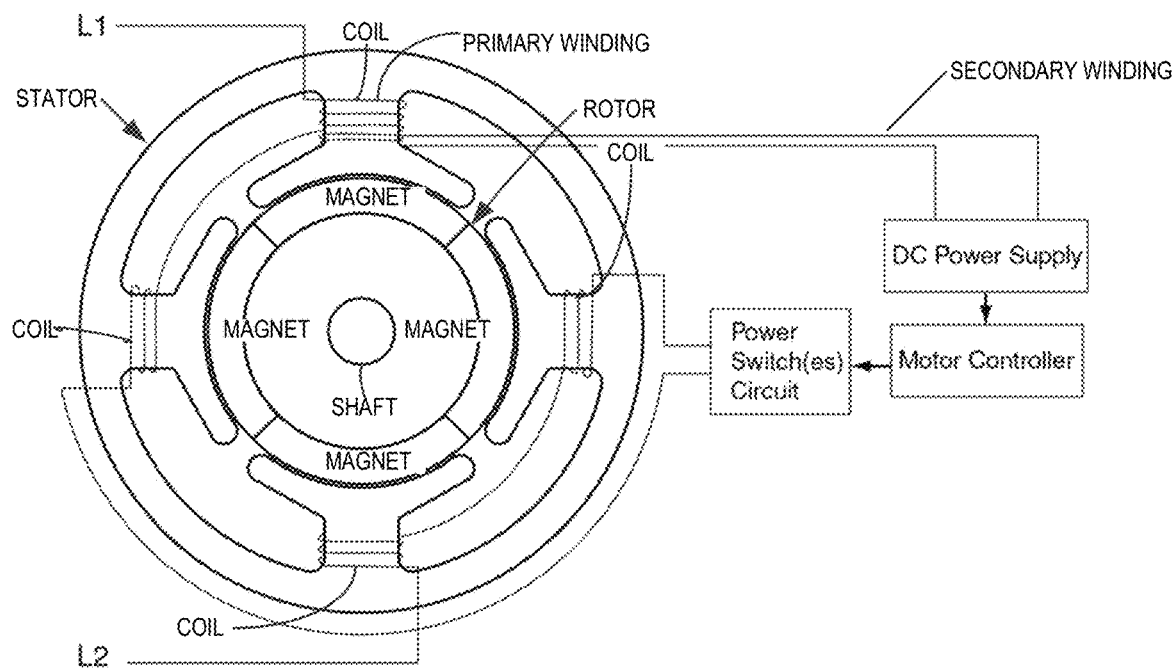
FIG. 21 depicts a motor with a divided phase winding circuit having a primary AC phase winding and secondary winding to create a non-collapsing DC power supply wound on only one pole.

FIG. 21 depicts a motor 2102 with a divided phase winding circuit having a primary AC phase winding 2104 and a secondary winding 2106 (i.e. one or more secondary coils) to create a non-collapsing DC power supply wound on only one pole. The motor 2102 of FIG. 21 is a four pole permanent magnet synchronous motor. The synchronous speed for the motor when operating at 60 Hz AC is 1800 RPM.

Figure 22:
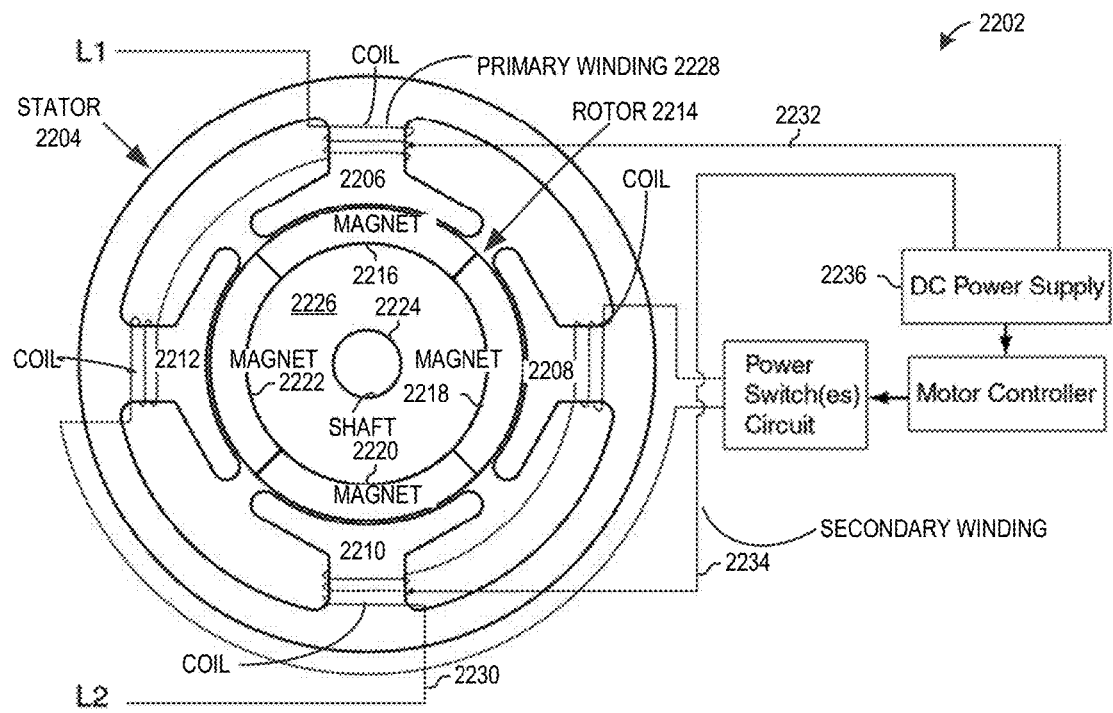
FIG. 22 depicts a motor with a divided phase winding circuit with a tapped primary phase winding to create a non-collapsing DC power supply.

FIG. 22 depicts a motor 2202 with a divided phase winding circuit with a tapped primary phase winding to create a non-collapsing DC power supply. The motor 2202 of FIG. 22 is a four pole permanent magnet synchronous motor. The synchronous speed for the motor when operating at 60 Hz AC is 1800 RPM.

The motor has a stator 2204 with 4 poles 2206-2212 and a rotor 2214 with 4 magnets N, S, N, S 2216-2222 facing the stator. The motor 2202 has a shaft (center circle) 2224 and rotor back iron (the area between the shaft and the magnets) 2226. The primary divided phase windings 2228, 2230 are connected to an AC power supply at L1 and L2, respectively. A secondary winding 2232, 2234 is connected to the DC power supply 2236.

Figure 23:
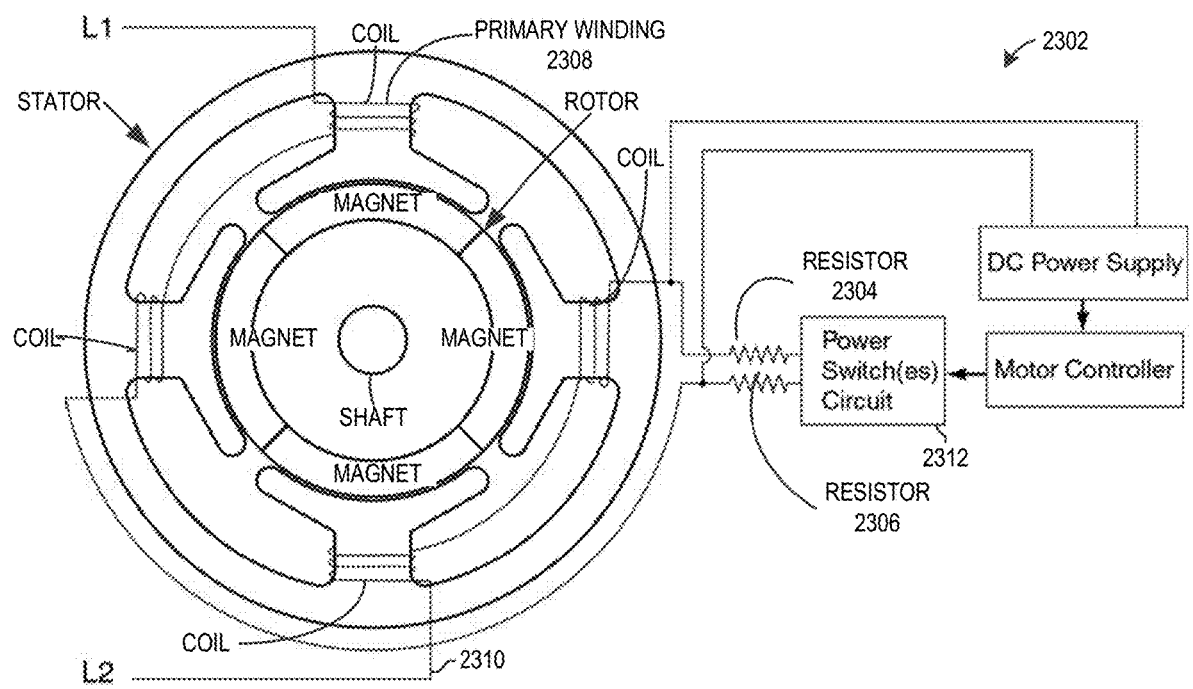
FIG. 23 depicts a motor with a divided phase winding circuit with resisters to create a non-collapsing DC power supply.

FIG. 23 depicts a motor with a divided phase winding circuit 2302 with resisters 2304, 2306 between the divided phase windings 2308, 2310 and the power switch(es) circuit 2312 to create a non-collapsing DC power supply. The motor of FIG. 23 is a four pole permanent magnet synchronous motor. The synchronous speed for the motor when operating at 60 Hz AC is 1800 RPM.

Figure 24:
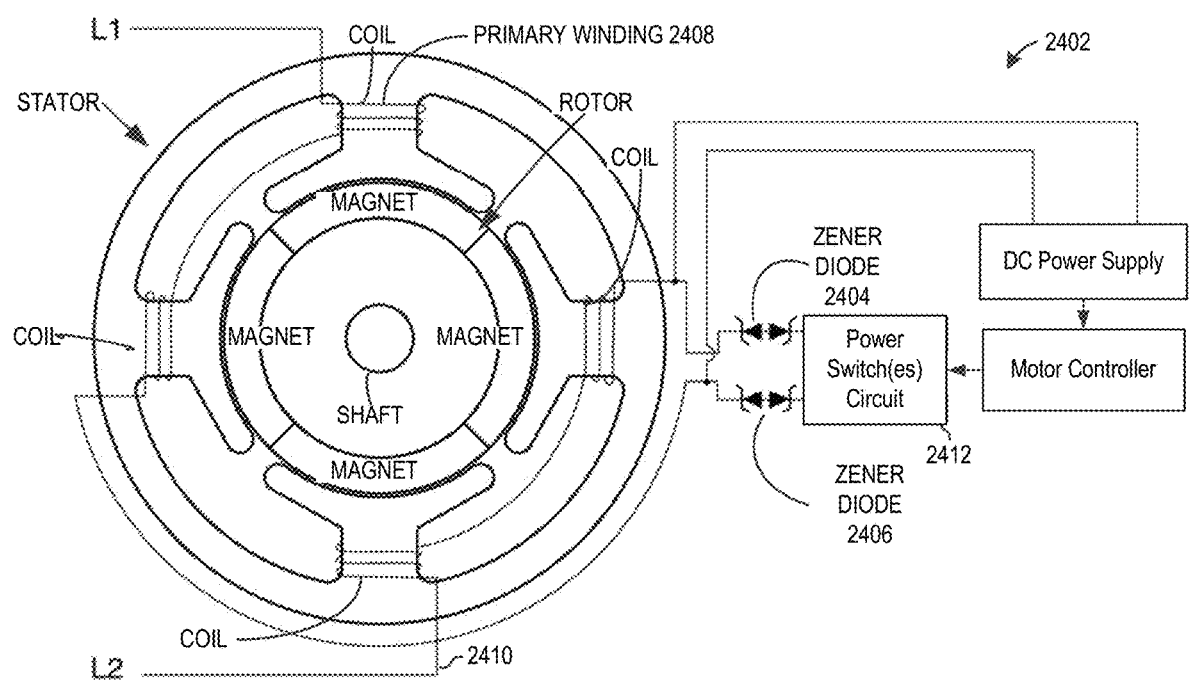
FIG. 24 depicts a motor with a divided phase winding circuit with Zener diodes to create a non-collapsing DC power supply.

FIG. 24 depicts a motor with a divided phase winding circuit 2402 with Zener diodes 2404, 2406 between the divided phase windings 2408, 2410 and the power switch (es) circuit 2412 to create a non-collapsing DC power supply. The motor of FIG. 24 is a four pole permanent magnet synchronous motor. The synchronous speed for the motor when operating at 60 Hz AC is 1800 RPM.

The circuits of FIGS. 25-34 depict divided phase winding circuits that may be used with one or more motors, such as one or more motors described herein. These circuits include motor phase windings for a motor that are divided into four parts, with two motor phase windings forming one half of the motor phase windings of the circuit and two other motor phase windings forming the other half of the motor phase windings of the circuit. By adding a connection between two motor phase windings (coils) in each half of the motor phase windings from the motor controller/motor control circuit, the motor can operate using only 2 of the 4 coils for startup. This is beneficial for startup because it decreases overall motor coil impedance, which will increase current and increase torque. Since current rises, efficiency can be reduced to at or under a selected acceptable percentage. The divided phase winding circuits provide, in some embodiments, startup torque at low input voltages.

Figure 25:
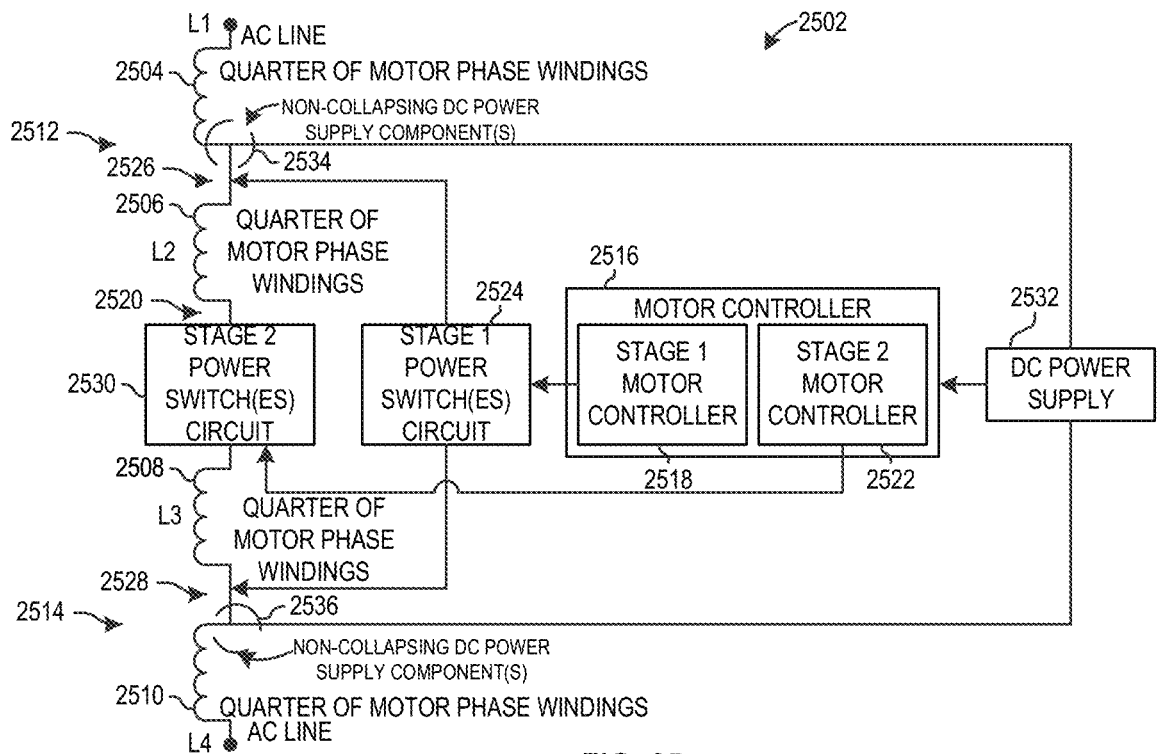
FIGS. 25-34 depict divided phase winding circuits with four coils and two stages for the power electronics.

Referring to the circuit of FIG. 25, the divided phase winding circuit 2502 has four divided motor phase windings 2504-2510. Two of the motor phase windings 2504-2506 form one half 2512 of the motor phase windings of the circuit 2502, and two other motor phase windings 2508-2510 form the other half 2514 of the motor phase windings of the circuit. The motor controller 2516 for the motor has two stages, with a first stage (stage 1) 2518 of the motor controller placed at a "mid-point" or "center point" 2520 in the supply line voltage between the two halves 2512-2514 of the divided motor phase windings 2504-2510, and a second stage (stage 2) 2522 of the motor controller placed at a "mid-point" or "center point" in the supply line voltage between the two halves of the divided motor phase windings.

The power electronics for the motor have two stages, with a first stage (stage 1) power switch(es) circuit/power electronics 2524 placed at a midpoint or center 2526, 2528 between two of the divided motor phase windings 2504-2506 and 2608-2610, respectively, on each half 2512-2514 of the motor phase windings (i.e. "quarter-point"). The stage 1 power switch(es) circuit activates the first (L1) and fourth (L4) coils 2504, 2510. The stage 1 power switch(es) circuit 2524 may be, for example, one or more switches, such as one or more MOSFETs or other switches, and is controlled by the stage 1 motor controller 2518.

A second stage (stage 2) power switch(es) circuit/power electronics 2530 is placed at a "mid-point" 2520 in the supply line voltage between the two halves 2512, 2514 of the divided motor phase windings 2504-2510. The stage 2 power switch(es) circuit 2530 activates the second (L2) and third (L3) coils 2506-2508. The stage 2 power switch(es) circuit 2530 may be, for example, one or more switches, such as one or more solid state relays (SSRs), quad solid state relays (QSSRs), or other switches, and is controlled by the stage 2 motor controller 2518. The direct current (DC) power supply 2532 (e.g. for the electronics used in the motor controller) is also located between the divided motor phase windings 2504-2510, between the two halves 2512-2514 of the divided motor phase windings and/or at a midpoint or center 2526-2528 between two of the divided motor phase windings 2504-2506 or 2508-2510 on each half 2512, 2514 of the motor phase windings.

The divided phase winding circuit 2502 includes one or more non-collapsing DC power supply components 2534, 2536 (components to prevent the DC voltage from the DC power supply from being reduced to or below the switch 'on' resistance times the current through the power switch (es), which is close to zero), including voltage drop components or direct DC power supply powering components to create a non-collapsing DC power supply. Examples of non-collapsing DC power supply components 2534, 2536 include a tap from one or more of the primary phase windings 2504-2510 electrically connected to the DC power supply 2532, a tap from the outer primary divided phase windings (coil L1 and coil L4) 2504 and 2510 electrically connected to the DC power supply 2532, a secondary phase coil winding connected to the DC power supply to power the power supply, a secondary phase coil electrically connected from the outer primary divided phase windings (coil L1 and coil L4) 2504 and 2510 to the DC power supply 2532, resistors between the divided phase windings and one or more of the power switch(es) circuits, one or more resistors between the first and second divided phase windings (coil L1 and coil L2) and one or more resisters between the third and fourth divided phase windings (coil L3 and coil L4) 2506 and 2508 where the DC power supply also is electrically connected one on side between the first and second divided phase windings (coil L1 and coil L2) and one the other side between the third and fourth divided phase windings (coil L3 and coil L4), one or more Zener diodes between the divided phase windings and one or more of the power switch(es) circuits, one or more Zener diodes between the first and second divided phase windings (coil L1 and coil L2) and one or more Zener diodes between the third and fourth divided phase windings (coil L3 and coil L4) where the DC power supply also is electrically connected one on side between the first and second divided phase windings (coil L1 and coil L2) and one the other side between the third and fourth divided phase windings (coil L3 and coil L4), a non-saturated semiconductor or other resistive component between the divided phase windings and one or more of the power switch(es) circuits (e.g. in place of the one or more resisters or diodes above) where the resistance is high enough to create a significant voltage drop and where this voltage drop causes the DC power supply when the switch is 'on', or other components to create a voltage drop between the primary divided phase windings and one or more of the power switch(es) circuits to prevent the DC power supply from collapsing when the power switch(es) in the power switch(es) circuit is/are on and conducting. The divided phase winding circuit 2502 therefore provides a constant flow of power regardless of whether the power switch(es) circuit is on and conducting or off and not conducting.

Figure 26:
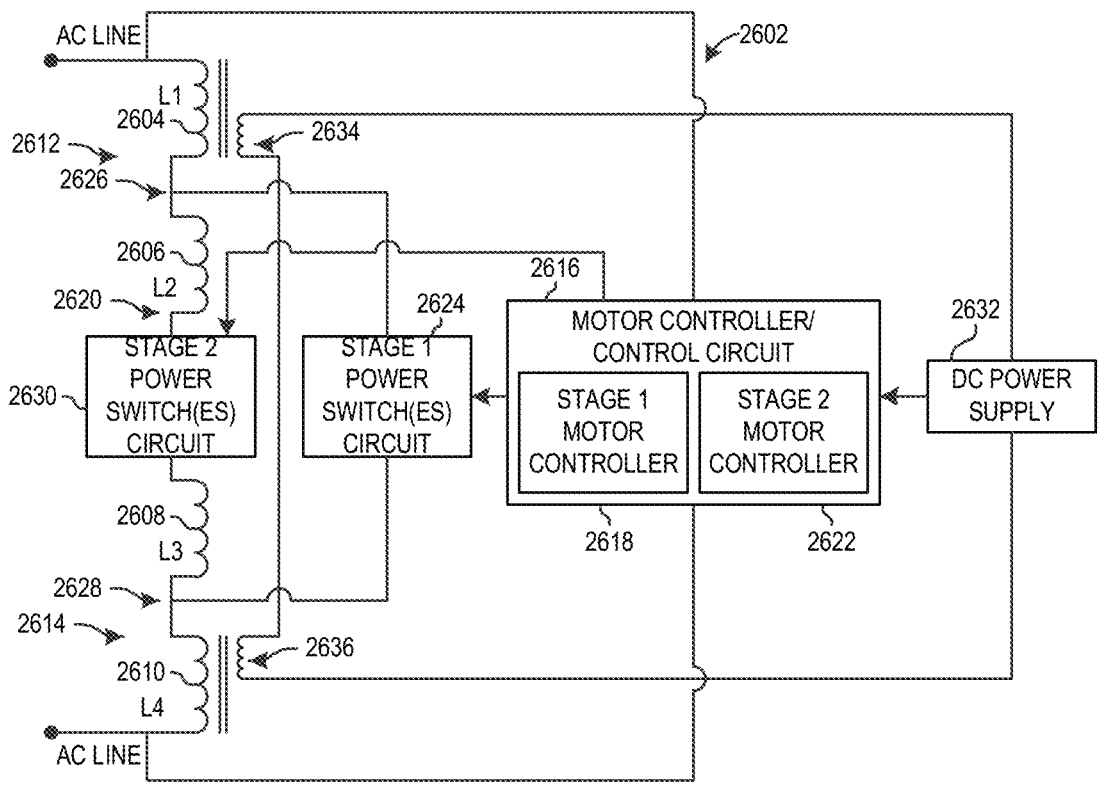
Figure 27:
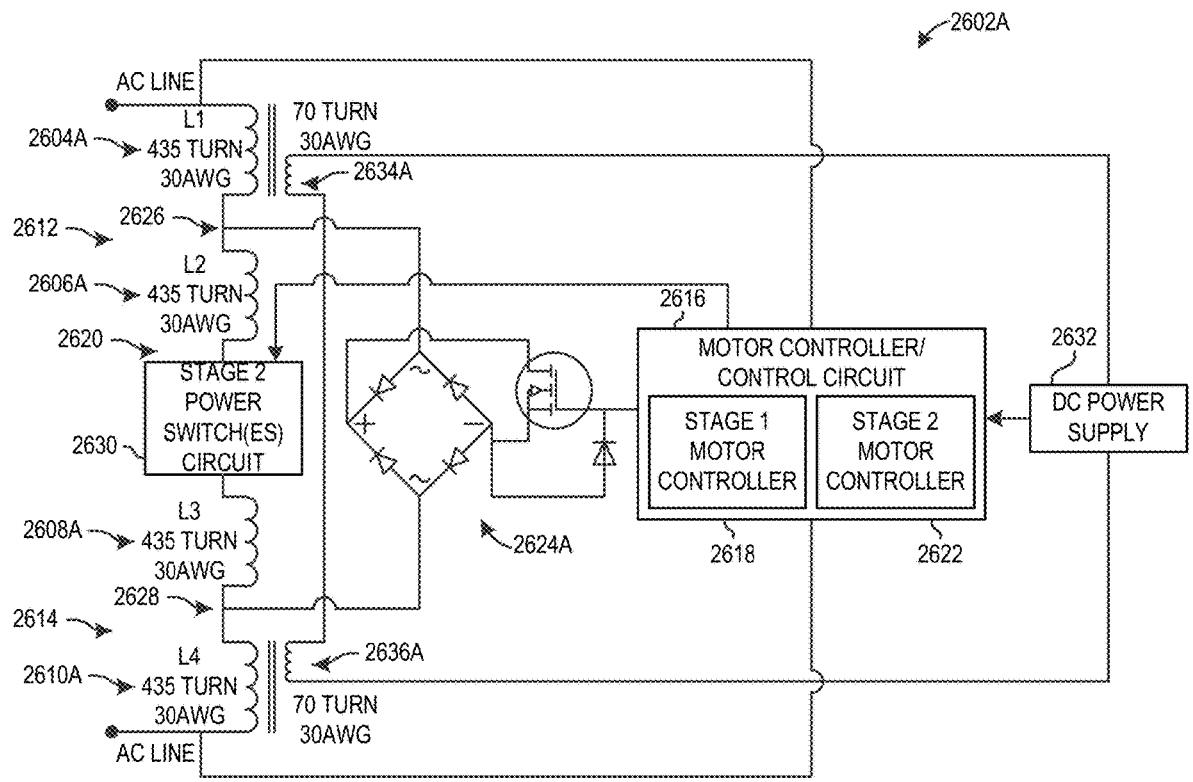

FIGS. 26 and 27 depict examples of divided phase winding circuits 2602 and 2702 with one or more secondary coils (also referred to as a secondary winding) electrically connected to the DC power supply to power the DC power supply and create a non-collapsing DC power supply (a DC power supply in which the DC voltage is not reduced to or below the switch(es) 'on' resistance times the current through the power switch(es), which is close to zero). The one or more secondary coils provide a low voltage power supply to the DC power supply 2632, such as when the motor is at start-up. The one or more secondary coils also act as a high frequency noise filter to filter out high frequency noise from the low power voltage supplied to the DC power supply.

Referring to FIG. 26, the divided phase winding circuit 2602 has four divided motor phase windings 2604-2610. Two of the motor phase windings 2604-2606 form one half 2612 of the motor phase windings of the circuit 2602, and two other motor phase windings 2608-2610 form the other half 2614 of the motor phase windings of the circuit. The control logic/motor controller 2616 for the motor has two stages, with a first stage (stage 1) 2618 of the motor controller placed at a "mid-point" or "center point" 2620 in the supply line voltage between the two halves 2612-2614 of the divided motor phase windings 2604-2610, and a second stage (stage 2) 2622 of the motor controller also placed at a "mid-point" or "center point" in the supply line voltage between the two halves of the divided motor phase windings.

The power electronics for the motor have two stages, with a first stage (stage 1) power switch(es) circuit/power electronics 2624 placed at a midpoint or center 2626, 2628 between two of the divided motor phase windings 2604-2606 and 2608-2610, respectively, on each half 2612-2614 of the motor phase windings (i.e. "quarter-point"). The stage 1 power switch(es) circuit 2618 activates the first (L1) and fourth (L4) coils 2604, 2610. The stage 1 power switch(es) circuit 2624 may be, for example, one or more switches, such as one or more MOSFETs or other switches, and is controlled by the stage 1 motor controller 2218. In one example, the stage 1 power switch(es) circuit 2618 includes one or more Zener diodes or other voltage regulator and a power switch in parallel. Whereas, prior systems included the power circuit in series with other components. Because the power switch is in parallel with the one or more Zener diodes and not in series, it can always be on. However, if the power switch is off, current can still flow through the Zener diode.

A second stage (stage 2) power switch(es) circuit/power electronics 2630 is placed at a "mid-point" 2620 in the supply line voltage between the two halves 2612, 2614 of the divided motor phase windings 2604-2610. The stage 2 power switch(es) circuit 2630 is electrically connected to the inner primary divided phase windings (second coil L2 and third coil L3) 2606 and 2608, and the stage 2 power switch(es) circuit activates the second (L2) and third (L3) coils. The stage 2 power switch(es) circuit 2630 may be, for example, one or more switches, such as one or more solid state relays (SSRs), quad solid state relays (QSSRs), or other switches, and is controlled by the stage 2 motor controller 2618.

In one example of FIG. 26, the divided phase winding circuit 2602 can turn off one or more of the DC electronics, such as stage 1 of the motor controller 2618, when the motor is on and at synchronous speed. Thus, stage 1 of the motor controller 2618 determines the speed of the motor and whether the motor is or is not at synchronous speed. For example, 1800 RPM may be the synchronous speed for a motor with four stator poles (two north stator poles and two south stator poles). Every half AC cycle, power is supplied to one of the magnetic poles. Therefore, it takes two cycles to provide power to the four magnetic poles. Thus, the synchronous speed is 1800 RPM if the motor is synced to line AC. Similarly, the synchronous speed for an eight-pole stator would be 900 RPMs.

The direct current (DC) power supply 2632 (e.g. for the electronics used in the motor controller) is also located between the divided motor phase windings 2604-2610, between the two halves 2612-2614 of the divided motor phase windings and/or at a midpoint or center 2626-2628 between two of the divided motor phase windings 2604-2606 or 2608-2610 on each half 2612, 2614 of the motor phase windings. The primary divided phase winding 2604-2610 limits the current that can flow to the DC power supply 2632, thereby eliminating the need for current limiting components that waste power.

The divided phase winding circuit 2602 of FIG. 26 includes a secondary coils 2634, 2636 (also referred to as a secondary winding or secondary phase winding) electrically connected from or between the outer primary divided phase windings (coil L1 and coil L4) 2604 and 2610 to the DC power supply 2632 to create a non-collapsing DC power supply (a DC power supply in which the DC voltage is not reduced to or below the switch(es) 'on' resistance times the current through the power switch(es), which is close to zero). The coils of the secondary phase winding 2634, 2636 provide a low voltage power supply to the DC power supply 2632, such as when the motor is at start-up. The one or more secondary coils 2634, 2636 also act as a high frequency noise filter to filter out high frequency noise from the low power voltage supplied to the DC power supply 2632. The secondary coils 2634, 2636 may be distributed anywhere, such as evenly between the first and fourth divided phase windings 2604, 2610, on one or more of the first, second, third, and fourth divided phase windings 2604-2610, all on one pole, or unevenly between the first and second divided phase windings, such as a greater number of turns or coils on one secondary winding than another secondary winding.

FIG. 27 depicts a divided phase circuit 2702 similar to the divided phase winding circuit 2602 of FIG. 6. However, the divided phase circuit 2702 of FIG. 27 depicts a full bridge rectifier, MOSFET switch, and diode for the stage 1 power switch(es) circuit 2624A. The divided phase circuit 2702 also depicts particular values for some components, including 435 turns, 30 AWG for the divided phase windings (coils) 2604A-2610A, and 70 turn, 30 AWG for the secondary coils 2634A-2336A.

Referring still to FIGS. 26 and 27, in one aspect, the stage 1 power switch(es) circuit 2630 is only operational during startup. When the motor reaches synchronous speed, the control logic/motor controller 2616 turns the stage 1 power switch(es) circuit 2624 off and turns the stage 2 power switch(es) circuit 2630 on. The stage 1 motor controller 2618 controls which direction current flows through the coils based on the rotor position. In one example, more precise switching time is a factor for startup. The stage 2 power switch(es) circuit 2630 is either on or off and does not use rotor position to determine the direction of current flow.

As shown in the example in FIGS. 26 and 27, the stage 1 power switch(es) circuit 2624 is connected between an outer phase winding (coil L1) 2504 and inner phase winding (coil L2) 2506 on one side 2512 of the circuit and between the other outer phase winding (coil L5) 2510 and other inner phase winding (coil L3) 2508 on one side 2514 of the circuit. The stage 1 power switch(es) circuit 2624 completes a current path for the two outer phase windings (coil L1 and coil L4) 2604, 2610. The phase windings 2604, 2610 can be configured in several different ways to fit the needs of the motor application. The stage 1 power switch(es) circuit 2624 could also be configured to energize three of the phase windings 2604-2610 or just one of the phase windings to suit startup torque and power requirements.

When the stage 1 power switch(es) circuit 2624 turns off and the stage 2 power switch(es) circuit 2630 turns on, the current path for all four phase windings 2604-2610 is completed. Since the stage 2 power switch(es) circuit 2630 has a slower switching speed than the stage 1 power switch (es) circuit 2624 at startup, a component such as a relay or a solid state relay can be used for the stage 2 power switch(es) circuit and require fewer parts than if a power switch like the MOSFET is used for the stage 2 power switch(es) circuit.

If low cost is a goal, it might be beneficial to build an equivalent circuit using cheaper discrete components. In one of the circuits described below, the use of discrete components performs well in voltage range, current range, voltage drop across, and switching speed. It can also be built for equal or less cost than a solid state relay that meets the same power requirements.

Figure 28:
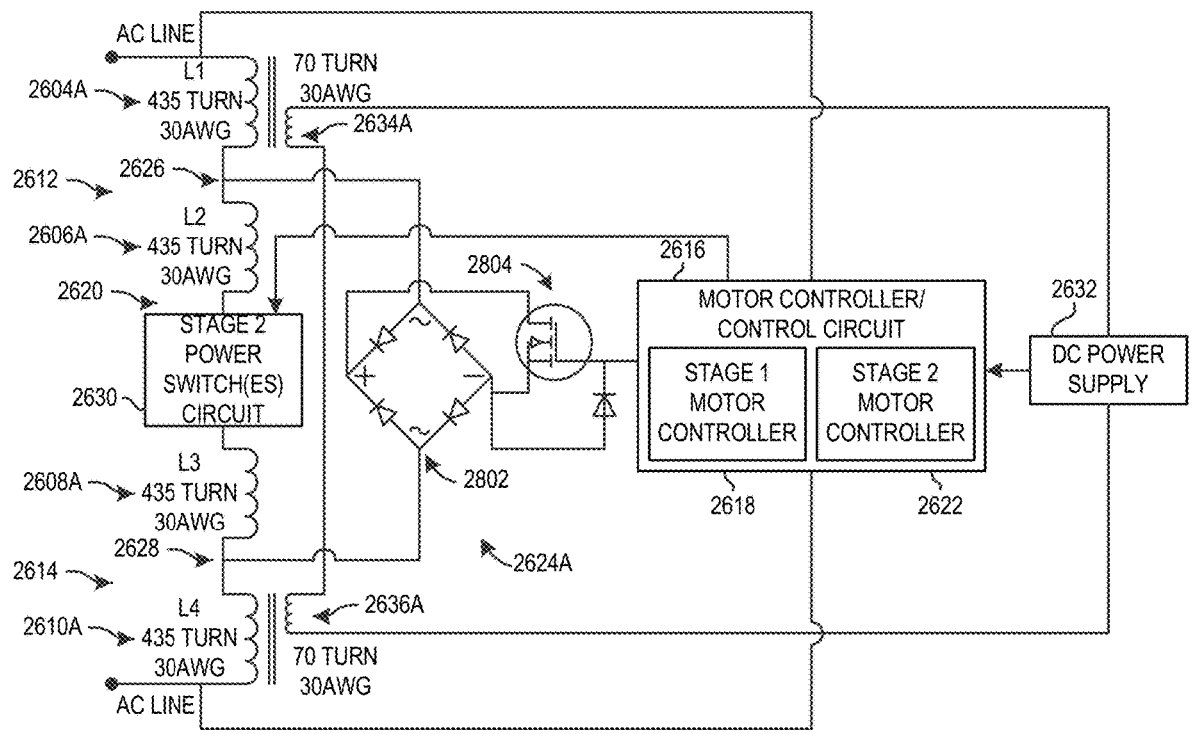
Figure 29:
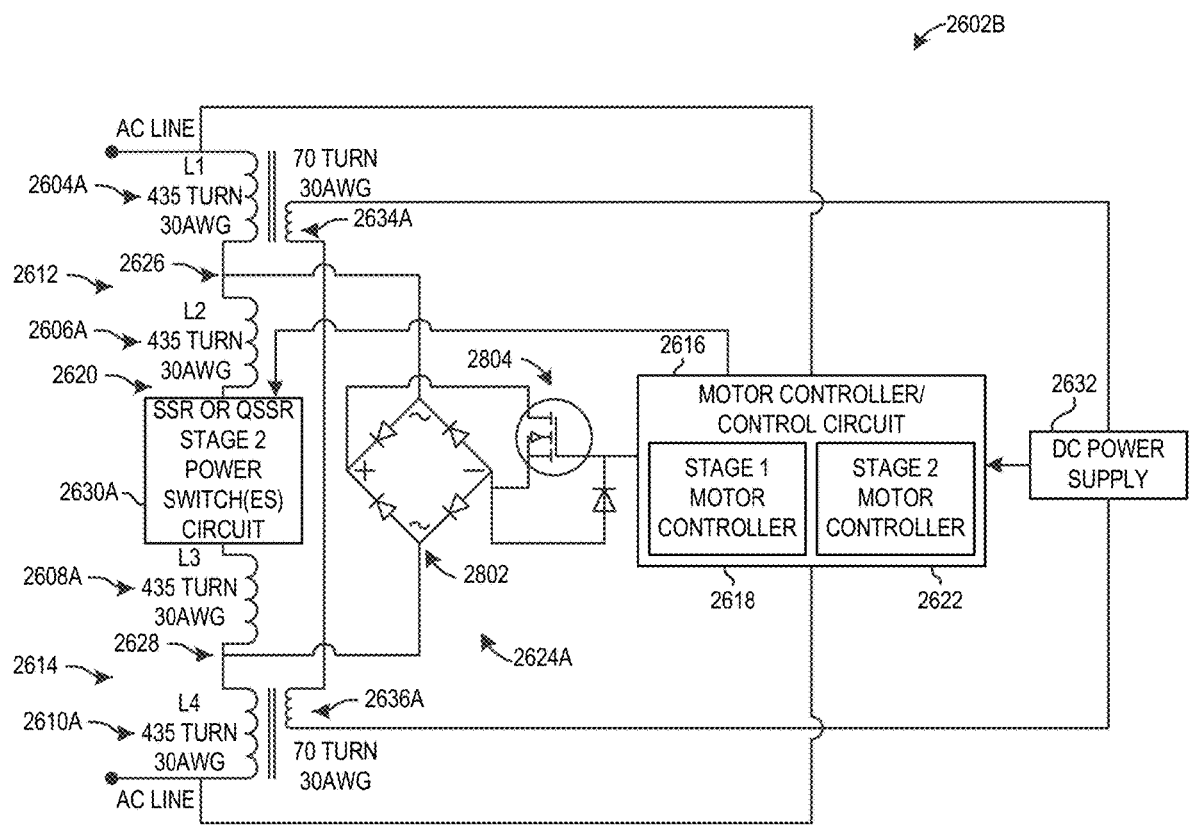

FIGS. 28 and 29 depict examples of active elements for the stage 1 and stage 2 power switch(es) circuits. For stage 1 (startup), the active elements for the stage 1 power switch(es) circuit 2602A are depicted in FIG. 28 and include a full wave bridge rectifier 2802 and a MOSFET 2804. The stage 1 power switch(es) circuit 2602A also has a Zener diode 2806 in parallel with the MOSFET 2804. Current flows through the Zener diode 2806 when the MOSFET 2804 is on and off. Phase windings (coils) 2604A, 2610A for stage 1 (FIG. 28) are connected to the full wave bridge rectifier 2802 so that the motor will run balanced. Powering two adjacent phase windings (coils) may pull the rotor harder to one side and it could cause excessive stress to the circuit, motor structure, or both. Depending on how the poles are wound and how the poles align to the rotor, it may be necessary to configure different coils for startup since the most torque is present at startup. Phase windings (coils) connected in an unbalanced configuration at the highest motor torque could cause excessive stress to the circuit, motor structure, or both. For stage 2, the active elements for the stage 2 power switch(es) circuit 2630A are depicted in FIG. 29 and include an SSR or QSSR. Though, another relay or other switch may be used.

Figure 30A:
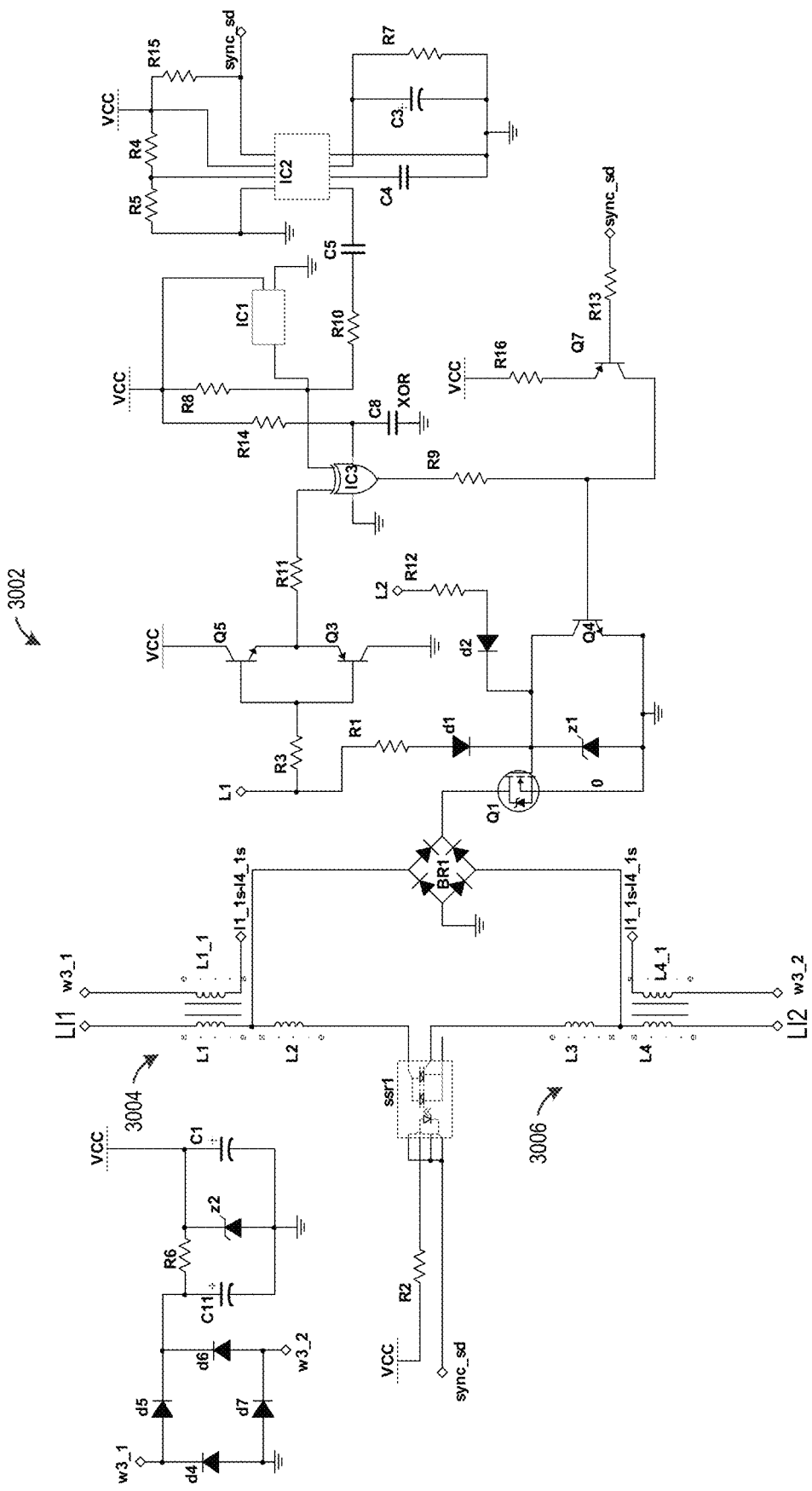
Figure 30B:
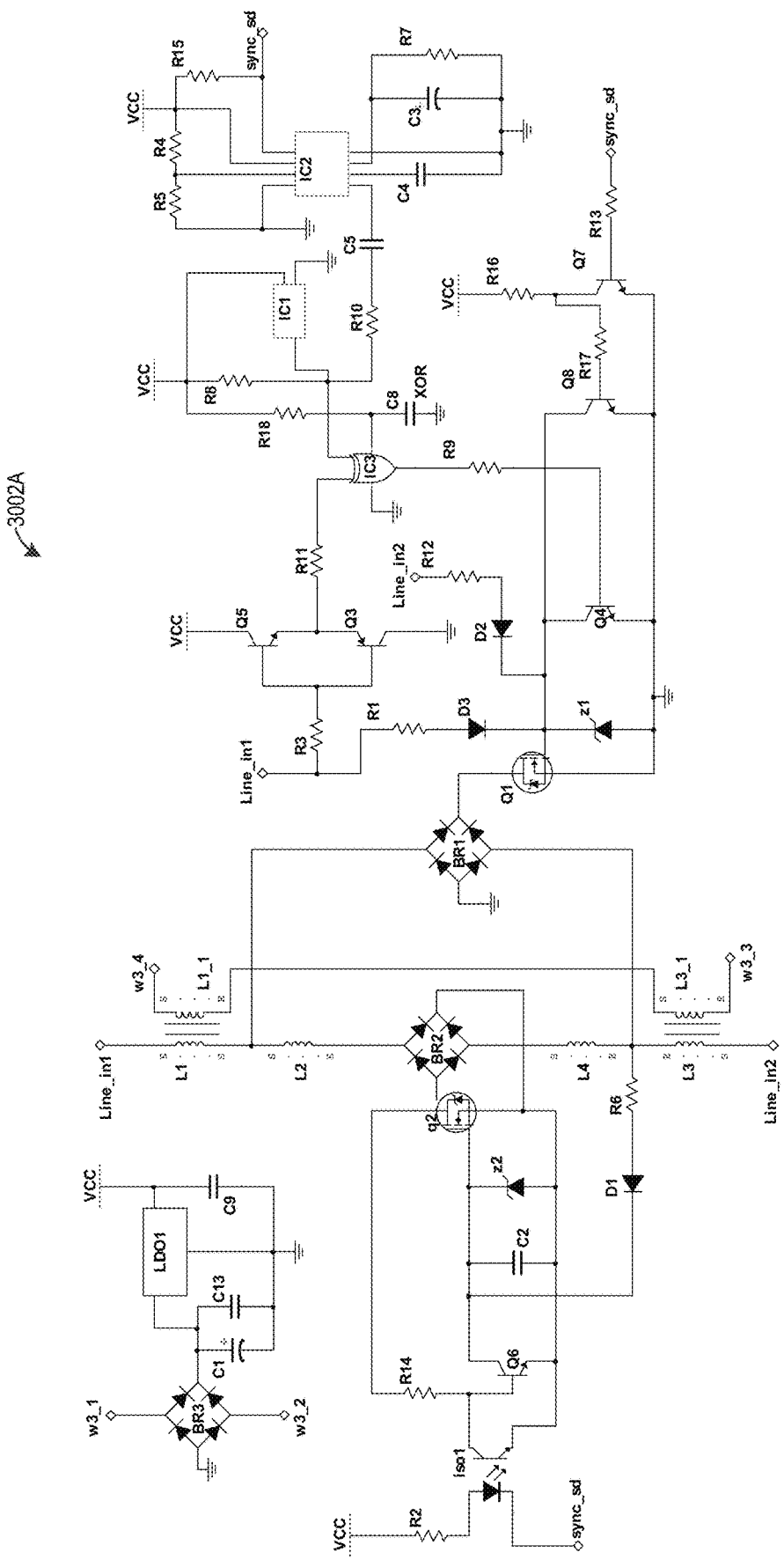

FIGS. 30A-30B depict another example of a divided phase winding circuit 3002, 3002A for a motor in schematic form. The circuit has two line inputs LI1 or Line_in1 and LI2 or Line_in2, which are connected to the AC power source during operation of the motor. Like the circuits of FIGS. 25-29, the circuits of FIGS. 30A-30B include motor phase windings that are divided into four parts, with two motor phase windings L1, L2 forming one half 3004 of the motor phase windings of the circuit and two other motor phase windings L3, L4 forming the other half 3006 of the motor phase windings of the circuit.

It also includes one or more secondary phase coil windings L1-1, L4-1 (FIG. 30A) or L1-1, L3-1 (FIG. 30B)

electrically connected to the DC power supply to power the power supply and create a non-collapsing DC power supply (a DC power supply in which the DC voltage is not reduced to or below the switch(es) 'on' resistance times the current through the power switch(es), which is close to zero). The one or more secondary phase windings (coils) (also referred to as a secondary winding) provide a low voltage power supply to the DC power supply, such as when the motor is at start-up. The one or more secondary phase windings (coils) also act as a high frequency noise filter to filter out high frequency noise from the low power voltage supplied to the DC power supply. The secondary winding may be distributed anywhere, such as evenly between the first (L1) and fourth (L4) divided phase windings, all on one pole, or unevenly between the first (L1) and fourth (L4) divided phase windings, such as a greater number of turns or coils on one secondary winding than another secondary winding. The secondary winding may be distributed anywhere, evenly or unevenly, between any of the first (L1), second (L2), third (L3), and fourth (L4) divided phase windings.

Stage 1 Power Switch(es) Circuit

Figure 31:
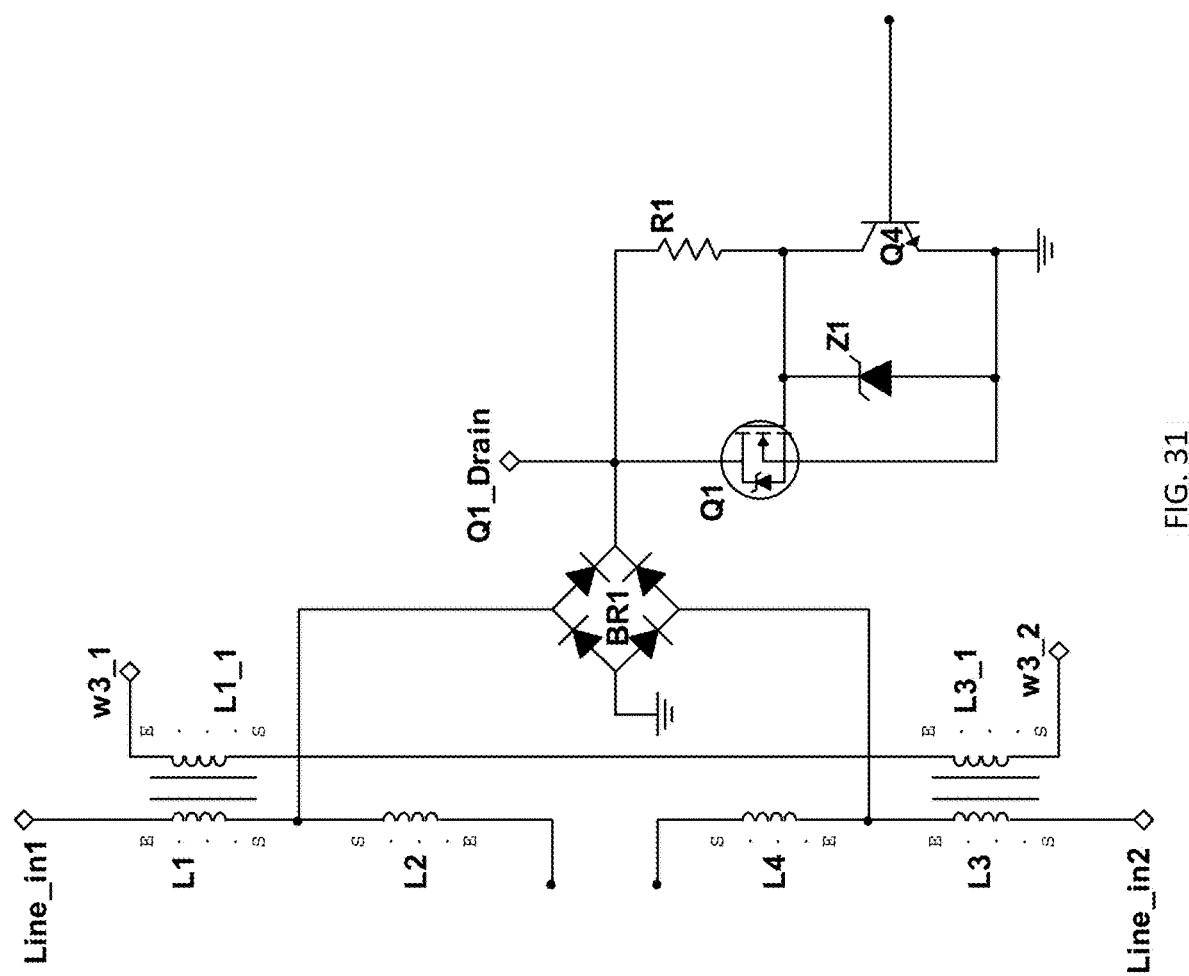
Figure 32:
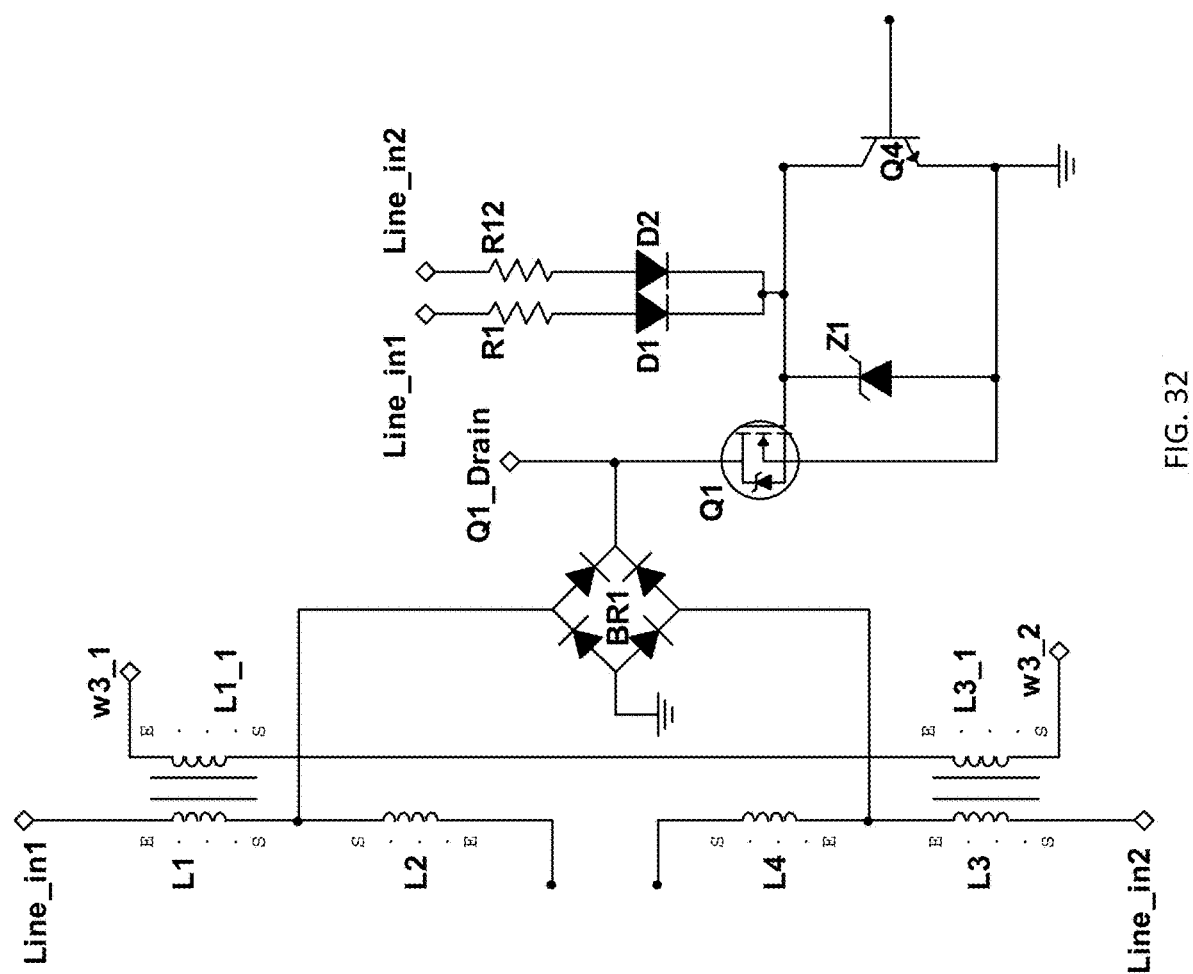

The Power Switch block has a full wave bridge rectifier BR1 and a MOSFET Q1. The full wave bridge rectifier BR1 guarantees that no negative voltage will be supplied to the drain (top) of the MOSFET Q1 and guarantees that no positive voltage will be supplied to the source (bottom) of the MOSFET Q1 so that current can only flow from the drain to the source of the MOSFET Q1 when biased by a positive voltage on the gate of the MOSFET Q1 via a resistor R1 or a separate gate driver circuit. In the example of FIG. 31, simultaneously as positive rectified AC voltage is present at the drain of the MOSFET Q1, the MOSFET Q1 is biased by the same voltage signal via the resistor R1. The diode D1 protects the gate of the MOSFET Q1 by guaranteeing that any voltage on the gate of the MOSFET Q1 will be greater than −0.7 VDC, as anything less could damage or destroy or degrade the MOSFET Q1. In the example described above, the gate is essentially driven by drain voltage. In that type of configuration above, when the MOSFET Q1 is energized, it collapses the gate drive signal, causing the MOSFET Q1 to operate as if at the highest resistance from the drain to the source (Rds (on)). Since the resistance is higher, the voltage drop across the MOSFET Q1 also is higher, which is taken directly from the power to the motor divided phase windings (coils) (L1-L4). Adding a simple gate driver circuit increases the voltage to the gate of the MOSFET Q1 and decreases Rds (on). An example of a gate driver using discrete components as described herein is shown in FIG. 32. Resistors R1 and R12, Zener diode Z1, and diodes D1 and D2 make up a simple gate driver.

Referring again to FIGS. 30A-30B, a capacitor could be connected from the gate of the MOSFET Q1 to the source of the MOSFET Q1 to help hold a DC voltage level. Since the inputs of the gate driver are connected to the other side of the motor divided phase windings (coils), there is a difference in voltage that is approximately equal to (Voltage Line in)/(number of active coils). In the example of FIG. 32, if Line In is 120 VAC, since there are 2 active coils that have equal values, the voltage at the inputs of the gate driver is approximately 120/2=60 volts each.

The Zener diode Z1 will regulate higher voltages and should be a value within the MOSFET's range of normal operation. The Zener diode Z1 will regulate the amount of voltage equal to the voltage rating of the Zener diode; voltages higher than the rated Zener diode voltage are dropped across the Zener diode. The Zener diode Z1 can act as a voltage regulator. In this case, the voltage is regulated to be within the operating voltage of the MOSFET Q1.

In a configuration like the example of FIG. 31, a voltage drop across the MOSFET Q1 may be about 5 volts or just enough to keep the MOSFET Q1 biased. In the example of FIG. 32, the voltage drop across the MOSFET Q1 may be less than 1 volt.

Stage 2 Power Switch(es) Circuit

The purpose of the stage 2 power switch(es) circuit is to run the motor in the most efficient way possible. Since stage 2 is rarely required to switch off and on or on and off within 1 input cycle, it can be designed to operate very simply. The only input needed from the stage 1 control logic/motor controller is a synchronous shut down input, SYNC SD. The SYNC SD input is used to shut down the stage 1 MOSFET Q1 by pulling its gate to its source. The SYNC SD input also is used to turn the stage 2 power switch(es) circuit on for as long as the motor speed is running synchronous to the input frequency. In the example circuit in FIGS. 30A-30B, the SYNC SD input is a logic high for startup. When the cycle time for the frequency on the input to the voltage regulator IC2 on pin 1 matches the time constant set by capacitor C4 and resistor R7, the SYNC SD input is pulled to a logic low through and open collector output. For as long as synchronous speed is sensed by the voltage regulator IC2, the SYNC SD input is logic low. If the motor is loaded heavily or for some other reason the motor "falls out of sync", the SYNC SD input will switch back from logic low to logic high. Stage 2 (e.g. the stage 2 power switch(es) circuit) will shut off and Stage 1 (e.g. the stage 1 power switch(es) circuit) will operate until synchronous speed is sensed. Since Stage 1 needs a logic high on the SYNC SD input to operate, and Stage 2 needs a logic low on the SYNC SD input to operate, Stage 1 and Stage 2 cannot be energized simultaneously in the examples of FIGS. 30A-30B.

Figure 33:
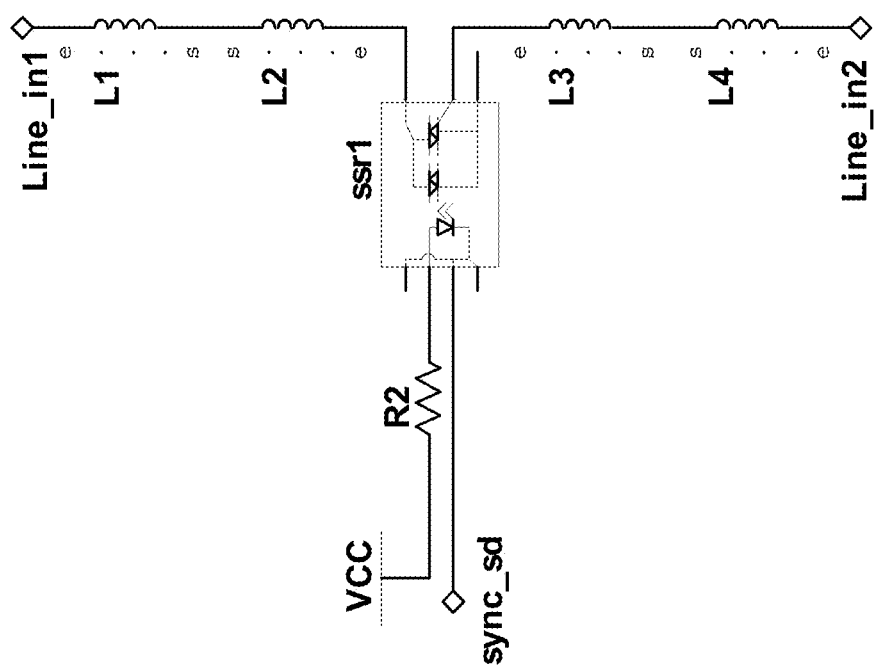

FIG. 33 depicts a version of the stage 2 power switch(es) circuit that uses an isolated input, triac output, solid state relay (SSR) SSR1. This configuration requires only 2 components. The anode of the SSR input LED is connected to a positive voltage VCC through a current limiting resistor R2. The cathode of the SSR input LED is connected to the SYNC SD input. When the SYNC SD input switches to a logic low, a path for current is completed through the input LED, and the SSR turns on. Likewise, when the SYNC SD input is a logic high, there is no path for current through the input LED, and the SSR turns off.

Figure 34:
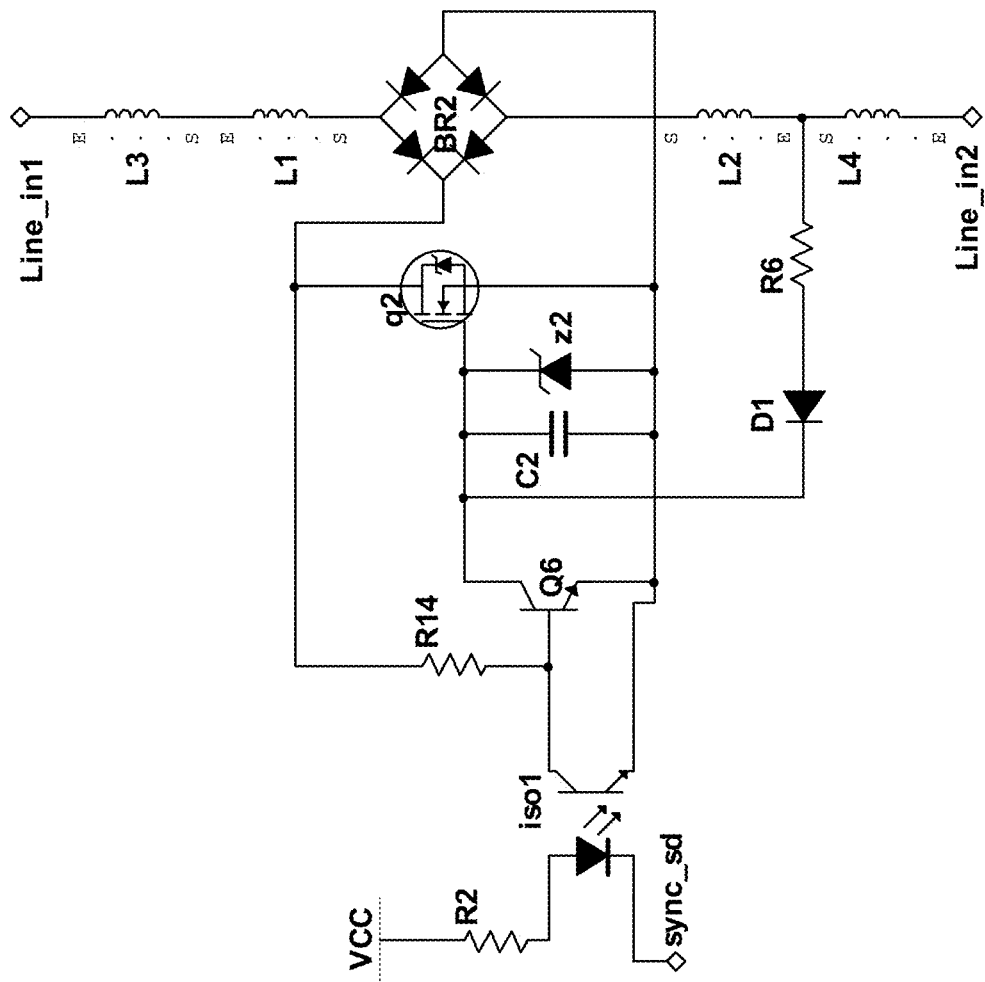

FIG. 34 depicts a circuit that replaces an SSR of the power switch(es) circuit using discrete components. The circuit of FIG. 34 operates very similar to the stage 1 power switch(es) circuit. One difference is that the power switch(es) circuit is normally off for stage 2 since a high value resistor R14 is connected between the drain of the switch Q2 and the base of the switch Q6. When there is a positive voltage on the drain of the switch Q2, the switch Q6 is energized, which shorts the gate of the switch Q2 to its source, turning the switch Q2 off. Another difference is the isolated input to the power switch(es) circuit via isolator ISO1. The input to the isolator ISO1 works the same as the input to the SSR (SSR1) previously described, and the output is an open collector. When the SYNC SD input switches to a logic low, the output of isolator ISO1 is energized, which switches the base of the switch Q6 to its emitter, turning the switch Q6 off. When the switch Q6 is off, the switch Q2 will operate when there is a positive voltage above the threshold on the gate of the switch Q2. Another difference is that the capacitor C2 can be a higher value since the stage 2 power switch(es) circuit does not require as fast switching. Increasing the value of the capacitor C2 will allow for a simpler version of a gate driver circuit (diode D1 and resistor R6).

In other embodiments, alternating current (AC) driven synchronous motors and associated control circuits and power switch(es) circuits for the AC synchronous motors achieve very high efficiency at multiple fixed speeds, including fully synchronous speed and fractions of that synchronous speed. The fully synchronous speed is determined by the frequency of the alternating current power source and the number of rotor poles and stator poles of the motor. The motor stator includes at least one phase winding. However, the motor stator may have multiple phase windings, such as in the above-embodiments. One or more additional phase windings, and additional control circuitry for the control circuit, may be added to optimize performance at one or more selected fractional speeds or other fractional speeds.

Figure 43:
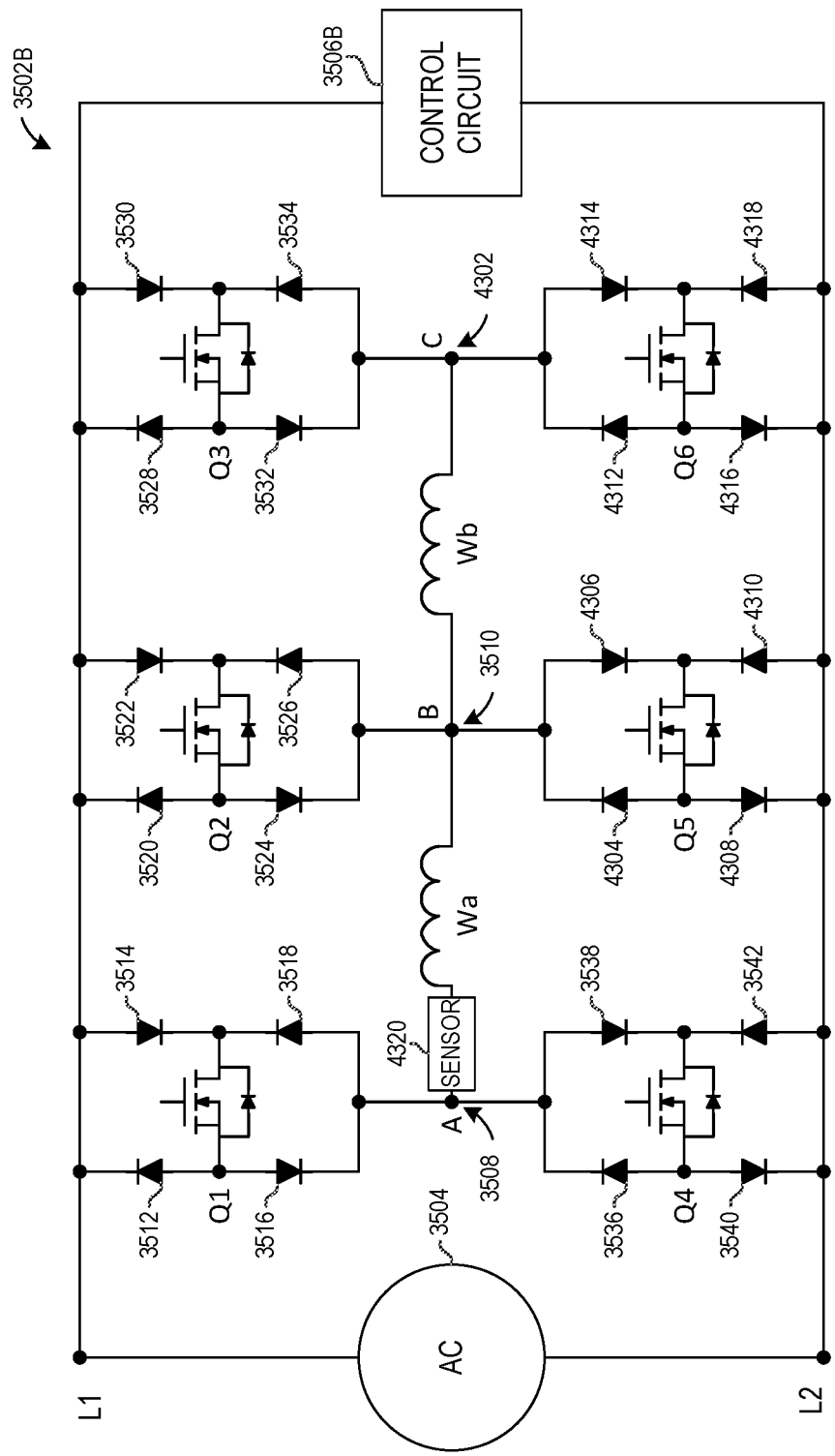
FIG. 43 depicts a multispeed alternating current (AC) motor circuit for a motor with six switches.
Figure 44:
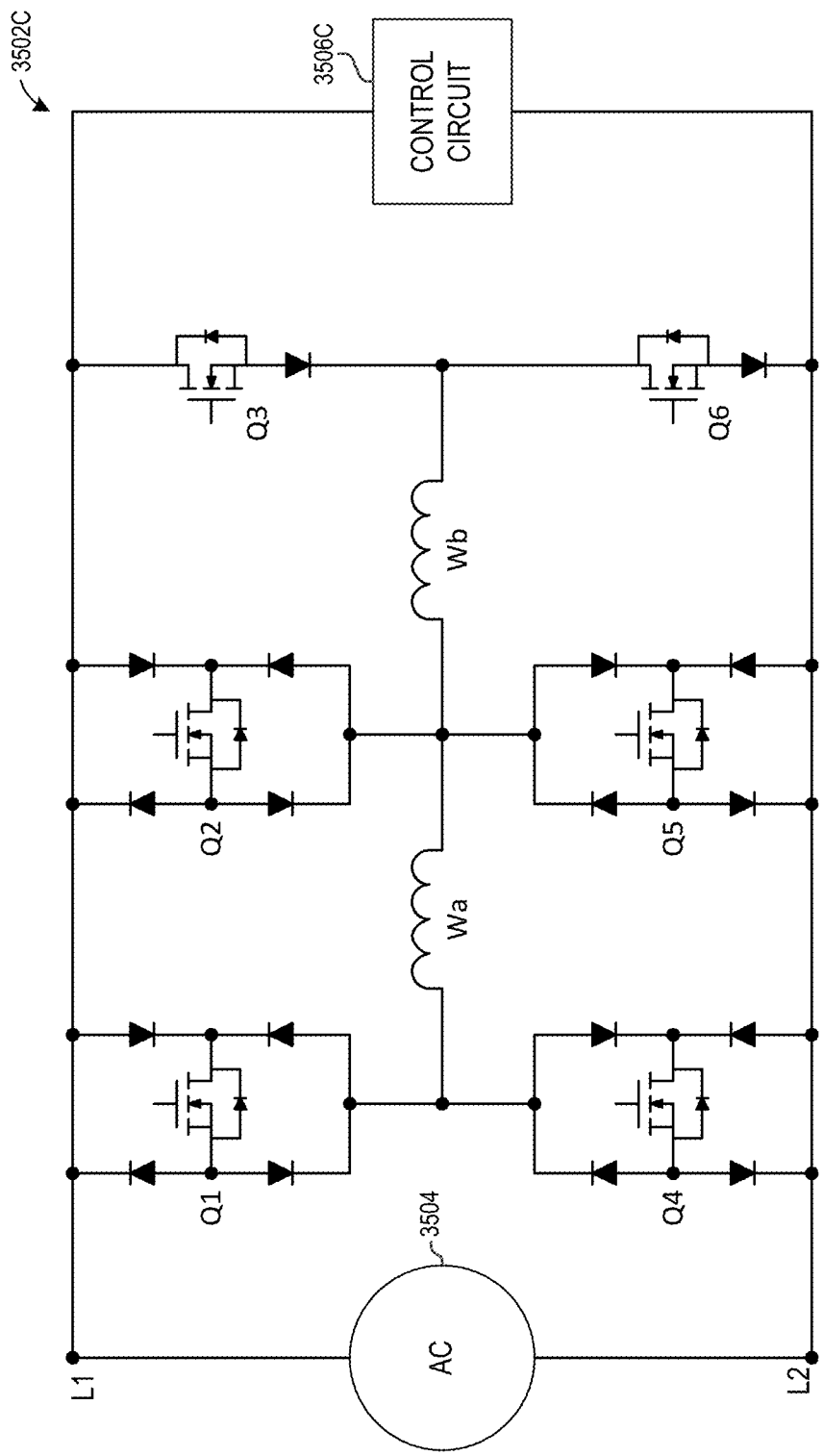
FIG. 44 depicts a multispeed alternating current (AC) motor circuit for a motor with six switches.
Figure 45:
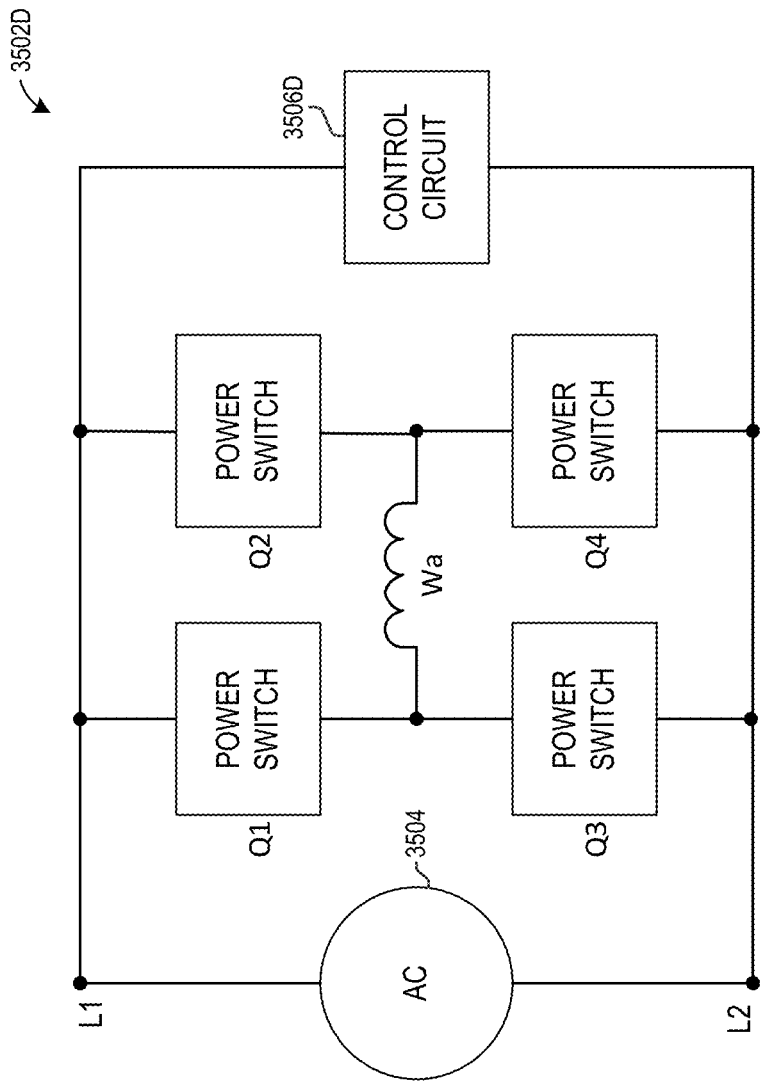
FIG. 45 depicts a simplified multispeed alternating current (AC) motor circuit for a motor with four switches.
Figure 46:
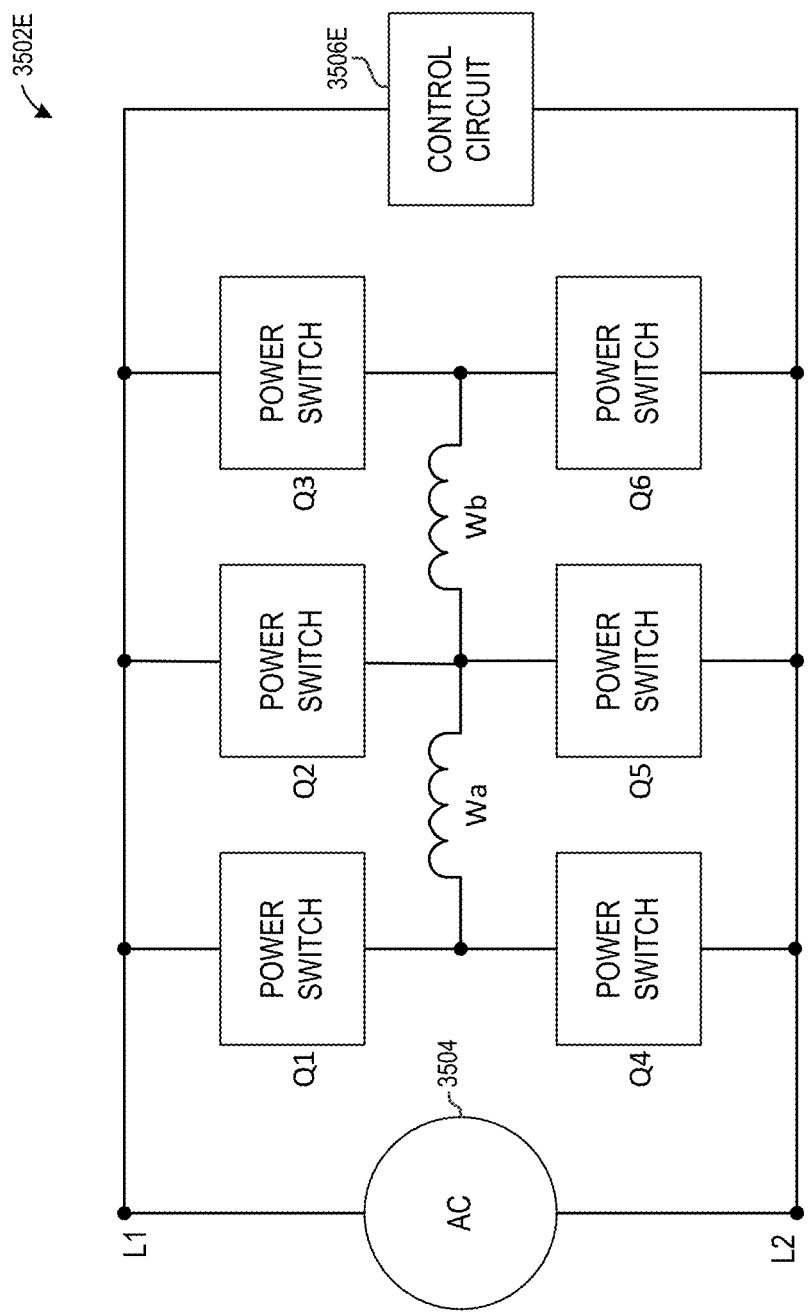
FIG. 46 depicts a simplified multispeed alternating current (AC) motor circuit for a motor with six switches.
Figure 47:
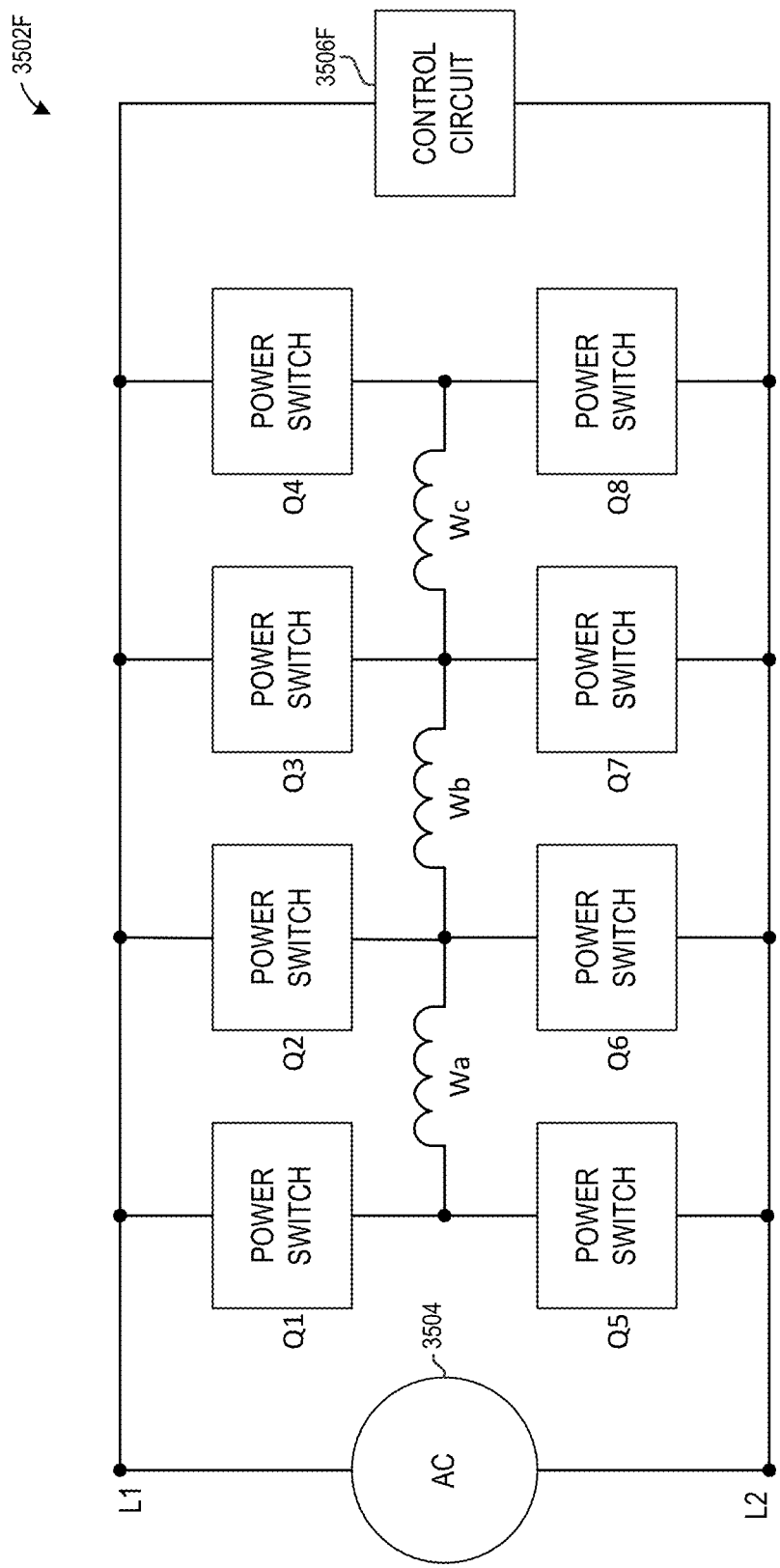
FIG. 47 depicts a simplified multispeed alternating current (AC) motor circuit for a motor with eight switches.

FIGS. 35-47 depict examples of a multispeed alternating current (AC) circuit for a machine, the machine including a motor and a generator. The example of FIGS. 35-42 includes a single winding (W). Though, two, three, or more windings may be used for the multispeed AC machine circuit. For example, FIGS. 43-44 depict an example of two windings. In another example, FIG. 45 depicts an example of a simplified circuit with one winding. In another example, FIG. 46 depicts an example of a simplified circuit with two windings. In another example, FIG. 47 depicts an example of a simplified circuit with three windings.

Figure 35:
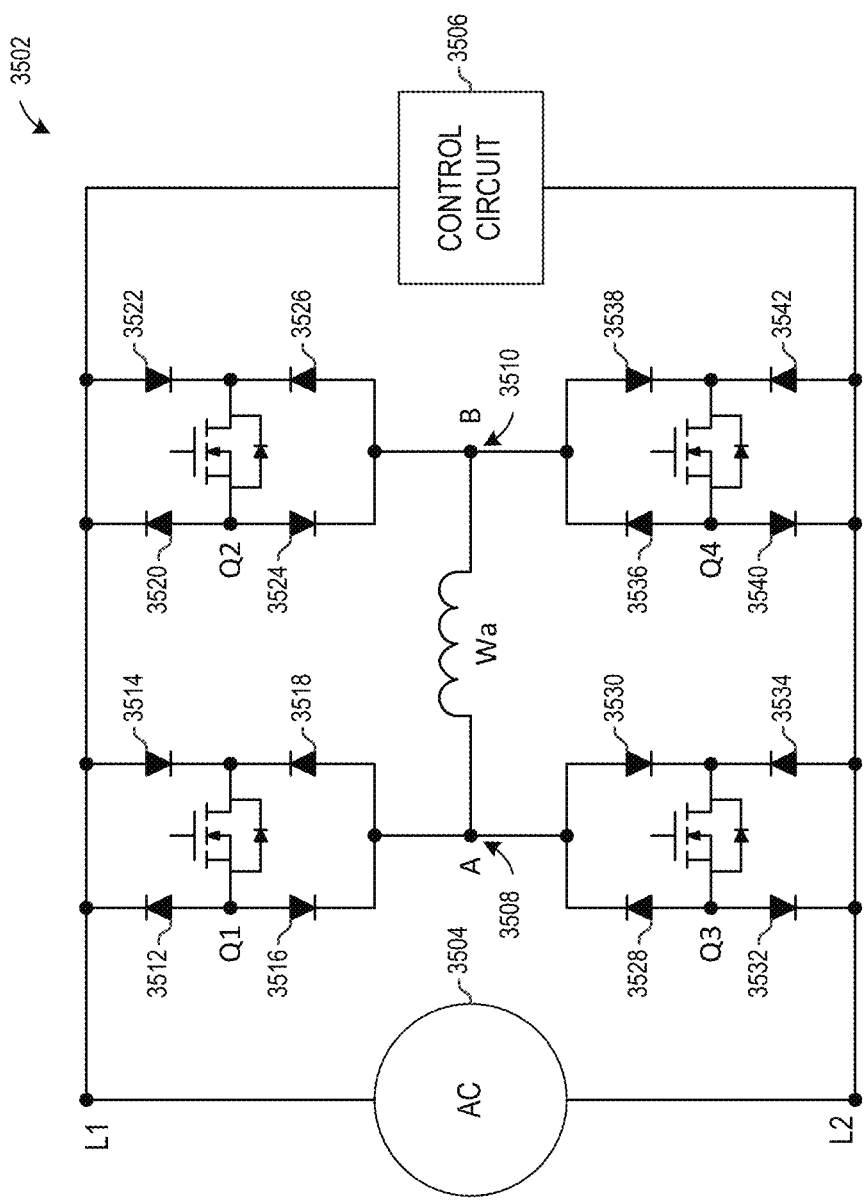
FIG. 35 depicts a multispeed alternating current (AC) motor circuit for a motor.

FIG. 35 depicts an example of a single winding multispeed AC machine circuit 3502. The multispeed AC machine circuit 3502 has four power switches Q1, Q2, Q3, and Q4, one stator winding Wa, an alternating current (AC) source 3504 with a first line voltage side L1 at lead L1 and a second line voltage side L2 at lead L2, and a control circuit 3506.

The stator winding Wa is connected (at point A 3508) on one side of the winding between two power switches Q1 and Q2 on one side of the multispeed AC machine circuit 3502 and (at point B 3510) on the other side of the winding between the other two power switches Q3 and Q4 on the other side of the multispeed AC machine circuit. Point A 3508 is the start side of the winding Wa, and point B 3510 is the end side of the winding.

In the example of FIG. 35, the power switches Q1, Q2, Q3, and Q4 are bi-directional power switches allowing current to flow from L1 to L2 or from L2 to L1. Power switch Q1 connects point A 3508 to L1, and power switch Q3 connects point A to L2. Power switch Q2 connects point B 3510 to L1, and power switch Q4 connects point B to L2. The power switches are operated in pairs, Q1/Q4 and Q2/Q3, to control the direction of current flow through the winding Wa.

In the example of FIG. 35, the power switches Q1, Q2, Q3, and Q4 are High Speed SSRs (QSSRs) that include a MOSFET and each have four diodes 3512-3518, 3520-3526, 3528-3534, and 3536-3542, respectively. The diodes 3512-3542 are configured as a full-wave bridge rectifier with the MOSFET shorting the positive output of the rectifier to the negative output. The diodes 3512-3542 ensure current flows in the correct direction through the power switches by blocking the current from flowing in the wrong direction. When the MOSFET is energized, AC current flows from one AC input of the rectifier to the output (other AC side) of the rectifier. For example, the diodes 3512 and 3518, 3520 and 3526, 3528 and 3534, and 3536 and 3542, allow current to flow from L2 to L1 through the power switches Q1, Q2, Q3, and Q4, respectively. The diodes 3514 and 3516, 3522 and 3524, 3530 and 3532, and 3538 and 3540, allow current to flow from L1 to L2 through the power switches Q1, Q2, Q3, and Q4, respectively. Other types of power switches may be used in other examples, such as a switching device or combination of switching devices that allow for the switching of alternating current, including metal-oxide-semiconductor field-effect transistors (MOSFETs), silicon-controlled rectifiers (SCRs), or transistors configured to operate as AC switches, for example when placed in series in opposite directions with diodes, or relays or any other combination of switches that can be configured for switching alternating current.

The control circuit 3506 controls operation of the multispeed AC machine circuit 3502. The control circuit 3506 determines which one or more of the power switches Q1, Q2, Q3, and/or Q4 to close to obtain the proper direction of current flow through one or more windings in the multispeed AC machine circuit 3502. In one example, the control circuit 3506 opens power switches Q1 and Q4 and closes power switches Q2 and Q3 to cause current to flow from L1 to L2. In another example, the control circuit 3506 opens power switches Q2 and Q3 and close power switches Q1 and Q4 to cause current to flow from L2 to L1.

In one example, the control circuit 3506 includes a hardware processor with software executing one or more instructions stored on a non-transitory computer readable storage medium. In another example, the control circuit 3506 includes a digital signal processor (DSP), an application specific integrated circuit (ASIC), a field programmable gate array signal (FPGA) or other programmable logic device (PLD), discrete gate or transistor logic, discrete hardware components, or combinations thereof designed to perform the functions described herein.

Figure 36A:
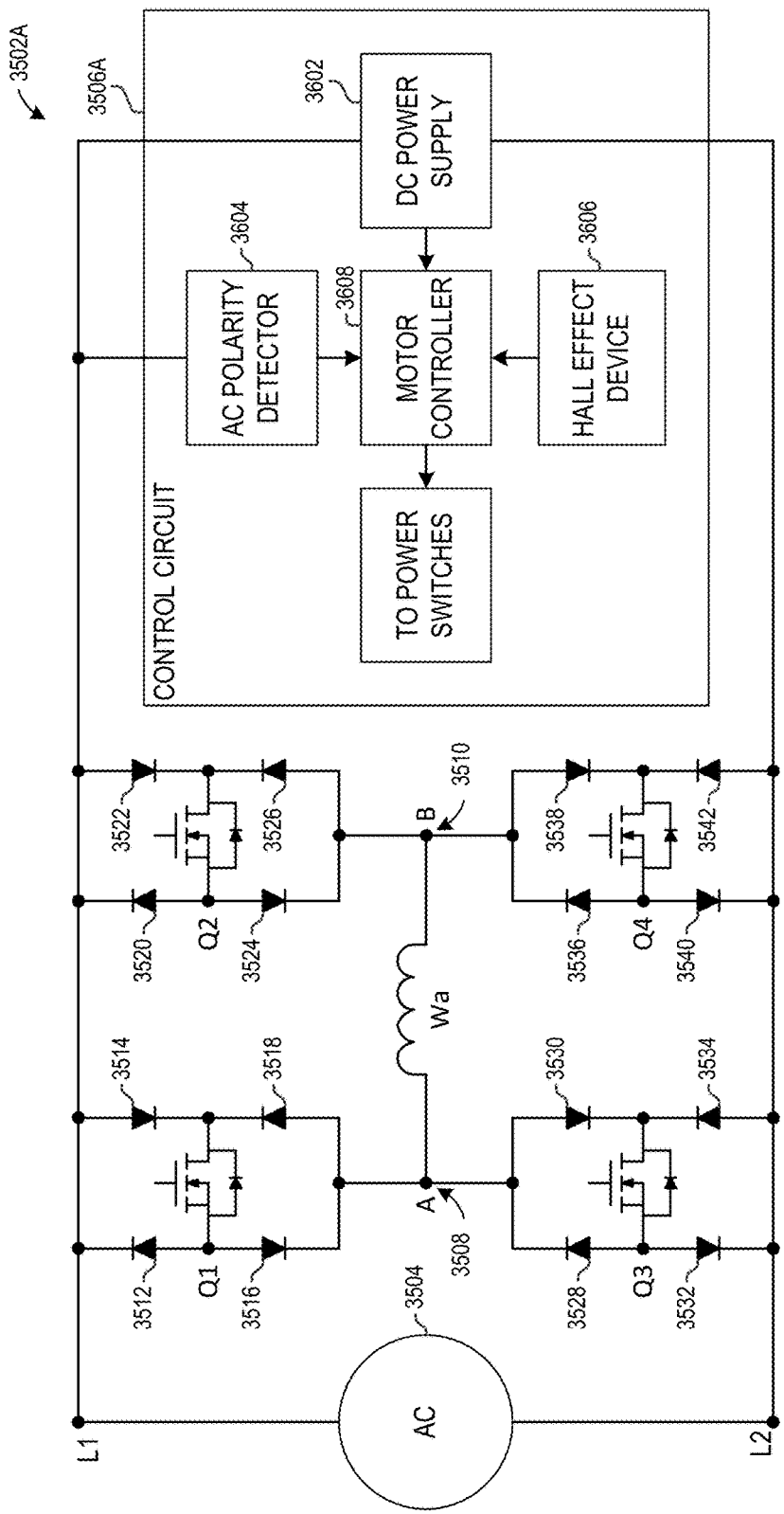
FIG. 36A depicts a multispeed alternating current (AC) motor circuit for a motor.

FIG. 36A depicts an example of a control circuit 3506A for a multispeed AC machine circuit 3502. The control circuit 3506A includes a direct current (DC) power supply 3602, an alternating current (AC) polarity detector 3604, a Hall effect device 3606, and a motor controller 3608. The motor controller 3608 can be replaced with a machine controller with the same components as the motor controller to control a generator.

The DC power supply 3602 converts the incoming AC power to a DC voltage configured to power the DC powered components in the control circuit 3506A, such as the Hall effect device 3606 and the motor controller 3608. The DC power supply 3602 then supplies power to the DC powered components in the control circuit 3506A, such as the Hall effect device 3606 and the motor controller 3608. In one example, the DC power supply 3602 includes an IC Offline Converter in a buck topology to convert power from the incoming AC power to low voltage DC power. This low voltage DC power is used to power, and supplied to, one or more DC powered devices in the control circuit 3506A, such as the Hall effect device 3606 and the motor controller 3608.

The AC polarity detector 3604 detects whether the voltage is higher at L1 or L2 and outputs a polarity signal indicating which of L1 or L2 has the higher voltage, such as indicating whether the voltage at L1 is higher or lower than the voltage at L2. In one example, if the AC polarity detector 3604 detects the voltage at L1 is higher than the voltage at L2, the AC polarity detector outputs a polarity signal that is high, meaning voltage on L1 is higher than L2. If the AC polarity detector 3604 detects the voltage at L1 is lower than the voltage at L2, the AC polarity detector outputs a polarity signal that is low, meaning voltage on L1 is less than voltage on L2.

Figure 36B:
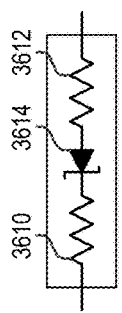
FIG. 36B depicts an AC polarity detector for a multispeed alternating current (AC) motor circuit for a motor.

In one example, as shown in FIG. 36B, the AC polarity detector 3604 includes two resistors 3610 and 3612 and a Zener diode 3614. A first resistor 3610 is connected to L1 on one side of the first resistor and connected to the cathode of the Zener diode 3614 on the other side of the first resistor. The anode of the Zener diode 3614 is connected to one side of the second resistor 3612, and the other side of the second resistor is connected to L2. With this configuration, when the voltage on L1 is higher than the breakdown voltage of the Zener diode 3614, the Zener diode conducts, leaving a voltage drop across the Zener diode that is equivalent to the breakdown voltage of the Zener diode. This results in a polarity signal that is high and that corresponds to the voltage on L1. When the voltage on L1 is less than the breakdown voltage of the Zener diode 3614, the voltage drop across the Zener diode is closer to zero. This results in a polarity signal that is low and that corresponds to the voltage on L1. In an alternate embodiment, an op-amp is used in place of the two resistors 3610 and 3612 and a Zener diode 3614 for the AC polarity detector 3604.

The Hall effect device 3606 senses the position of the rotor relative to stator and outputs one or more Hall Effect signals indicating the position of the rotor relative to the stator. In one example, the Hall effect device 3606 senses a polarity of a magnet of the rotor relative to a stator tooth. In this example, the Hall effect device 3606 outputs a high Hall Effect signal or a low Hall Effect signal that is determined by the polarity of the magnetic pole it is sensing. In this example, the Hall effect device 3606 outputs (1) a high Hall Effect signal indicating a north magnetic pole is facing the stator or (2) a low Hall Effect signal indicating a south magnetic pole is facing the stator.

In one example, the location of the Hall effect device 3606 relative to the stator provides a high output when the back electromotive force (BEMF) of the motor is high. The Hall effect device 3606 is then shifted 36 electrical degrees advanced on the BEMF. The BEMF is generated by the combination of the rotor magnets on the spinning rotor passing by the stator teeth with the windings. The BEMF is determined, in one example, by the speed of the rotor and the number of turns on each pole.

The motor controller 3608 determines which one or more of the power switches Q1, Q2, Q3, and/or Q4 to close to obtain the proper direction of current flow through one or more windings in the multispeed AC machine circuit 3502. In one example, the motor controller 3608 opens power switches Q1 and Q4 and closes power switches Q2 and Q3 to cause current to flow from L1 to L2. In another example, the motor controller 3608 opens power switches Q2 and Q3 and close power switches Q1 and Q4 to cause current to flow from L2 to L1.

In one example, the motor controller 3608 receives signals from the AC polarity detector 3604 and the Hall effect device 3606 to determine which one or more of the power switches Q1, Q2, Q3, and/or Q4 to close to obtain the proper direction of current flow through one or more windings in the multispeed AC machine circuit 3502. In this example, when the Hall Effect signal is high, current should be flowing through the winding Wa from point A 3508 to point B 3510.

If the Hall Effect signal is high and the AC polarity detection signal is high, meaning the voltage on L1 is higher than the voltage on L2, the motor controller 3608 will transmit signals to power switch pair Q2/Q3 to open power switch pair Q2/Q3 and transmit signals to power switch pair Q1/Q4 to close power switch pair Q1/Q4. In this instance, the higher voltage is applied to point A 3508 of the winding Wa, and the lower voltage is applied to point B 3510 of the winding Wa to create current flow from point A 3508 to point B 3510 through the winding Wa.

If the Hall Effect signal is high and the AC polarity detection signal is low, meaning the voltage on L1 is less than the voltage on L2, the motor controller 3608 will transmit signals to power switch pair Q1/Q4 to open power switch pair Q1/Q4 and transmit signals to power switch pair Q2/Q3 to close power switch pair Q2/Q3. This still applies the higher voltage to point A 3508 of the winding Wa and the lower voltage to point B 3510 of the winding Wa to create current flow from left to right through the winding, which is the correct direction of flow when the Hall effect signal is high.

If the Hall Effect signal is low and the AC polarity detection signal is high, meaning the voltage on L1 is higher than the voltage on L2, the motor controller 3608 will transmit signals to power switch pair Q1/Q4 to open power switch pair Q1/Q4 and transmit signals to power switch pair Q2/Q3 to close power switch pair Q2/Q3. In this instance, the higher voltage is applied to point B 3510 of the winding Wa, and lower voltage is applied to point A 3508 of the winding Wa to create current flow from point B 3510 to point A 3508 through the winding Wa, which is the correct direction of flow when the Hall effect signal is low.

If the Hall Effect signal is low and the AC polarity detection signal is low, meaning the voltage on L1 is less than the voltage on L2, the motor controller 3608 will transmit signals to power switch pair Q2/Q3 to open power switch pair Q2/Q3 and transmit signals to power switch pair Q1/Q4 to close power switch pair Q1/Q4. This still applies the higher voltage to point B 3510 of the winding Wa and the lower voltage to point A 3508 of the winding Wa to create current flow from point B 3510 to point A 3508 through the winding Wa, which is the correct direction of flow when the Hall effect signal is low.

In one example, the motor controller 3608 includes a hardware processor with software executing one or more instructions stored on a non-transitory computer readable storage medium. In this example, the processor processes Hall effect signal and the AC polarity signal and creates one or more driving logic signals based on whether each of the Hall effect signal and the AC polarity signal is high or low, and the motor controller transmits the one or more driving logic signals to the power switches (as described above) to open and close the power switches. In one example, the motor controller 3608 includes logic in which the Hall effect signal and the AC polarity signal are XOR'd together to create one or more driving logic signals based on whether each of the Hall effect signal and the AC polarity signal is high or low, and the motor controller transmits the one or more driving logic signals to the power switches (as described above) to open and close the power switches.

In another example, the motor controller 3608 includes a digital signal processor (DSP), an application specific integrated circuit (ASIC), a field programmable gate array signal (FPGA) or other programmable logic device (PLD), discrete gate or transistor logic, discrete hardware components, or combinations thereof designed to perform the functions described herein. A hardware processor may be a microprocessor, commercially available processor, controller, microcontroller, or state machine. A processor may also be implemented as a combination of two computing components, e.g., a combination of a DSP and a microprocessor, a plurality of microprocessors, one or more microprocessors in conjunction with a DSP core, or any other such configuration.

Figure 37A:
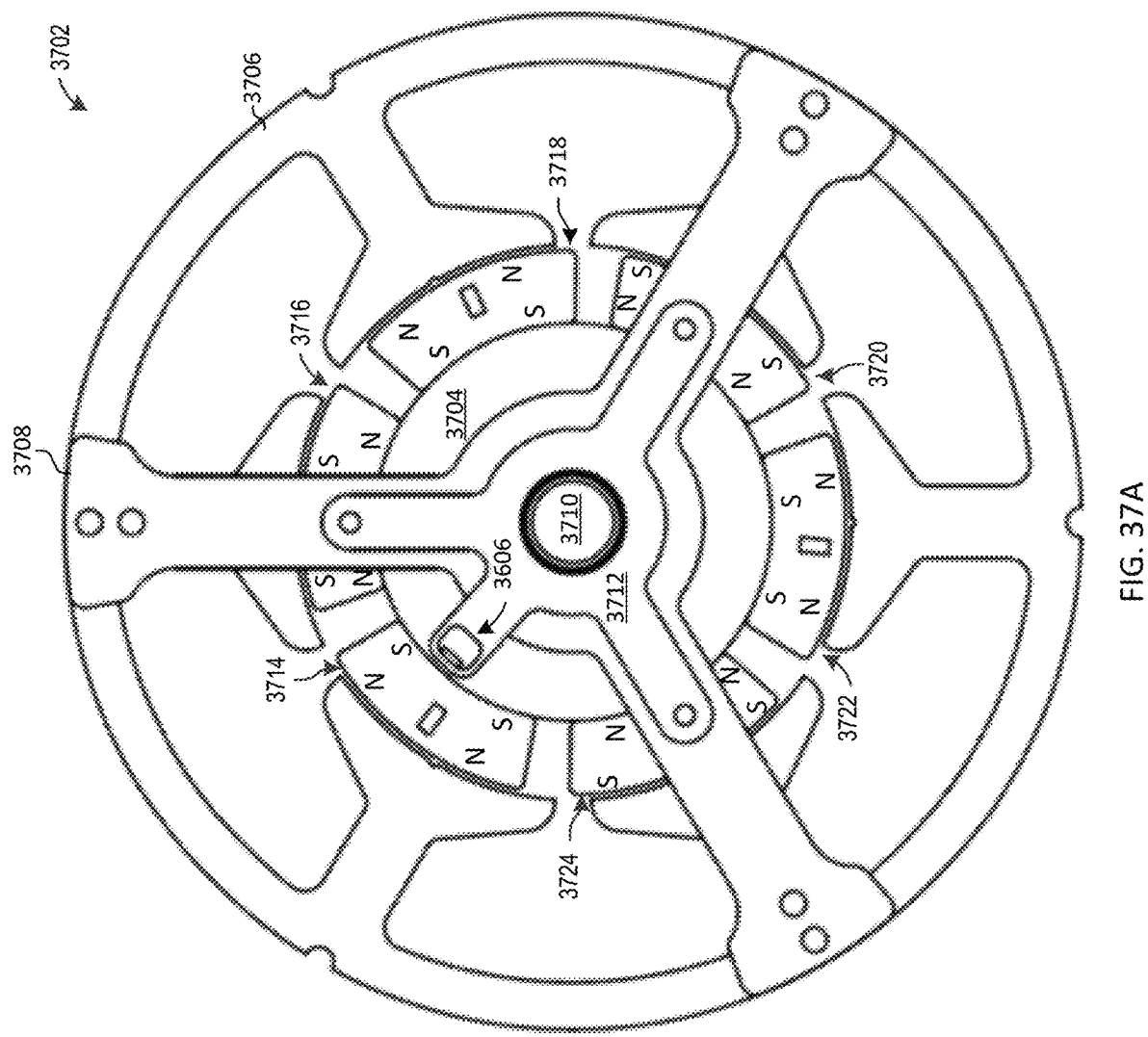
FIGS. 37A-37B depict a motor with a Hall effect device for a multispeed alternating current (AC) motor circuit for a motor.
Figure 37B:
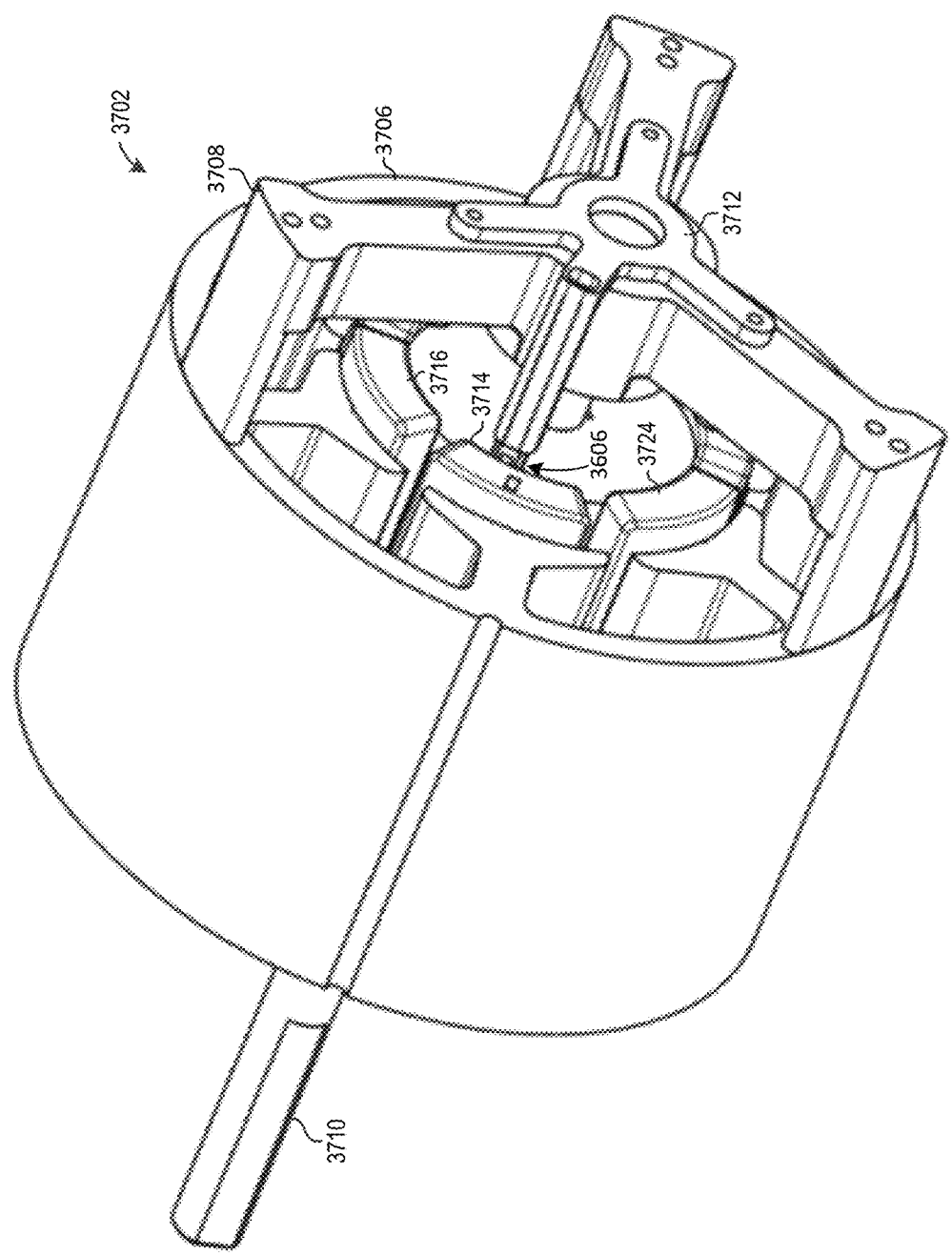

FIGS. 37A-37B depict an example of a placement of a Hall effect device 3606 of a control circuit 3506A for a motor 3702. The motor 3702 has a rotor 3704 and a stator 3706. A tripod 3708 holds a rear bearing/shaft 3710 in place. A Hall effect device holder or mount 3712 is mounted to the tripod 3708, and the Hall effect device 3606 is mounted on the Hall effect device mount.

The rotor magnets 3714-3724 are magnetized radially through the center of the magnet. The rotor magnets 3714, 3718, and 3722 with the mark on top have a north pole on the outside diameter (OD) and a south pole on the inside diameter (ID). The rotor magnets 3716, 3720, and 3724 with no marking have a south pole on the outside diameter (OD) and a north pole on the inside diameter (ID).

In the example of FIGS. 37A-37B, the Hall effect device 3606 is placed at an inner edge of the rotor magnets 3714-3724 so it detects a magnetic pole of the rotor magnets that is opposite of the magnetic pole facing the stator 3706. In this example, the Hall effect device 3606 has two output signals: (1) a high output signal indicating a north magnetic pole is facing the stator 3706 or (2) a low output signal indicating a south magnetic pole is facing the stator.

Referring to FIGS. 35-42, the multispeed AC machine circuit 3502 can operate in three different modes: starting mode, full synchronous speed mode, and fractional speed mode.

Starting mode is used for start-up of the motor in which the multispeed AC machine circuit 3502 is used. Starting mode can be operated in multiple different ways, including pulse-width modulation, delayed firing angle with zero current shutoff, or using a second winding. The different starting modes are used to limit starting current and torque to provide smooth stable operation.

Pulse-width modulation (PWM) mode may be used, for example, in a multispeed AC machine circuit 3502 with one winding Wa, as seen in FIG. 35, or two, three, or more windings. Pulse-width modulation (PWM) mode is used to limit starting current and torque by reducing the RMS voltage applied to the winding(s) by switching the voltage on and off at a high frequency through the winding(s), for example winding Wa, in the multispeed AC machine circuit 3502. To operate the PWM mode, the control circuit 3506 closes a pair of power switches, either (a) Q1 and Q4 or (b) Q2 and Q3, to apply voltage to the winding(s), for example winding Wa.

The control circuit 3506 has a microcontroller that generates one or more PWM signals to one or more of the power switches Q1, Q2, Q3, and/or Q4. The PWM signals open or close the one or more of the power switches Q1, Q2, Q3, and/or Q4. For example, the control circuit 3506 transmits the PWM signals to the power switch pairs Q1/Q4 or Q2/Q3 as described herein to open or close the power switch pairs Q1/Q4 or Q2/Q3.

The PWM signal has a duty cycle, which for example can be based on the amount of starting torque/current that is required to start the motor. For example, a compressor motor would require a higher duty cycle/starting torque than a fan motor to start. The control circuit 3506 continuously determines the actual duty cycle value and compares the actual duty cycle value to a desired duty cycle value. In this example, when the desired duty cycle is reached, if the power switch pair Q1/Q4 is closed and the AC polarity detection signal is high, indicating that current is flowing from L1 through the winding Wa from point A 3508 to point B 3510 out to L2, the control circuit 3506 opens power switch Q4 and closes power switch Q2. This connects both point A 3508 and point B 3510 of winding Wa to L1. Since both sides of the winding Wa are connected to the same voltage source, there is no differential voltage applied to the winding. This allows current to continue to flow through the winding in the same direction Wa, while no voltage is applied to the winding Wa until the next PWM cycle is reached. Then, the control circuit 3506 opens power switch Q2 and closes power switch Q4, thereby applying voltage to the windings again. Alternatively, if power switch pair Q1/Q4 were closed when the AC polarity detection signal 3604 is low, indicating that current was flowing from L2 through winding Wa from point B 3510 to point A 3508 and out to L1, and the desired duty cycle is reached, the control circuit 3506 would open power switch Q1 and close power switch Q3. This allows current to continue to flow through the winding Wa in the same direction without voltage applied to the winding Wa. The current must always have a path to flow to operate the PWM without shut-off spikes. PWM may also be used in the other operating modes to limit peak currents.

In synchronous speed mode, the motor is operating at synchronous speed. Synchronous speed rotations per minute (RPM) can be determined by taking the line frequency in Hertz divided by the number of rotor pole pairs (1 north pole and 1 south pole is equal to 1 pole pair) and multiplied by 60, the number of seconds in a minute. For example a six pole motor (3 north poles and 3 south poles) running on a 60 Hz supply would have a synchronous speed of 1200 RPM because 60 Hz/3 pole pairs*60 sec=1200 RPM. In full synchronous speed mode, one pair of power switches Q1/Q4 or Q2/Q3 is left always closed and the other pair Q2/Q3 or Q1/Q4 is left always open allowing continuous alternating current flow through the winding Wa.

Figure 42:
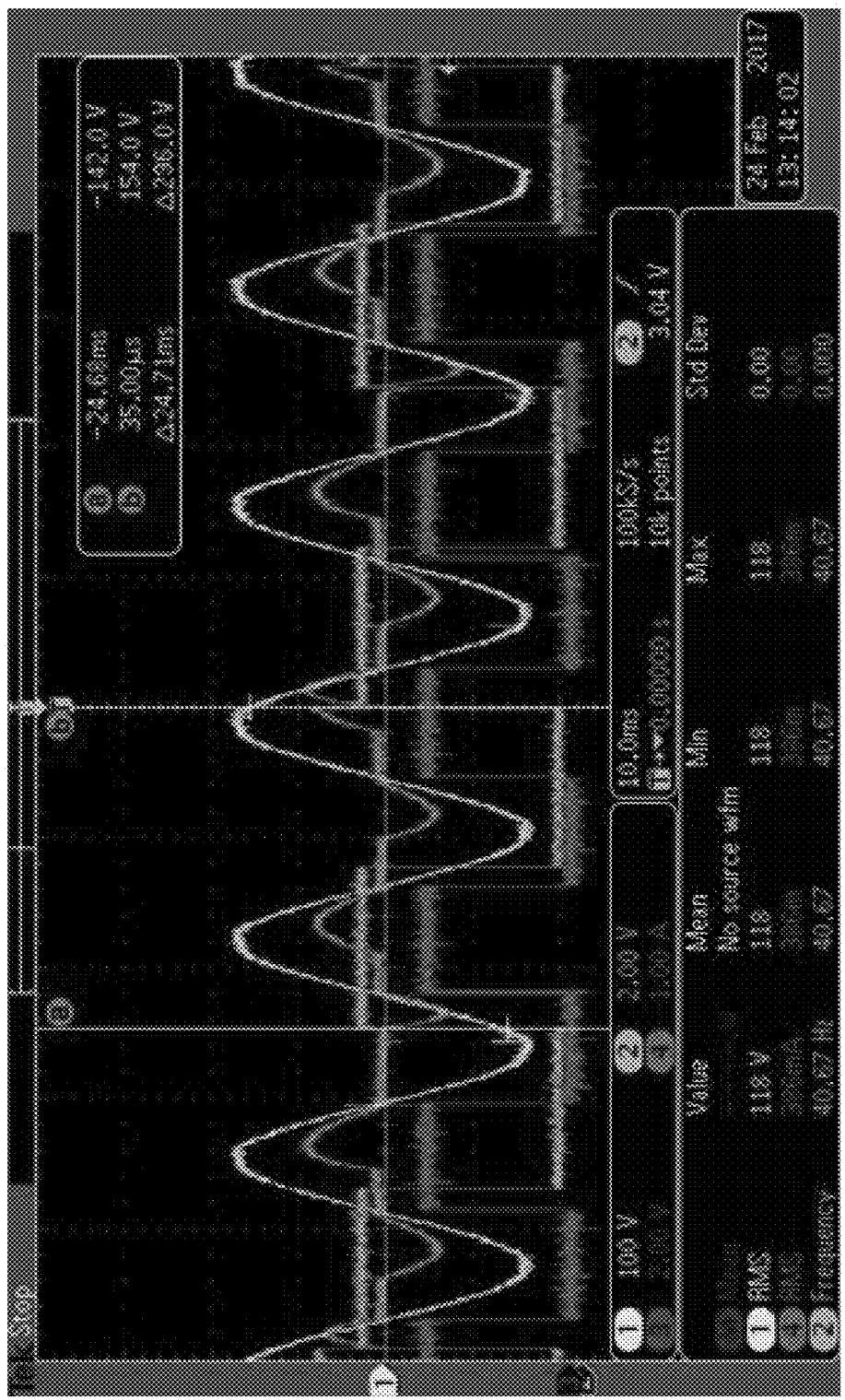

Delayed firing angle with zero current shutoff mode may be used in starting mode to limit starting current/torque and also in fractional speed mode, as shown in FIG. 42. Delayed firing angle with zero current shutoff entails waiting until the sine wave of the AC voltage is past a certain point before closing any power switches. For example, once voltage is at the peak of the sine wave, either power switch pair Q1/Q4 or power switch pair Q2/Q3 may be closed to allow current flow through the winding Wa. Once current flow through the winding Wa is at zero, the motor controller 3608 will open all power switches and wait until the next peak of the sine wave is reached before the motor controller will close any power switches. In this example, the effective RMS value of the applied voltage will be reduced to 50% of the line voltage because only the second half of the sine wave voltage is applied to the winding Wa. The effective RMS voltage applied to the winding Wa in this mode may be adjusted by how much of the sine wave voltage is applied to the winding.

Figure 41:
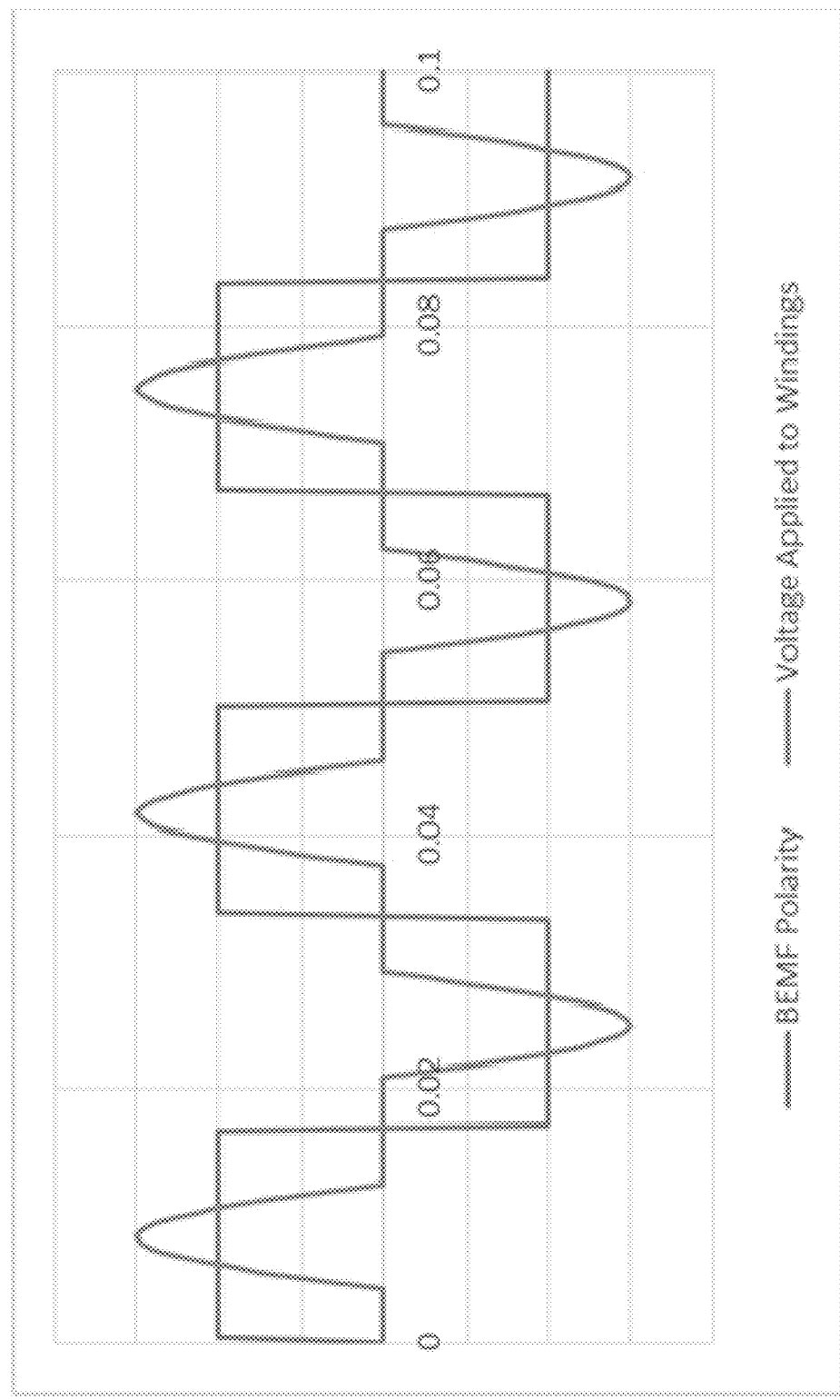

Fractional speed mode is used when the motor is operating at less than full synchronous speed. Fractional speed mode may be operated multiple ways by the motor controller 3608, including using the delayed firing angle with zero current shutoff to adjust the power applied to the winding Wa or adding additional windings and using a simplified circuit, as seen in FIG. 44, to operate at a fixed fractional speed. With the simplified circuit shown in FIG. 44, the additional winding increases the BEMF to reduce the current draw and improve performance. The motor controller 3608 controls the power switch pairs Q1/Q6 and Q3/Q4 based on the Hall effect device 3606 while leaving power switches Q2/Q5 always open. When the Hall effect device 3606 has a high output, the motor controller closes power switch pair Q1/Q6 and opens power switch pair Q3/Q4 allowing current to flow from L1 through windings Wa and Wb to L2. No zero current shut-off is required in this instance because once the current flow reaches zero, the power switch diodes block current flow from coming the reverse direction, from L2 through the windings Wa and Wb to L1. If the Hall effect signal from the Hall effect device 3606 is low, the motor controller 3608 opens power switch pair Q1/Q6 and closes power switch pair Q3/Q4 allowing current flow from L1 through windings Wa and Wb to L2. The simplified circuit effectively creates a reduced frequency supply that operates at half of the line frequency, as seen in FIG. 41. PWM mode may also be used for fractional speed mode but has additional losses due to the high frequency switching.

FIG. 38-43 depict voltage applied to the winding Wa in operational modes.

Figure 38:
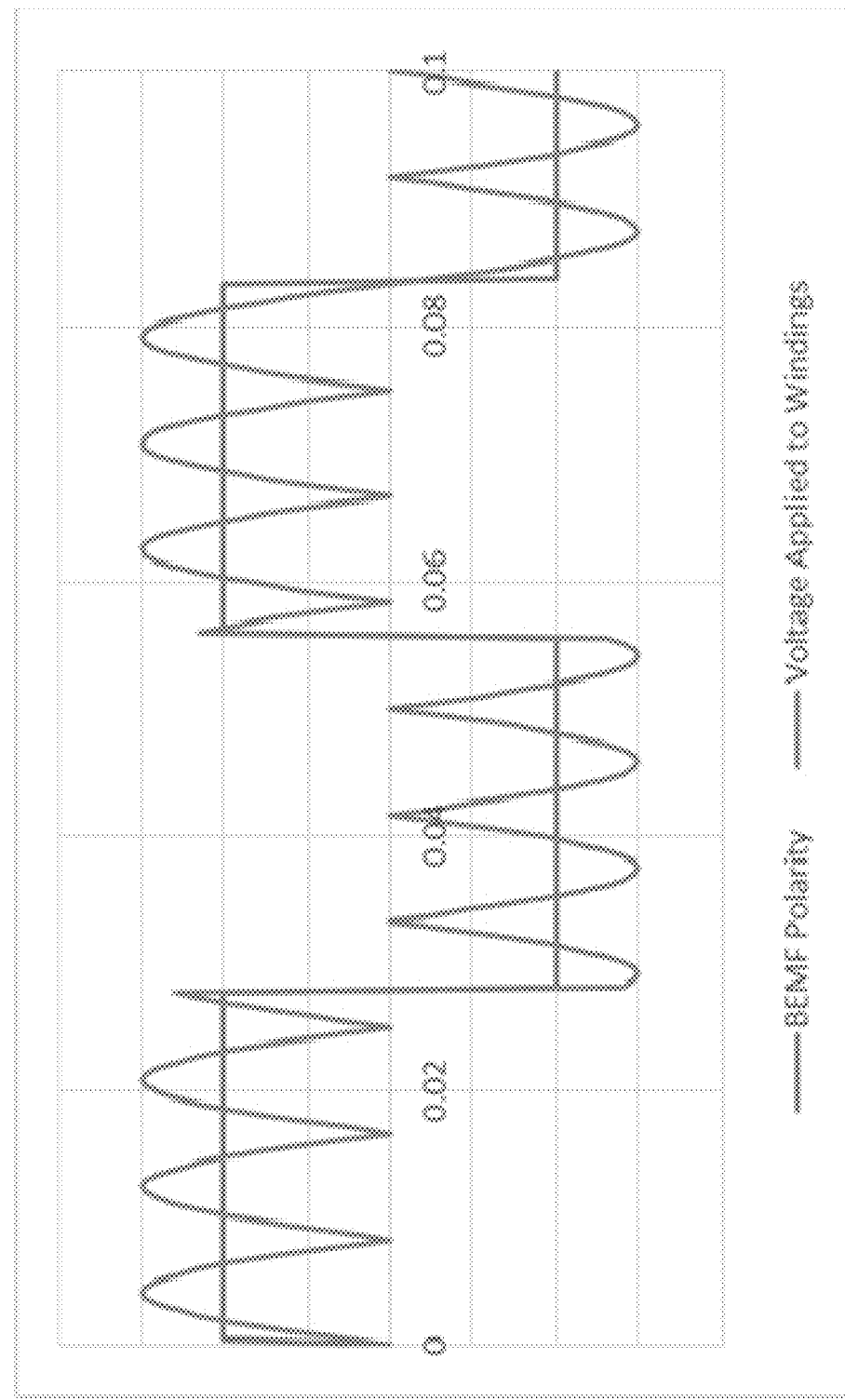
FIGS. 38-42 depict voltages applied to windings for multispeed alternating current (AC) motor circuits for a motor.

FIG. 38 depicts an example of how the input AC voltage may be applied to the winding Wa at low (fractional) speed. The voltage applied to the winding Wa may vary based on the starting mode used (e.g. pulse-width modulation, delayed firing angle with zero current shutoff, or using a second winding).

Figure 39:
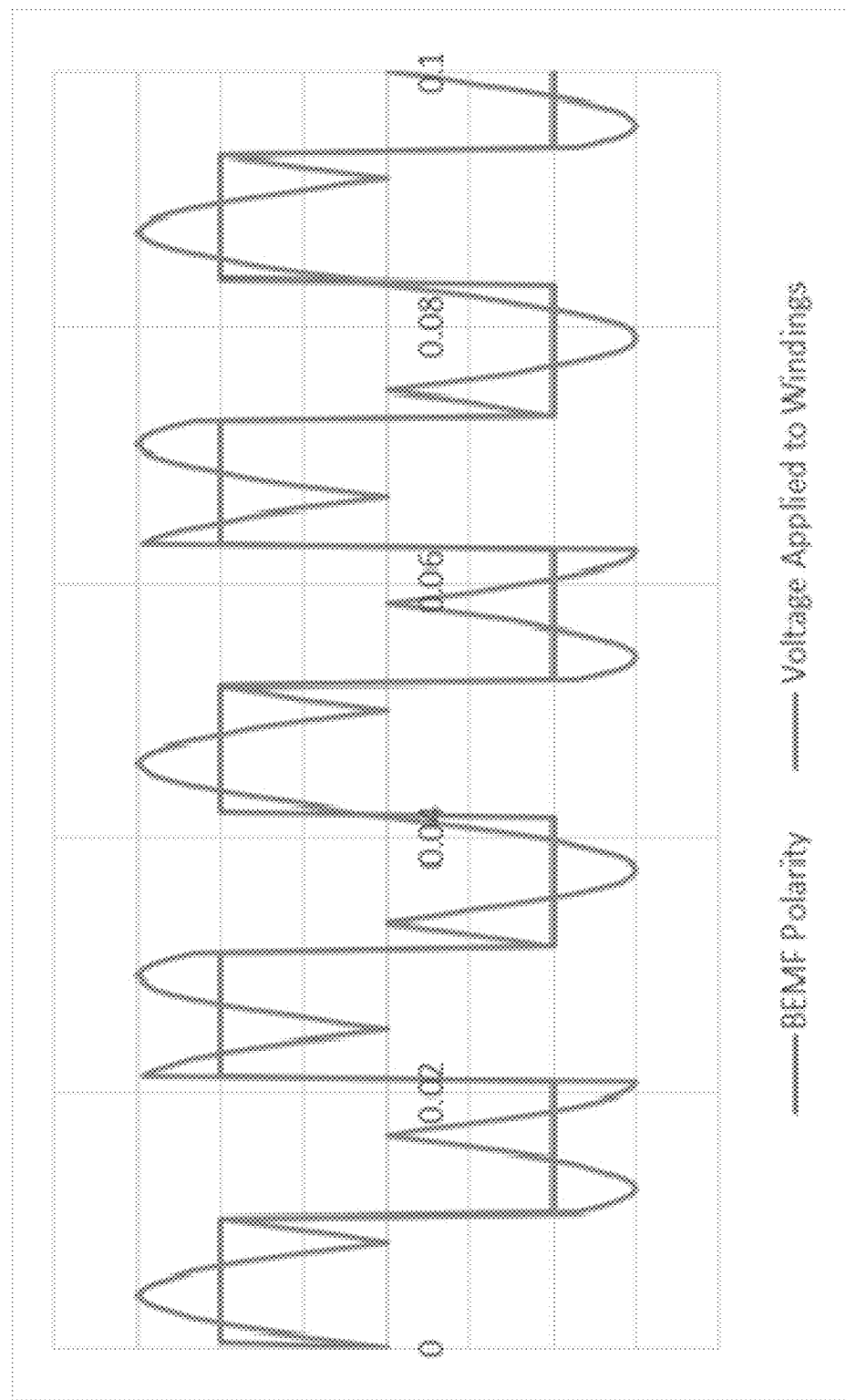

FIG. 39 depicts an example of the available voltage that may be applied to the winding Wa as the motor approaches synchronous speed. The control circuit 3506 may filter out the chopped waveforms by delaying turn-on of the line voltage or shutting off of the line voltage at zero current, as in delayed firing angle mode with zero current shut-off mode, until synchronous speed for the motor is reached. In the example in this figure all of the available voltage is being applied to winding(s) based on the BEMF polarity.

Figure 40:
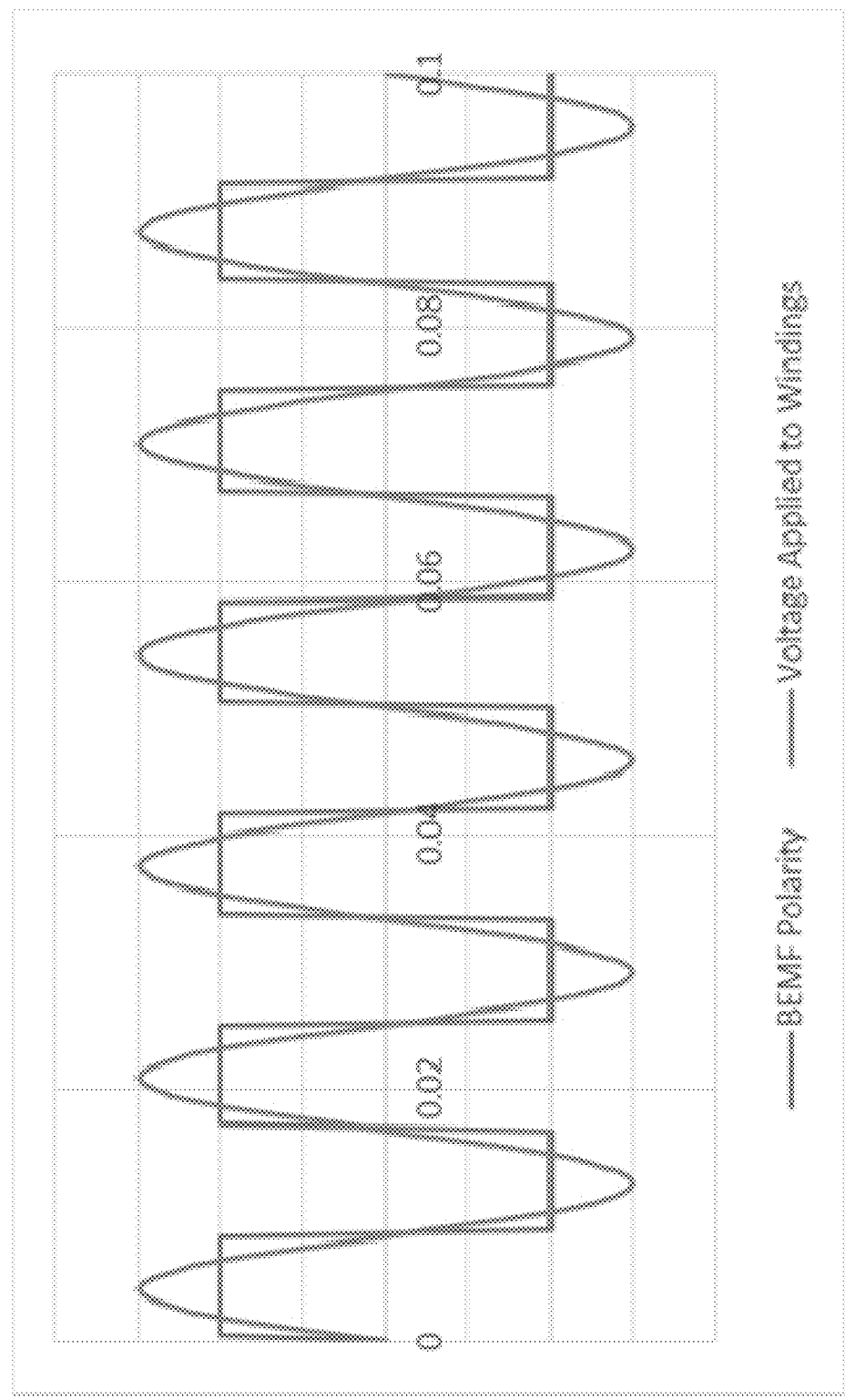

FIG. 40 depicts the voltage applied to the winding Wa while the motor is running at synchronous speed. Depending on the load on the motor, the multispeed AC machine circuit 3502 may operate in a full synchronous mode where one pair of power switches Q1/Q4 or Q2/Q3 is left always closed and the other pair of power switches Q2/Q3 or Q1/Q4 is left always open. For operation with loads requiring less torque than is applied in full synchronous mode, current may be limited by delaying the firing angle, using PWM, or adjusting the phase angle that voltage is applied in relation to rotor position, which is similar to the starting mode.

FIG. 41 depicts an example of operation in fractional speed mode. The control circuit selectively skips half cycles or portions of half cycles of the AC input voltage in order to generate an effective reduced frequency alternating voltage to one or more motor windings, e.g. winding Wa, to provide stable operation of the motor at a reduced speed. The result is very efficient operation with minimal switching.

FIG. 42 depicts a measurement of motor current and AC input voltage for a motor operating at ⅔ of full synchronous speed using the delayed firing angle with zero current shutoff. For improved operation at lower speeds, one or more additional windings may be added to the multispeed AC machine circuit 3502 to increase the BEMF at lower speeds, reduce the peak current draw, and improve power factor and efficiency.

FIG. 43 depicts one example of a multispeed AC machine circuit 3502 with an additional winding Wb and two additional power switches. The example of FIG. 43 includes a second stator winding Wb connected between point B 3510 and point C 4302. Point C is the end side of the second winding. The first stator winding Wa is used when the motor is operating at full synchronous speed. The second winding Wb is used when the motor is operating at startup or at a fractional speed, including half speed.

The example of FIG. 43 also includes six of power switches Q1, Q2, Q3, Q4, Q5, and Q6 that connect the windings to either L1 or L2. Switch Q1 connects Point A to L1, and switch Q4 connects Point A to L2. Switch Q2 connects Point B to L1, and switch Q5 connects Point B to L2. Switch Q3 connects Point C to L1, and switch Q6 connects Point C to L2. Switches Q1, Q2, Q3, Q4, Q5, and Q6 are bi-directional switches allowing current to flow from L1 to L2 or from L2 to L1. Switch Q5 includes a High Speed SSR (QSSR) that includes a MOSFET with diodes 4304-4310 configured as a full-wave bridge rectifier. Switch Q6 also includes a High Speed SSR (QSSR) that includes a MOSFET with diodes 4312-4318 configured as a full-wave bridge rectifier.

In the example of FIG. 43, a current sensor 4320 is placed between Point A 3508 and the of power switch pair Q1/Q4. Since current is always flowing through the winding Wa, a single current sensor 4320 at this location will provide an accurate current measurement through the windings Wa and Wb. The current measurement is transmitted from the current sensor 4320 to the control circuit 3506B. This current measurement may be used to either sense current zero crossings or detect over current situations and used by the control circuit 3506B, for example for start-up and other operation as described herein.

In one example of operation, as shown in FIG. 43, the control circuit 3506B activates (closes) the switch pair Q1/Q6 or the switch pair Q3/Q4 to use both windings Wa and Wb in series for startup of the motor for low or fractional speed operation by transmitting signals to the switch pair Q1/Q6 and the switch pair Q3/Q4 either to open/close the switch pair Q1/Q6 and open/close the switch pair Q3/Q4. Current may still be passed either from L1 to L2 or from L2 to L1 through both windings Wa and Wb. For full speed operation the control circuit 3506B activates (closes) the switch pair Q1/Q5 or the switch pair Q2/Q4 to use only winding Wa while not passing any current through winding Wb. The control circuit transmits signals to the switch pair Q1/Q5 and the switch pair Q2/Q4 to open/close the switch pair Q1/Q5 and to open/close the switch pair Q2/Q4.

In another example of operation, as shown in FIG. 44, current will only flow from L1 to L2 through both sets of windings Wa and Wb for startup or fractional speed operation. If the rotor position signal from the Hall effect device 3606 is high, switches Q1 and Q6 are equal to the Hall effect signal from the Hall effect device 3606 and switches Q3 and Q4 are equal to the inverse of the Hall effect signal. For example, if L1 is high and the Hall effect signal is high, current will flow from L1 through switch Q1, through both windings Wa and Wb, and out switch Q6 to L2. If the Hall effect signal is low, switches Q1 and Q6 will be open while switches Q3 and Q4 will be closed, allowing current that is still flowing from L1 to L2 to pass in the opposite direction through the coils. In this example when using both windings Wa and Wb current may only flow from L1 to L2. There will be two switches always on to prevent shutoff spikes. Diodes block the current from flowing in the wrong direction when the AC detection signal is low while still allowing the energy in the coils to get back to the line voltage. Current may still be passed in either direction, from L1 to L2 or from L2 to L1, through the coils in either direction in full speed mode using only winding Wa.

In one example of operation of a full speed setting and operation by the multispeed AC machine circuit 3502, the startup mode is only used at speeds lower than 400 RPM and both windings Wa and Wb are used. Once the motor is moving faster than 400 RPMs, the winding Wb is no longer used. Pulse-width modulation is used, as described above, to limit current after that point. The Hall effect signal and the AC polarity signal are XOR'd together by the control circuit 3506B to create a driving logic signal. Once the motor reaches full speed, the Hall effect signal is shifted as described above. The Hall effect signal is retarded for an over-rev condition and advanced for under-rev condition. The Hall effect signal is shifted for every sensor period that is outside of a 100 micro second window. The Hall effect signal shifts different amounts based on how far outside of the window it is.

In this example, for full speed synchronous mode, there is a 1 micro second window that the sensor time period has to be in for 5 seconds before the circuit will try to become synchronous. Once the motor has been stable inside this window for 5 seconds the software determines which 2 power switches have been on the most and it leaves them on. No more switching occurs unless an over current situation is detected or a change in speed is detected.

In this example, for half speed, once 600 rpm is achieved, the circuit will continue to switch with the hall but only when the AC detection signal is high. The sensor is then shifted in the software to get the motor to stabilize at 600 rpm. It is retarded for an over-rev condition and advanced if more power is needed. The sensor never advances past its actual location.

FIG. 44 depicts an example of a multispeed AC machine circuit 3502 with four bi-directional power switches and two unidirectional power switches. Power switches Q1, Q2, Q4 and Q5 are bi-directional power switches allowing current to flow from L1 to L2 or from L2 to L1. Power switches Q3 and Q6 are unidirectional power switches. Current can only flow from L1 into power switch Q3, and current can only flow into power switch Q6 and out to L2.

FIG. 45 depicts an example of simplified multispeed AC machine circuits 3502D. The power switches of FIG. 45 can be other types of switches than those described above, such as a switching device or combination of switching devices that allow for the switching of alternating current, including metal-oxide-semiconductor field-effect transistors (MOSFETs), silicon-controlled rectifiers (SCRs), or transistors configured to operate as AC switches, for example when placed in series in opposite directions with diodes, or relays or any other combination of switches that can be configured for switching alternating current. But, the circuit of FIG. 45 operates as the FIGS. 35, 36, and 43 described above. Other configurations of components can be used that effectively connect one or more windings directly or indirectly to the incoming AC voltage.

FIG. 46 depicts an example of simplified multispeed AC machine circuits 3502E. The circuit of FIG. 46 depicts has an additional winding for fractional speed optimization and simplification of Q3 and Q6 for a limited number of fractional speeds. At half synchronous speed power switch pairs Q1/Q6 or Q3/Q4 can be left on to allow current flow back to the line while alternating the energized pair based on rotor position. The power switches of FIG. 46 can be other types of switches than those described above, such as a switching device or combination of switching devices that allow for the switching of alternating current, including metal-oxide-semiconductor field-effect transistors (MOSFETs), silicon-controlled rectifiers (SCRs), or transistors configured to operate as AC switches, for example when placed in series in opposite directions with diodes, or relays or any other combination of switches that can be configured for switching alternating current.

FIG. 47 depicts another example of a simplified multispeed AC machine circuit 3502F. The power switches of FIG. 47 can be types of power switches other than those described above, such as a switching device or combination of switching devices that allow for the switching of alternating current, including metal-oxide-semiconductor field-effect transistors (MOSFETs), silicon-controlled rectifiers (SCRs), or transistors configured to operate as AC switches, for example when placed in series in opposite directions with diodes, or relays or any other combination of switches that can be configured for switching alternating current. But, the circuits of FIG. 47 operate as the FIGS. 35, 36, and 43 described above. However, the additional winding and two additional power switches Q7 and Q8 enable further optimization at different speeds or load requirements. Adding additional windings increases the BEMF, the total resistance of the windings, and the impedance of the windings. For example, different wire gauges may be used on the additional windings to increase efficiency when running a large motor at small load, essentially creating a smaller motor inside a bigger motor.

In other embodiments, the disclosure herein includes methods for providing the components described herein for a machine, including for a motor or a generator.

In one aspect, a multispeed alternating current (AC) machine circuit is for an AC power source having a first side and a second side. The AC machine circuit includes two or more pairs of power switches, one or more windings, and a control circuit to close one pair of power switches to cause current to flow from a first side of the AC power source, through the one or more windings, to the second side of the AC power source and to close the other pair of power switches to cause current to flow from the second side of the AC power source, through the one or more windings, to the first side of the AC power source.

In another aspect, a circuit is for a machine having alternating current (AC) power source having a first side (L1) and a second side (L2). The circuit comprises a winding with a start side and an end side, a first power switch connected between the first side and the winding start side, a second power switch connected between the second side and the winding start side, a third power switch connected between the first side and the winding end side, a fourth power switch connected between the second side and the winding end side, and a control circuit. The control circuit closes the first power switch and the fourth power switch and open the second power switch and the third power switch to cause current to flow from the first side to the second side or closes the second power switch and the third power switch and open the first power switch and the fourth power switch to cause current to flow from the second side to the first side.

In another aspect, a circuit is for a machine having alternating current (AC) power source having a first side (L1) and a second side (L2). The circuit comprises a first winding with a first start side and a first end side, a second winding with a second start side and a second end side, a first power switch connected between the AC power source first side and the first winding start side, a second power switch connected between the AC power source second side and the first winding start side, a third power switch connected between the AC power source first side and the first winding end side, a fourth power switch connected between the AC power source second side and the first winding end side, a fifth power switch connected between the AC power source first side and the second winding end side, a sixth power switch connected between the AC power source second side and the second winding end side, and a control circuit. The control circuit closes the first power switch and the sixth power switch and open the second power switch, the third power switch, the fourth power switch, and the fifth power switch to cause current to flow through the first winding and the second winding for fractional speed operation or closes the third power switch and the fourth power switch and open the first power switch, the second power switch, the fifth power switch, and the sixth power switch to cause current to flow through the first winding and the second winding for fractional speed operation or closes the first power switch and the fifth power switch and open the second power switch, the third power switch, the fourth power switch, and the sixth power switch to cause current to flow through the first winding for full speed operation or closes the second power switch and the fourth power switch and open the first power switch, the third power switch, the fifth power switch, and the sixth power switch to cause current to flow through the first winding for full speed operation.

In another aspect, a method is for a multispeed alternating current (AC) machine circuit for an AC power source having a first side and a second side. The method includes providing two or more pairs of power switches, providing one or more windings, and providing a control circuit to close one pair of power switches to cause current to flow from a first side of the AC power source, through the one or more windings, to the second side of the AC power source and to close the other pair of power switches to cause current to flow from the second side of the AC power source, through the one or more windings, to the first side of the AC power source. The method further includes providing components for the control circuit described herein and operating the circuit as described herein.

In another aspect, a method is for a circuit for a machine having alternating current (AC) power source having a first side (L1) and a second side (L2). The method comprises providing a winding with a start side and an end side, providing a first power switch connected between the first side and the winding start side, providing a second power switch connected between the second side and the winding start side, providing a third power switch connected between the first side and the winding end side, providing a fourth power switch connected between the second side and the winding end side, and providing a control circuit. The control circuit closes the first power switch and the fourth power switch and open the second power switch and the third power switch to cause current to flow from the first side to the second side or closes the second power switch and the third power switch and open the first power switch and the fourth power switch to cause current to flow from the second side to the first side. The method further includes providing components for the control circuit described herein and operating the circuit as described herein.

In another aspect, a method is for a circuit for a machine having alternating current (AC) power source having a first side (L1) and a second side (L2). The method comprises providing a first winding with a first start side and a first end side, providing a second winding with a second start side and a second end side, providing a first power switch connected between the AC power source first side and the first winding start side, providing a second power switch connected between the AC power source second side and the first winding start side, providing a third power switch connected between the AC power source first side and the first winding end side, providing a fourth power switch connected between the AC power source second side and the first winding end side, providing a fifth power switch connected between the AC power source first side and the second winding end side, providing a sixth power switch connected between the AC power source second side and the second winding end side, and providing a control circuit. The control circuit closes the first power switch and the sixth power switch and open the second power switch, the third power switch, the fourth power switch, and the fifth power switch to cause current to flow through the first winding and the second winding for fractional speed operation or closes the third power switch and the fourth power switch and open the first power switch, the second power switch, the fifth power switch, and the sixth power switch to cause current to flow through the first winding and the second winding for fractional speed operation or closes the first power switch and the fifth power switch and open the second power switch, the third power switch, the fourth power switch, and the sixth power switch to cause current to flow through the first winding for full speed operation or closes the second power switch and the fourth power switch and open the first power switch, the third power switch, the fifth power switch, and the sixth power switch to cause current to flow through the first winding for full speed operation. The method further includes providing components for the control circuit described herein and operating the circuit as described herein.

Those skilled in the art will appreciate that variations from the specific embodiments disclosed above are contemplated by the invention. The invention should not be restricted to the above embodiments, but should be measured by the following claims.

What is claimed is:

1. A method for a machine having an alternating current (AC) power source with a first side (L1) and a second side (L2), the method comprising:
   at a motor controller for a circuit comprising a winding with a start side and an end side, a first power switch connected between the first side and the winding start side, a second power switch connected between the first side and the winding end side, a third power switch connected between the second side and the winding start side, and a fourth power switch connected between the second side and the winding end side:
      receiving a signal from an AC polarity detector and another signal from a Hall effect device and determining which of the power switches to open or close to obtain a proper direction of current flow through the winding based on the signal and the other signal; and
      closing the first power switch and the fourth power switch and opening the second power switch and the third power switch to cause current to flow from the first side to the second side; or
      closing the second power switch and the third power switch and opening the first power switch and the fourth power switch to cause current to flow from the second side to the first side.

2. The method of claim 1 wherein the circuit comprises the AC polarity detector and the Hall effect device, and the method further comprises:
   outputting a polarity signal as the signal from the AC polarity detector;
   outputting a Hall effect signal as the other signal from the Hall effect device;
   receiving the polarity signal and the Hall effect signal from the AC polarity detector and the Hall effect device by the motor controller; and
   based on a value of the polarity signal and a value of the Hall effect signal, the motor controller:
      closes the first power switch and the fourth power switch and opens the second power switch and the third power switch to cause current to flow from the first side to the second side; or closes the second power switch and the third power switch and opens the first power switch and the fourth power switch to cause current to flow from the second side to the first side.

3. The method of claim 1 wherein:
the circuit comprises the AC polarity detector and the Hall effect device;
the AC polarity detector outputs a polarity signal as the signal, the polarity signal having a high value or a low value;
the Hall effect device outputs a Hall effect signal as the other signal, the Hall effect signal having a high value or a low value;
the polarity signal and the Hall effect signal are received by the motor controller;
when the Hall effect signal is high and the AC polarity detector signal is high, the motor controller opens the second power switch and the third power switch and closes the first power switch and the fourth power switch;
when the Hall effect signal is high and the AC polarity detector signal is low, the motor controller opens the first power switch and the fourth power switch and closes the second power switch and the third power switch;
when the Hall effect signal is low and the AC polarity detector signal is high, the motor controller opens the first power switch and the fourth power switch and closes the second power switch and the third power switch; and
when the Hall effect signal is low and the AC polarity detector signal is low, the motor controller opens the second power switch and the third power switch and closes the first power switch and the fourth power switch.

4. The method of claim 1 further comprising receiving alternating current (AC) power at a direct current (DC) power supply, converting the AC power to DC power, and transferring the DC power to one or more components of the circuit.

5. The method of claim 1 further comprising configuring each power switch with four diodes configured as a full wave bridge rectifier.

6. The method of claim 1 further comprising configuring the motor controller with at least one of a processor, an application specific integrated circuit (ASIC), a field programmable gate array signal (FPGA), s programmable logic device (PLD), gate logic, and transistor logic.

7. The method of claim 1 further comprising configuring each power switch to comprise a MOSFET.

8. The method of claim 1 further comprising configuring each power switch to comprise a high speed SSR and a plurality of diodes configured as a full wave bridge rectifier.

9. The method of claim 1 further comprising configuring the machine as a motor.

10. The method of claim 1 wherein the signal from the AC polarity indicates which of the first side (L1) or the second side (L2) has a higher voltage.

11. The method of claim 10 wherein the signal from the AC polarity detector has a high value when a voltage on the first side (L1) is higher than a voltage on the second side (L2) and has a low value when the voltage on the first side (L1) is lower than the voltage on the second side (L2).

12. The method of claim 1 wherein the other signal from the Hall effect device indicates a position of a rotor of the machine relative to a stator of the machine.

13. The method of claim 12 wherein the other signal from the Hall effect device indicates the position by indicating a polarity of a magnet of the rotor relative to a stator tooth of the stator.

14. The method of claim 12 wherein the other signal from the Hall effect device comprises:
a high value when a north magnetic pole of a magnet of the rotor is facing the stator; and
a low value when a south magnetic pole of a magnet of the rotor is facing the stator.

15. The method of claim 2 wherein the polarity signal indicates which of the first side (L1) or the second side (L2) has a higher voltage.

16. The method of claim 15 wherein the polarity signal has a high value when a voltage on the first side (L1) is higher than a voltage on the second side (L2) and has a low value when the voltage on the first side (L1) is lower than the voltage on the second side (L2).

17. The method of claim 2 wherein the Hall effect signal indicates a position of a rotor of the machine relative to a stator of the machine.

18. The method of claim 17 wherein the Hall effect device senses a polarity of a magnet of the rotor relative to a stator tooth of the stator and outputs the value of the Hall effect signal based on the polarity of the magnet relative to the stator tooth.

19. The method of claim 17 wherein the Hall effect device:
senses a polarity of a magnet of the rotor relative to the stator;
outputs a high value for the Hall effect signal when a north magnetic pole of a magnet of the rotor is facing the stator; and
outputs a low value for the Hall effect signal when a south magnetic pole of a magnet of the rotor is facing the stator.

20. A method for a machine having an alternating current (AC) power source having a first side (L1) and a second side (L2), the method comprising:
at a control circuit for a circuit comprising a first winding with a first start side and a first end side, a second winding with a second start side and a second end side and with the second winding start side connected to the first winding end side, a first power switch connected between the AC power source first side and the first winding start side, a second power switch connected between the AC power source first side and the first winding end side, a third power switch connected between the AC power source first side and the second winding end side, a fourth power switch connected between the AC power source second side and the first winding start side, a fifth power switch connected between the AC power source second side and the first winding end side, and a sixth power switch connected between the AC power source second side and the second winding end side:
closing the first power switch and the sixth power switch and opening the second power switch, the third power switch, the fourth power switch, and the fifth power switch to cause current to flow through the first winding and the second winding for fractional speed operation;
closing the third power switch and the fourth power switch and opening the first power switch, the second power switch, the fifth power switch, and the sixth power switch to cause current to flow through the first winding and the second winding for fractional speed operation;

closing the first power switch and the fifth power switch and opening the second power switch, the third power switch, the fourth power switch, and the sixth power switch to cause current to flow through the first winding for full speed operation; and closing the second power switch and the fourth power switch and opening the first power switch, the third power switch, the fifth power switch, and the sixth power switch to cause current to flow through the first winding for full speed operation.

21. The method of claim 20 further comprising:
outputting a polarity signal from an AC polarity detector;
outputting a Hall effect signal from a Hall effect device; and
receiving the polarity signal and the Hall effect signal at the control circuit and opening or closing one or more power switches based on a value of the polarity signal and a value of Hall effect signal.

22. The method of claim 20 wherein the control circuit comprises a motor controller, the method further comprising receiving signals from an AC polarity detector and a Hall effect device by the motor controller and determining by the motor controller which of the power switches to open or close to obtain a proper direction of current flow through the windings based on the signals.

23. The method of claim 20 wherein fractional speed operation is operation at a speed that is less than full synchronous speed.

24. A method for a machine having an alternating current (AC) power source having a first side (L1) and a second side (L2), two or more pairs of power switches, and one or more windings, the method comprising:

receiving a signal from an AC polarity detector and another signal from a Hall effect device by a motor controller and determining which of the power switches to open or close by the motor controller to obtain a proper direction of current flow through the one or more windings based on the signal and the other signal;

closing one pair of power switches by a control circuit to cause current to flow from a first side of the AC power source, through the one or more windings, to the second side of the AC power source; and closing another pair of power switches by the control circuit to cause current to flow from the second side of the AC power source, through the one or more windings, to the first side of the AC power source.

25. The method of claim 24 further comprising:
outputting a polarity signal as the signal from an AC polarity detector;
outputting a Hall effect signal as the other signal from a Hall effect device; and
receiving the polarity signal and the Hall effect signal by the motor controller and opening or closing one or more power switches by the motor controller based on a value of the polarity signal and a value of Hall effect signal.

26. The method of claim 24 wherein the signal received from the AC polarity detector indicates which of the first side (L1) or the second side (L2) has a higher voltage.

27. The method of claim 26 wherein the signal received from the AC polarity detector has a high value when a voltage on the first side (L1) is higher than a voltage on the second side (L2) and has a low value when the voltage on the first side (L1) is lower than the voltage on the second side (L2).

28. The method of claim 24 wherein the other signal received from the Hall effect device indicates a position of a rotor of the machine relative to a stator of the machine.

29. The method of claim 28 wherein the other signal received from the Hall effect device indicates the position by indicating a polarity of a magnet of the rotor relative to a stator tooth of the stator.

30. The method of claim 28 wherein the other signal received from the Hall effect device comprises:
a high value when a north magnetic pole of a magnet of the rotor is facing the stator; and
a low value when a south magnetic pole of a magnet of the rotor is facing the stator.

* * * * *